(12) United States Patent
Bedikian et al.

(10) Patent No.: US 10,139,918 B2
(45) Date of Patent: *Nov. 27, 2018

(54) DYNAMIC, FREE-SPACE USER INTERACTIONS FOR MACHINE CONTROL

(71) Applicant: Leap Motion, Inc., San Francisco, CA (US)

(72) Inventors: Raffi Bedikian, San Francico, CA (US); Jonathan Marsden, San Mateo, CA (US); Keith Mertens, Oakland, CA (US); David Samuel Holz, San Francisco, CA (US); Maxwell Sills, San Francisco, CA (US); Matias Perez, San Francisco, CA (US); Gabriel A. Hare, Daly City, CA (US); Ryan Christopher Julian, Berkeley, CA (US)

(73) Assignee: Leap Motion, Inc., San Francisco, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/279,363

(22) Filed: Sep. 28, 2016

(65) Prior Publication Data

US 2017/0017306 A1    Jan. 19, 2017

Related U.S. Application Data

(63) Continuation of application No. 14/155,722, filed on Jan. 15, 2014, now Pat. No. 9,459,697, which is a
(Continued)

(51) Int. Cl.
*G06F 15/00* (2006.01)
*G06F 13/00* (2006.01)
(Continued)

(52) U.S. Cl.
CPC ............ *G06F 3/017* (2013.01); *G06F 3/0325* (2013.01); *G06F 3/04815* (2013.01); *G06K 9/00335* (2013.01); *G06K 9/6202* (2013.01)

(58) Field of Classification Search
CPC ...................................................... G06F 3/0481
(Continued)

(56) References Cited

U.S. PATENT DOCUMENTS

| 4,175,862 A | 11/1979 | DiMatteo et al. |
| 5,454,043 A | 9/1995 | Freeman |

(Continued)

FOREIGN PATENT DOCUMENTS

| CN | 201332447 Y | 10/2009 |
| CN | 101729808 A | 6/2010 |

(Continued)

OTHER PUBLICATIONS

U.S. Appl. No. 14/154,730—Office Action dated Nov. 6, 2015, 9 pages.
(Continued)

*Primary Examiner* — Kevin Nguyen
(74) *Attorney, Agent, or Firm* — Haynes Beffel & Wolfeld LLP; Ernest J. Beffel, Jr.

(57) ABSTRACT

Embodiments of display control based on dynamic user interactions generally include capturing a plurality of temporally sequential images of the user, or a body part or other control object manipulated by the user, and computationally analyzing the images to recognize a gesture performed by the user. In some embodiments, a scale indicative of an actual gesture distance traversed in performance of the gesture is identified, and a movement or action is displayed on the device based, at least in part, on a ratio between the identified scale and the scale of the displayed movement. In some embodiments, a degree of completion of the recog-
(Continued)

nized gesture is determined, and the display contents are modified in accordance therewith. In some embodiments, a dominant gesture is computationally determined from among a plurality of user gestures, and an action displayed on the device is based on the dominant gesture.

44 Claims, 24 Drawing Sheets

Related U.S. Application Data continuation-in-part of application No. 14/154,730, filed on Jan. 14, 2014, now Pat. No. 9,501,152.

(60) Provisional application No. 61/877,641, filed on Sep. 13, 2013, provisional application No. 61/873,351, filed on Sep. 3, 2013, provisional application No. 61/872,538, filed on Aug. 30, 2013, provisional application No. 61/825,515, filed on May 20, 2013, provisional application No. 61/825,480, filed on May 20, 2013, provisional application No. 61/824,691, filed on May 17, 2013, provisional application No. 61/816,487, filed on Apr. 26, 2013, provisional application No. 61/808,959, filed on Apr. 5, 2013, provisional application No. 61/808,984, filed on Apr. 5, 2013, provisional application No. 61/791,204, filed on Mar. 15, 2013, provisional application No. 61/752,733, filed on Jan. 15, 2013, provisional application No. 61/752,731, filed on Jan. 15, 2013, provisional application No. 61/752,725, filed on Jan. 15, 2013.

(51) Int. Cl.
*G06F 3/01* (2006.01)
*G06F 3/0481* (2013.01)
*G06F 3/03* (2006.01)
*G06K 9/00* (2006.01)
*G06K 9/62* (2006.01)

(58) Field of Classification Search
USPC .................................................. 715/771, 780
See application file for complete search history.

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,742,263 A | 4/1998 | Wang et al. |
| 6,002,808 A | 12/1999 | Freeman |
| 6,072,494 A | 6/2000 | Nguyen |
| 6,154,558 A | 11/2000 | Hsieh |
| 6,263,091 B1 | 7/2001 | Jain et al. |
| 6,629,065 B1 | 9/2003 | Gadh et al. |
| 6,661,918 B1 | 12/2003 | Gordon et al. |
| 6,901,170 B1 | 5/2005 | Terada et al. |
| 6,950,534 B2 | 9/2005 | Cohen et al. |
| 7,308,112 B2 | 12/2007 | Fujimura et al. |
| 7,519,223 B2 | 4/2009 | Dehlin et al. |
| 7,536,032 B2 | 5/2009 | Bell |
| 7,598,942 B2 | 10/2009 | Underkoffler et al. |
| 7,606,417 B2 | 10/2009 | Steinberg et al. |
| 7,665,041 B2 | 2/2010 | Wilson et al. |
| 8,086,971 B2 | 12/2011 | Radivojevic et al. |
| 8,112,719 B2 | 2/2012 | Hsu et al. |
| 8,235,529 B1 | 8/2012 | Raffle et al. |
| 8,514,221 B2 | 8/2013 | King et al. |
| 8,930,852 B2 | 1/2015 | Chen et al. |
| 9,056,396 B1 | 6/2015 | Linnell |
| 9,182,812 B2 | 11/2015 | Ybanez Zepeda |
| 9,389,779 B2 | 7/2016 | Anderson et al. |
| 9,459,697 B2 | 10/2016 | Bedikian et al. |
| 9,501,152 B2 | 11/2016 | Bedikian et al. |
| 2002/0021287 A1 | 2/2002 | Tomasi et al. |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0123703 A1 | 7/2003 | Pavlidis et al. |
| 2005/0131607 A1 | 6/2005 | Breed |
| 2005/0236558 A1 | 10/2005 | Nabeshima et al. |
| 2006/0017807 A1 | 1/2006 | Lee et al. |
| 2006/0210112 A1 | 9/2006 | Cohen et al. |
| 2007/0130547 A1 | 6/2007 | Boillot |
| 2007/0206719 A1 | 9/2007 | Suryanarayanan et al. |
| 2007/0211023 A1 | 9/2007 | Boillot |
| 2008/0106746 A1 | 5/2008 | Shpunt et al. |
| 2008/0111710 A1 | 5/2008 | Boillot |
| 2008/0273764 A1 | 11/2008 | Scholl |
| 2008/0278589 A1 | 11/2008 | Thorn |
| 2008/0319356 A1 | 12/2008 | Cain et al. |
| 2009/0128564 A1 | 5/2009 | Okuno |
| 2009/0217211 A1 | 8/2009 | Hildreth et al. |
| 2009/0274339 A9 | 11/2009 | Cohen et al. |
| 2009/0309710 A1 | 12/2009 | Kakinami |
| 2010/0001998 A1 | 1/2010 | Mandella et al. |
| 2010/0013662 A1 | 1/2010 | Stude |
| 2010/0058252 A1 | 3/2010 | Ko |
| 2010/0095206 A1 | 4/2010 | Kim |
| 2010/0125815 A1 | 5/2010 | Wang et al. |
| 2010/0158372 A1 | 6/2010 | Kim et al. |
| 2010/0162165 A1 | 6/2010 | Addala et al. |
| 2010/0199221 A1 | 8/2010 | Yeung et al. |
| 2010/0219934 A1 | 9/2010 | Matsumoto |
| 2010/0222102 A1 | 9/2010 | Rodriguez |
| 2010/0275159 A1 | 10/2010 | Matsubara et al. |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0306712 A1 | 12/2010 | Snook et al. |
| 2010/0309097 A1 | 12/2010 | Raviv et al. |
| 2010/0321377 A1 | 12/2010 | Gay et al. |
| 2011/0026765 A1 | 2/2011 | Ivanich et al. |
| 2011/0057875 A1 | 3/2011 | Shigeta et al. |
| 2011/0066984 A1* | 3/2011 | Li .................... G06F 3/04883 715/863 |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0119640 A1 | 5/2011 | Berkes et al. |
| 2011/0134112 A1 | 6/2011 | Koh et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1 | 10/2011 | Impollonia et al. |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2012/0038637 A1 | 2/2012 | Marks |
| 2012/0050157 A1 | 3/2012 | Latta et al. |
| 2012/0068914 A1 | 3/2012 | Jacobsen et al. |
| 2012/0113223 A1 | 5/2012 | Hilliges et al. |
| 2012/0204133 A1 | 8/2012 | Guendelman et al. |
| 2012/0218263 A1 | 8/2012 | Meier et al. |
| 2012/0250936 A1 | 10/2012 | Holmgren |
| 2012/0320080 A1 | 12/2012 | Giese et al. |
| 2013/0033483 A1 | 2/2013 | Im et al. |

(56) References Cited

U.S. PATENT DOCUMENTS

| | | | |
|---|---|---|---|
| 2013/0191911 | A1 | 7/2013 | Dellinger et al. |
| 2013/0222233 | A1 | 8/2013 | Park et al. |
| 2013/0222640 | A1 | 8/2013 | Baek et al. |
| 2013/0239059 | A1 | 9/2013 | Chen et al. |
| 2013/0283213 | A1 | 10/2013 | Guendelman et al. |
| 2013/0307935 | A1 | 11/2013 | Rappel et al. |
| 2013/0321265 | A1* | 12/2013 | Bychkov ............... G06F 3/013 345/156 |
| 2014/0015831 | A1 | 1/2014 | Kim et al. |
| 2014/0055385 | A1 | 2/2014 | Duheille |
| 2014/0055396 | A1 | 2/2014 | Aubauer et al. |
| 2014/0063055 | A1 | 3/2014 | Osterhout et al. |
| 2014/0063060 | A1 | 3/2014 | Maciocci et al. |
| 2014/0095119 | A1 | 4/2014 | Lee et al. |
| 2014/0098018 | A1 | 4/2014 | Kim et al. |
| 2014/0125813 | A1 | 5/2014 | Holz |
| 2014/0134733 | A1 | 5/2014 | Wu et al. |
| 2014/0157135 | A1 | 6/2014 | Lee et al. |
| 2014/0201689 | A1 | 7/2014 | Bedikian et al. |
| 2014/0223385 | A1 | 8/2014 | Ton et al. |
| 2014/0225918 | A1 | 8/2014 | Mittal et al. |
| 2014/0240215 | A1 | 8/2014 | Tremblay et al. |
| 2014/0249961 | A1 | 9/2014 | Zagel et al. |
| 2014/0320408 | A1 | 10/2014 | Zagorsek et al. |
| 2014/0344762 | A1 | 11/2014 | Grasset et al. |
| 2015/0003673 | A1 | 1/2015 | Fletcher |
| 2015/0054729 | A1 | 2/2015 | Minnen et al. |
| 2015/0084864 | A1 | 3/2015 | Geiss et al. |
| 2015/0103004 | A1 | 4/2015 | Cohen et al. |
| 2015/0227795 | A1 | 8/2015 | Starner et al. |
| 2015/0293597 | A1 | 10/2015 | Mishra et al. |
| 2015/0309629 | A1 | 10/2015 | Amariutei et al. |
| 2015/0317831 | A1 | 11/2015 | Ebstyne et al. |
| 2015/0363070 | A1 | 12/2015 | Katz |

FOREIGN PATENT DOCUMENTS

| | | |
|---|---|---|
| CN | 101951474 A | 1/2011 |
| DE | 102007015495 A1 | 10/2007 |
| EP | 2378488 A2 | 10/2011 |
| WO | 2007137093 A2 | 11/2007 |
| WO | 2010032268 A2 | 3/2010 |
| WO | 2010148155 A2 | 12/2010 |
| WO | 2011036618 A2 | 3/2011 |
| WO | 2011044680 A1 | 4/2011 |
| WO | 2011045789 A1 | 4/2011 |

OTHER PUBLICATIONS

U.S. Appl. No. 14/281,817—Office Action dated Sep. 28, 2015, 5 pages.

U.S. Appl. No. 14/262,691—Office Action dated Dec. 11, 2015, 31 pages.

U.S. Appl. No. 14/154,730—Response to Nov. 6 Office Action filed Feb. 4, 2016, 9 pages.

U.S. Appl. No. 14/154,730—Notice of Allowance dated May 3, 2016, 5 pages.

U.S. Appl. No. 14/154,730—Notice of Allowance dated Jul. 14, 2016, 5 pages.

U.S. Appl. No. 14/476,694—Office Action dated Nov. 1, 2016, 28 pages.

U.S. Appl. No. 14/476,694—Response to Office Action dated Nov. 1, 2016 filed Jan. 31, 2017, 15 pages.

U.S. Appl. No. 14/476,694—Office Action dated Apr. 7, 2017, 32 pages.

U.S. Appl. No. 14/626,820—Office Action dated Jan. 22, 2016, 13 pages.

U.S. Appl. No. 14/626,820—Response to Office Action dated Jan. 22, 2016 filed May 21, 2016, 12 pages.

U.S. Appl. No. 14/626,820—Final Office Action dated Sep. 8, 2016, 21 pages.

U.S. Appl. No. 14/997,454 Office Action dated Dec. 1, 2016, 13 pages.

U.S. Appl. No. 14/626,683—Office Action dated Jan. 20, 2016, 15 pages.

U.S. Appl. No. 14/626,683—Final Office Action dated Sep. 12, 2016, 21 pages.

U.S. Appl. No. 14/626,683—Response to Office Action dated Jan. 20, 2016 filed May 20, 2016, 15 pages.

U.S. Appl. No. 14/626,898—Office Action dated Sep. 8, 2016, 29 pages.

U.S. Appl. No. 14/626,898—Response to Office Action dated Sep. 8, 2016 filed Dec. 8, 2016, 21 pages.

PCT/US2016/017632—Written Opinion of the International Searching Authority dated Jul. 27, 2016, 10 pages.

U.S. Appl. No. 14/626,904—Office Action dated Jan. 25, 2017, 23 pages.

U.S. Appl. No. 14/626,820—Response to Final Office Action dated Sep. 8, 2016, filed Jan. 9, 2017, 15 pages.

U.S. Appl. No. 14/626,820—Nonfinal Office Action dated Mar. 24, 2017, 25 pages.

U.S. Appl. No. 14/626,820—Advisory Action dated Jan. 26, 2017, 4 pages.

U.S. Appl. No. 14/476,694—Response to Office Action dated Apr. 7, 2017 filed Jul. 6, 2017, 22 pages.

U.S. Appl. No. 14/476,694—Advisory Action dated Jun. 22, 2017, 8 pages.

U.S. Appl. No. 14/262,691—Office Action dated Aug. 19, 2016, 36 pages

U.S. Appl. No. 14/262,691—Response to Dec. 11 Office Action filed May 11, 2016, 15 pages.

U.S. Appl. No. 14/516,493—Office Action dated May 9, 2016, 21 pages.

U.S. Appl. No. 14/516,493—Response to May 9 Office Action filed Aug. 9, 2016, 18 pages.

U.S. Appl. No. 14/516,493—Office Action dated Nov. 17, 2016, 30 pages.

Pavlovic, V.I., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.

Wu, Y., et al., "Vision-Based Gesture Recognition: A Review," Beckman Institute, Copyright 1999, pp. 103-115.

U.S. Appl. No. 14/280,018—Replacement Response to Feb. 12 Office Action filed Jun. 8, 2016, 16 pages.

U.S. Appl. No. 14/280,018—Response to Feb. 12 Office Action filed May 12, 2016 , 15 pages.

U.S. Appl. No. 14/262,691—Office Action dated Jan. 31, 2017, 27 pages.

U.S. Appl. No. 14/262,691—Respinse to Office Action dated Aug. 19, 2016, filed Nov. 21, 2016, 13 pages.

U.S. Appl. No. 14/155,722—Office Action dated Nov. 20, 2015.

U.S. Appl. No. 14/476,694—Office Action dated Aug. 10, 2017, 71 pages.

U.S. Appl. No. 14/155,722—Response to Office Action dated Nov. 20, 2015, filed Feb. 2, 2016, 15 pages.

U.S. Appl. No. 14/155,722—Notice of Allowance dated May 27, 2016, 10 pages.

U.S. Appl. No. 14/262,691—Response to Office Action dated Jan. 31, 2017, filed Jun. 30, 2017, 20 pages.

U.S. Appl. No. 14/262,691—Notice of Allowance dated Oct. 30, 2017, 35 pages.

U.S. Appl. No. 15/358,104—Office Action dated Nov. 2, 2017, 9 pages.

U.S. Appl. No. 14/154,730—Notice of Allowance dated May 24, 2016, 9 pages.

U.S. Appl. No. 14/155,722—Office Action dated Nov. 20, 2015, 14 pages.

U.S. Appl. No. 14/476,694—Response to Office Action dated Aug. 10, 2017, filed Nov. 10, 2017, 14 pages.

U.S. Appl. No. 14/626,898—Notice of Allowance dated Feb. 15, 2017, 13 pages.

U.S. Appl. No. 15/358,104—Response to Office Action dated Nov. 2, 2017, filed Mar. 2, 2018, 9 pages.

(56) References Cited

OTHER PUBLICATIONS

U.S. Appl. No. 15/358,104—Notice of Allowance dated Apr. 11, 2018, 41 pages.

* cited by examiner

DYNAMIC, FREE-SPACE USER INTERACTIONS FOR MACHINE CONTROL

CROSS-REFERENCE TO RELATED APPLICATIONS

This application is a Continuation of U.S. patent application Ser. No. 14/155,722, filed Jan. 15, 2014, which claims priority to and the benefit of, and incorporates herein by reference in their entireties, U.S. Provisional Application Nos. 61/825,515 and 61/825,480, both —filed on May 20, 2013; No. 61/873,351, filed on Sep. 3, 2013; No. 61/877,641, filed on Sep. 13, 2013; No. 61/816,487, filed on Apr. 26, 2013; No. 61/824,691, filed on May 17, 2013; No. 61/752,725, 61/752,731, and 61/752,733, all filed on Jan. 15, 2013; No. 61/791,204, filed on Mar. 15, 2013; No. 61/808,959 and 61/808,984, both filed on Apr. 5, 2013; and No. 61/872,538, filed on Aug. 30, 2013 and is a Continuation-in-Part of U.S. patent application Ser. No. 14/154,730, filed Jan. 14, 2014.

FIELD OF THE TECHNOLOGY DISCLOSED

Embodiments relate generally to machine-user interfaces, and more specifically to the interpretation of free-space user movements as control inputs.

BACKGROUND

Current computer systems typically include a graphic user interface that can be navigated by a cursor, i.e., a graphic element displayed on the screen and movable relative to other screen content, and which serves to indicate a position on the screen. The cursor is usually controlled by the user via a computer mouse or touch pad. In some systems, the screen itself doubles as an input device, allowing the user to select and manipulate graphic user interface components by touching the screen where they are located. While touch may be convenient and relatively intuitive for many users, touch is not that accurate. Fingers are fat. The user's fingers can easily cover multiple links on a crowded display leading to erroneous selection. Touch is also unforgiving—it requires the user's motions to be confined to specific areas of space. For example, move one's hand merely one key-width to the right or left and type. Nonsense appears on the screen.

Mice, touch pads, and touch screens can be cumbersome and inconvenient to use. Touch pads and touch screens require the user to be in close physical proximity to the pad (which is often integrated into a keyboard) or screen so as to be able to reach them, which significantly restricts users' range of motion while providing input to the system. Touch is, moreover, not always reliably detected, sometimes necessitating repeated motions across the pad or screen to effect the input. Mice facilitate user input at some distance from the computer and screen (determined by the length of the connection cable or the range of the wireless connection between computer and mouse), but require a flat surface with suitable surface properties, or even a special mouse pad, to function properly. Furthermore, prolonged use of a mouse, in particular if it is positioned sub-optimally relative to the user, can result in discomfort or even pain.

Accordingly, alternative input mechanisms that provide users with the advantages of intuitive controls but free the user from the many disadvantages of touch based control are highly desirable.

SUMMARY

Aspects of the system and methods described herein provide for improved machine interface and/or control by interpreting the positions, configurations, and/or motions of one or more control objects (or portions thereof) in free space within a field of view of an image-capture device. The control object(s) may be or include a user's body part(s) such as, e.g., the user's hand(s), finger(s), thumb(s), head, etc.; a suitable hand-held pointing device such as a stylus, wand, or some other inanimate object; or generally any animate or inanimate object or object portion (or combinations thereof) manipulated by the user for the purpose of conveying information to the machine. In various embodiments, the shapes, positions, and configurations of one or more control objects are reconstructed in three dimensions (e.g., based on a collection of two-dimensional images corresponding to a set of cross-sections of the object), and tracked as a function of time to discern motion. The shape, configuration, position(s), and motion(s) of the control object(s), when constituting user input to the machine, are herein referred to as "gestures."

In embodiments, the position, orientation, and/or motion of one or more control objects are tracked relative to one or more virtual control constructs (e.g., virtual control surfaces) defined in space (e.g., programmatically) to facilitate determining whether an engagement gesture has occurred. Engagement gestures can include engaging with a control (e.g., selecting a button or switch), disengaging with a control (e.g., releasing a button or switch), motions that do not involve engagement with any control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Engagement gestures can be mapped to one or more controls of a machine or application executing on a machine, or a control-less screen location, of a display device associated with the machine under control. Embodiments provide for mapping of movements in three-dimensional (3D) space conveying control and/or other information to zero, one, or more controls. Controls can include imbedded controls (e.g., sliders, buttons, and other control objects in an application) or environmental-level controls (e.g., windowing controls, scrolls within a window, and other controls affecting the control environment). In embodiments, controls may be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations may also be audible (e.g., mapped to sounds, or other mechanisms for conveying audible information) and/or haptic.

In an embodiment, determining whether motion information defines an engagement gesture can include finding an intersection (also referred to as a contact, pierce, or a "virtual touch") of motion of a control object with a virtual control surface, whether actually detected or determined to be imminent; dis-intersection (also referred to as a "pull back" or "withdrawal") of the control object with a virtual control surface; a non-intersection—i.e., motion relative to a virtual control surface (e.g., wave of a hand approximately parallel to the virtual surface to "erase" a virtual chalk board); or other types of identified motions relative to the virtual control surface suited to defining gestures conveying information to the machine. In an embodiment, determining whether motion information defines an engagement gesture can include determining one or more engagement attributes from the motion information about the control object. In an embodiment, engagement attributes include motion attributes (e.g., speed, acceleration, duration, distance, etc.), gesture attributes (e.g., hand, two hands, tools, type, precision, etc.), other attributes and/or combinations thereof. In an embodiment, determining whether motion information defines an engagement gesture can include filtering motion information to determine whether motion comprises an engagement gesture. Filtering may be applied based upon engagement attributes, characteristics of motion, position in space, other criteria, and/or combinations thereof. Filtering can enable identification of engagement gestures, discrimination of engagement gestures from extraneous motions, discrimination of engagement gestures of differing types or meanings, and so forth.

Various embodiments provide high detection sensitivity for the user's gestures to allow the user to accurately and quickly (i.e., without any unnecessary delay time) control an electronic device using gestures of a variety of types and sensitivities (e.g., motions of from a few millimeters to over a meter) and, in some embodiments, to control the relationship between the physical span of a gesture and the resulting displayed response. The user's intent may be identified by, for example, comparing the detected gesture against a set of gesture primitives or other definitions that can be stored in a database. Each gesture primitive relates to a detected characteristic or feature of one or more gestures. Primitives can be coded, for example, as one or more vectors, scalars, tensors, and so forth indicating information about an action, command or other input, which is processed by the currently running application—e.g., to invoke a corresponding instruction or instruction sequence, which is thereupon executed, or to provide a parameter value or other input data. Because some gesture-recognition embodiments can provide high detection sensitivity, fine distinctions such as relatively small movements, accelerations, decelerations, velocities, and combinations thereof of a user's body part (e.g., a finger) or other control object can be accurately detected and recognized, thereby allowing the user to accurately interact with an electronic device and/or the applications executed and/or displayed thereon using a comparatively rich vocabulary of gestures.

In some embodiments, the gesture-recognition system provides functionality for the user to statically or dynamically adjust the relationship between the user's actual motion and a resulting response, e.g., object movement displayed on the electronic device's screen. In static operation, the user manually sets this sensitivity level by manipulating a displayed slide switch or other icon using, for example, the gesture-recognition system described herein. In dynamic operation, the system automatically responds to the distance between the user and the device, the nature of the activity being displayed, the available physical space, and/or the user's own pattern of response (e.g., scaling the response based on the volume of space in which the user's gestures appear to be confined). For example, when limited space is available, the relationship may be adjusted, automatically or manually by the user, to a ratio smaller than one (e.g., 1:10), such that each unit (e.g., one millimeter) of the user's actual movement results in ten units (e.g., 10 pixels or 10 millimeters) of object movement displayed on the screen. Similarly, when the user is relatively close to the electronic device, the user may adjust (or the device, sensing the user's distance, may autonomously adjust) the relationship to a ratio larger than one (e.g., 10:1) to compensate. Accordingly, adjusting the ratio of the user's actual motion to the resulting action (e.g., object movement) displayed on the screen provides extra flexibility for the user to remotely command the electric device and/or control the virtual environment displayed thereon.

In some embodiments, the system enables or provides an on-screen indicator showing in real time the degree of gesture completion, providing feedback letting the user know when a particular action is accomplished (e.g., a control is selected or a certain control manipulation effected). For example, the gesture-recognition system may recognize the gesture by matching it to a database record that includes multiple images, each of which is associated with a degree (e.g., from 1% to 100%) of completion of the performed gesture. The degree of completion of the performed gesture is then rendered on the screen. For example, as the user moves a finger closer to an electronic device to perform a clicking or touching gesture, the device display may show a hollow circular icon that a rendering application gradually fills in with a color indicating how close the user's motion is to completing the gesture. When the user has fully performed the clicking or touching gesture, the circle is entirely filled in; this may result in, for example, labeling the desired virtual object as a chosen object. The degree-of-completion indicator thus enables the user to recognize the exact moment when the virtual object is selected.

Some embodiments discern, in real time, a dominant gesture from unrelated movements that may each qualify as a gesture, and may output a signal indicative of the dominant gesture. In various embodiments, the gesture-recognition system identifies a user's dominant gesture when more than one gesture (e.g., an arm-waving gesture and a finger-flexing gesture) is detected. For example, the gesture-recognition system may computationally represent the waving gesture as a waving trajectory and the finger-flexing gestures as five separate (and smaller) trajectories. Each trajectory may be converted into a vector along, for example, six Euler degrees of freedom in Euler space. The vector with the largest magnitude represents the dominant component of the motion (e.g., waving in this case) and the rest of vectors may be ignored. In some embodiments, a vector filter that can be implemented using conventional filtering techniques is applied to the multiple vectors to filter out the small vectors and identify the dominant vector. This process may be repetitive, iterating until one vector—the dominant component of the motion—is identified. The identified dominant component can then be used to manipulate the electronic device or the applications thereof.

Accordingly, in one aspect, embodiments provide a method of controlling a machine. The method includes sensing a variation of position of at least one control object using an imaging system; determining from the variation one or more primitives describing at least one of a motion made by the control object and the character of the control object; comparing the primitive(s) to one or more templates in a library of gesture templates; selecting from a result of the comparing a set of templates of possible gestures corresponding to the one or more primitives; and providing at least one of the set of templates of possible gestures as an indication of a command to issue to a machine under control responsive to the variation. The one or more control objects may include a body part of a user.

In some embodiments, sensing a variation of position of at least one control object using an imaging system comprises capturing a plurality of temporally sequential images of one or more control objects manipulated by the user. Determining from the variation one or more primitives describing a motion made by the control object and/or the character of the control object may involve computationally analyzing the images of the control object(s) to recognize a gesture primitive including at least a portion of a trajectory (trajectory portion) describing motion made by the control object. The analysis may include identifying a scale associated with the gesture primitive, the scale being indicative of an actual distance traversed by the control object; the scale may be identified, for instance, by comparing the recognized gesture with records in a gesture database, which may include a series of electronically stored records each relating a gesture to an input parameter. The gestures may be stored in the records as vectors. The analysis may further include computationally determining a ratio between the scale and a displayed movement corresponding to an action to be displayed on a presentation device. The action may then be displayed based on the ratio. The ratio may be adjusted based on an external parameter such as, e.g., the actual gesture distance, or the ratio of a pixel distance in the captured images corresponding to performance of the gesture to the size, in pixels, of the display screen. Analyzing the images of the control object(s) may also include identifying a shape and position of the control object(s) in the images, and reconstructing the position and the shape of the control object(s) in 3D space based on correlations between the identified shapes and positions of the control object(s) in the images. The method may also involve defining a 3D model of the control object(s), the position and shape of the control object(s) may be reconstructed in 3D space based on the 3D model. In some embodiments, analyzing the images of the control object(s) further includes temporally combining the reconstructed positions and shapes of the control object(s) in 3D space. In certain embodiments, determining from the variation one or more primitives describing a motion made by the control object and/or the character of the control object comprises determining a position or motion of the control object(s) relative to a virtual control construct.

Comparing the primitive(s) to one or more templates in a library of gesture templates may include disassembling at least a portion of a trajectory into a set of frequency components (e.g., by applying Fourier analysis to the trajectory portion as a signal over time to determine the set of frequency components), and searching for the set of frequency components among the template(s) stored in the library. Alternatively or additionally, comparing the primitive(s) to one or more templates in a library of gesture templates may include disassembling at least a portion of a trajectory into a set of frequency components, fitting a set of one or more functions to a set of frequency components representing at least a portion of a trajectory (e.g., fitting a Gaussian function to the set of frequency components), and searching for the set of functions among the template(s) stored in the library. In yet another alternative implementation, comparing the primitive(s) to one or more templates in a library of gesture templates may include disassembling at least a portion of a trajectory into a set of time dependent frequency components (e.g., by applying wavelet analysis to the trajectory portion as a signal over time), and searching for the set of time dependent frequency components among the template(s) stored in the library. In yet another embodiment, comparing the primitive(s) to one or more templates in a library of gesture templates includes distorting at least a portion of a trajectory based at least in part upon frequency of motion components, and searching for the distorted trajectory among the template(s) stored in the library.

In some embodiments, selecting from a result of the comparison a set of templates of possible gestures corresponding to the primitive(s) involves determining a similarity between the one or more primitives and the set of templates by applying at least one similarity determiner (such as a correlation, a convolution, and/or a dot product), and providing the similarity as an indication of quality of correspondence between the primitives and the set of templates. Selecting a set of templates may also include performing at least one of scaling and shifting to at least one of the primitives and the set of templates. Further, selecting a set of templates may involve disassembling at least a portion of a trajectory into a set of frequency components, filtering the set of frequency components to remove motions associated with jitter (e.g., by applying a Frenet-Serret filter), and searching for the filtered set of frequency components among the template(s) stored in the library.

In various embodiments, the method further includes computationally determining a degree of completion of at least one gesture, and modifying contents of a display in accordance with the determined degree of completion; the contents may include, e.g., an icon, a bar, a color gradient, or a color brightness. Further, the degree of completion may be compared to a threshold value, and a command to be performed upon the degree of completion may be indicated. Further, an action responsive to the gesture may be displayed based on the degree of gesture completion and in accordance with a physics simulation model and/or a motion model (which may be constructed, e.g., based on a simulated physical force, gravity, and/or a friction force).

In various embodiments, the method further includes computationally determining a dominant gesture (e.g., by filtering the plurality of gestures); and presenting an action on a presentation device based on the dominant gesture. For instance, each of the gestures may be computationally represented as a trajectory, and each trajectory may be computationally represented as a vector along six Euler degrees of freedom in Euler space, the vector having a largest magnitude being determined to be the dominant gesture.

In some embodiments, providing at least one of the set of templates of possible gestures as an indication of a command to issue to a machine under control responsive to the variation comprises filtering one or more gestures based at least in part upon one or more characteristics to determine a set of gestures of interest, and providing the set of gestures of interest (e.g., via an API). The characteristics may include the configuration, shape, and/or position of an object making the gesture. Gestures may be associated with primitives in a data structure.

In some embodiments, providing at least one of the set of templates of possible gestures as an indication of a command to issue to a machine under control responsive to the variation further includes detecting a conflict between a template corresponding to a user-defined gesture and a template corresponding to a predetermined gesture; and applying a resolution determiner to resolve the conflict, e.g., by ignoring a predetermined gesture when the conflict is between a predetermined gesture and a user-defined gesture and/or by providing the user-defined gesture when the conflict is between a predetermined gesture and a user-defined gesture.

In another aspect, embodiments relate to a system enabling dynamic user interactions with a device having a display screen. The system includes at least one camera oriented toward a field of view and at least one source to direct illumination onto at least one control object in the field of view. Further, the system includes a gesture database comprising a series of electronically stored records, each of the records relating a gesture to an input parameter, and an image analyzer coupled to the camera and the database. The image analyzer is generally any suitable combination of hardware and/or software for performing the functions of the methods described above (including, e.g., image analysis and gesture recognition). The image analyzer is configured to operate the camera to capture a plurality of temporally sequential images of the control object(s); analyze the images of the control object(s) to recognize a gesture performed by the user; compare the recognized gesture with records in the gesture database to identify an input parameter associated therewith, the input parameter corresponding to an action for display on the display screen in accordance with a ratio between an actual gesture distance traversed in performance of the gesture and a displayed movement corresponding to the action; and adjust the ratio based on an external parameter. The external parameter may be the actual gesture distance, or a ratio of a pixel distance in the captured images corresponding to performance of the gesture to a size, in pixels, of the display screen. The ratio may be local to each gesture and may be stored in each gesture record in the database, or the ratio may be global across all gestures in the gesture database.

The image analyzer may be further configured to (i) identify shapes and positions of the at least one control object in the images and (ii) reconstruct a position and a shape of the at least one control object in 3D space based on correlations between the identified shapes and positions of the at least one control object in the images. Further, the image analyzer may be configured to define a 3D model of the control object(s) and reconstruct the position and shape of the control object(s) in 3D space based on the 3D model, and/or to estimate a trajectory of the at least one control object in 3D space. In some embodiment, the image analyzer is further configured to determine a position or motion of the control object(s) relative to a virtual control construct.

In various embodiments, a system enabling dynamic user interactions with a device includes one or more cameras and sources (e.g., light sources or sonic source) for direct illumination (broadly understood, e.g., so as to include irradiation with ultrasound) of one or more control objects; a gesture database comprising a series of electronically stored records, each specifying a gesture; and an image analyzer coupled to the camera and the database and configured to operate the camera to capture a plurality of images of the control object(s); analyze the images to recognize a gesture; compare the recognized gesture records in a gesture database to identify the gesture; determine a degree of completion of the recognized gesture; and display an indicator (such as an icon, a bar, a color gradient, or a color brightness) on a screen of the device reflecting the determined degree of completion. The image analyzer may be further configured to determine whether the degree of completion is above a predetermined threshold value and, if so, to cause the device to take a completion-triggered action. Further, the image analyzer may be further configured to display an action responsive to the gesture in accordance with a physics simulation model and based on the degree of gesture completion. The displayed action may be further based on a motion model. The image analyzer may be further configured to determine a position or motion of the control object(s) relative to a virtual control construct.

In various embodiments, a system of controlling dynamic user interactions with a device one or more cameras and (e.g., light or sonic) sources for direct illumination (again, broadly understood) of one or more control object(s) manipulated by the user in the field of view; a gesture database comprising a series of electronically stored records each specifying a gesture; and an image analyzer coupled to the camera and the database and configured to operate the camera to capture a plurality of temporally sequential images of the control object(s), analyze the images of the at control object(s) to recognize a plurality of user gestures; determine a dominant gesture; and display an action on the device based on the dominant gesture.

The image analyzer may be further configured to determine the dominant gesture by filtering the plurality of gestures (e.g., iteratively), and/or to represent each of the gestures as a trajectory (e.g., as a vector along six Euler degrees of freedom in Euler space, whose largest magnitude may be determined by the dominant gesture). The image analyzer may be further configured to determine a position or motion of the at least one control object relative to a virtual control construct.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles disclosed herein. In the following description, various embodiments are described with reference to the following drawings, in which:

FIG. 5C-2 is a perspective view of a tablet incorporating a motion-capture device, illustrating free-space gesture control of the tablet in accordance with various embodiments;

FIGS. 8A, 8B, and 8B-1 are flow charts illustrating methods for machine and/or user interface control in accordance with various embodiments;

DETAILED DESCRIPTION

System and methods in accordance herewith generally utilize information about the motion of a control object, such as a user's finger or a stylus, in three-dimensional space to operate a user interface and/or components thereof based on the motion information. A "control object" as used herein with reference to an embodiment is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object may be used as well.

Various embodiments take advantage of motion-capture technology to track the motions of the control object in real time (or near real time, i.e., sufficiently fast that any residual lag between the control object and the system's response is unnoticeable or practically insignificant). Other embodiments may use synthetic motion data (e.g., generated by a computer game) or stored motion data (e.g., previously captured or generated). References to motions in "free space" or "touchless" motions are used herein with reference to an embodiment to distinguish motions tied to and/or requiring physical contact of the moving object with a physical surface to effect input; however, in some applications, the control object may contact a physical surface ancillary to providing input, in such case the motion is still considered a "free-space" motion. Further, in some embodiments, the motion is tracked and analyzed relative to a virtual control construct, such as a virtual surface, programmatically defined in space and not necessarily corresponding to a physical surface or object; intersection of the control object with that virtual control construct defines a "virtual touch." The virtual surface may, in some instances, be defined to co-reside with or be placed near a physical surface (e.g., a virtual touch screen may be created by defining a (substantially planar) virtual surface at or very near the screen of a display (e.g., television, monitor, or the like); or a virtual active table top may be created by defining a (substantially planar) virtual surface at or very near a table top convenient to the machine receiving the input).

Figure 1A:
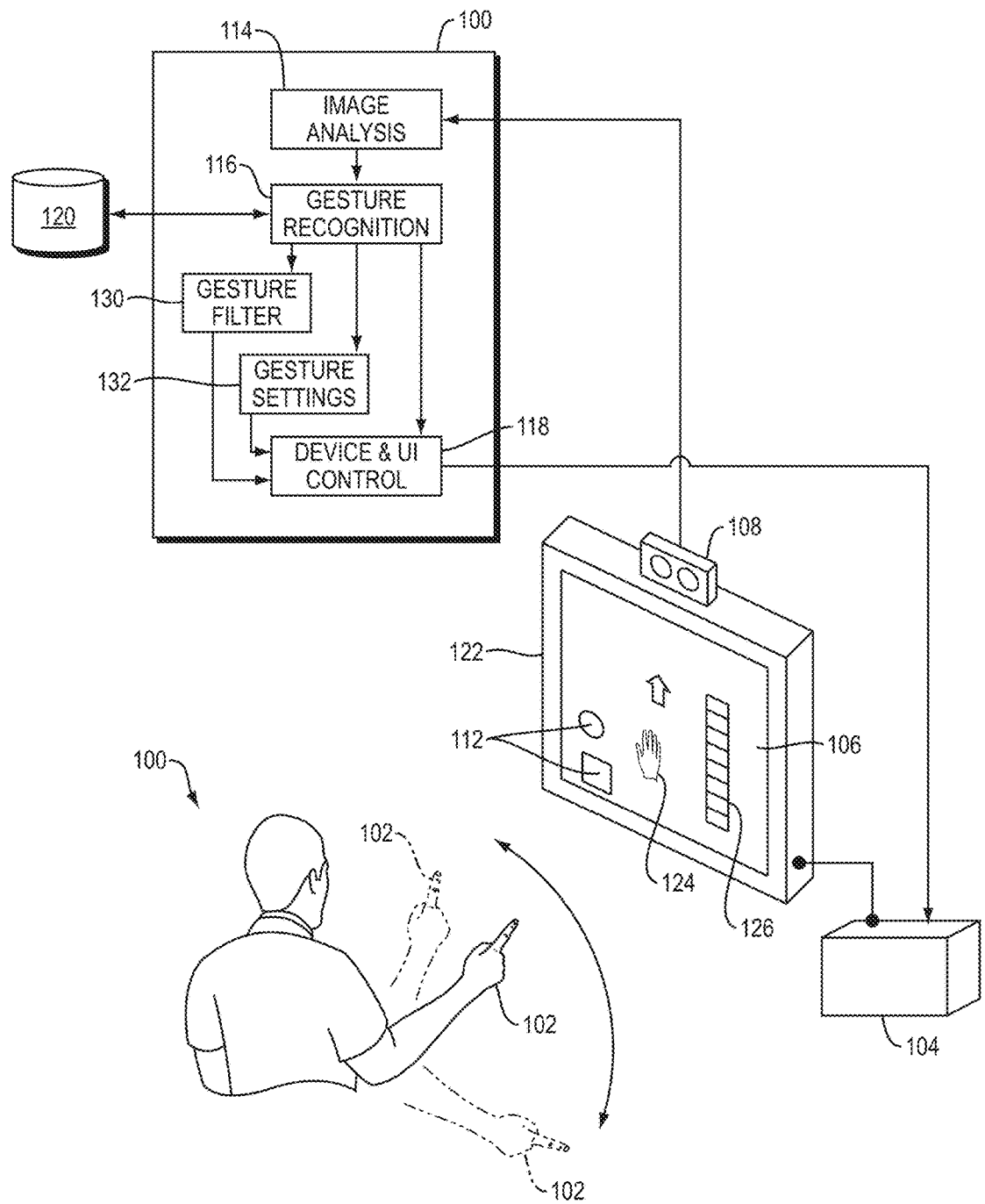
FIG. 1A depicts an exemplary scenario for gesture-based control of an electronic device in accordance with an embodiment.

FIG. 1A illustrates a gesture-recognition scenario in accordance herewith. A user 100 interacts, via hand motions (or motions of another control object 102), with an electronic device 104 and associated display 106. The user's gestures are captured by suitable motion-capture hardware 108, which may, for instance, include one or more cameras that acquire a stream of images of the hand within a camera field of view. A system 110 for gesture-based machine control, implemented, e.g., on a computer, may analyze the image stream to infer four-dimensional information about the three-dimensional shape, configuration, position, and orientation of the hand 102 (or other control object) and their evolution in time, and compute suitable control signals to the electronic device 104 based thereon. Meaningful control input thus detected generally causes a response action by the device 104 that is, typically, visually represented on the display 106. For example, the user may, via the gestures, manipulate controls or other virtual objects 112, such as prototypes/models, blocks, spheres, or other shapes, buttons, levers, cursors or other controls, in a virtual environment displayed on the device's screen 106, thereby remote interacting with the user interface of the device 104. Alternatively or additionally, the position and shape of the user's hand may be reconstructed and reproduced on the display screen 106.

In more detail, the system 110 may include an image-analysis module 114 that reconstructs the shapes and positions of the user's hand in 3D space and in real time; suitable systems and methods are described, e.g., U.S. Ser. Nos. 61/587,554, 13/414,485, and 61/724,091, filed on Jan. 17, 2012, Mar. 7, 2012, and Nov. 8, 2012, respectively, the entire disclosures of which are hereby incorporated by reference. Based on the reconstructed shape, configuration, position, and orientation of the control object as a function of time, object and motion attributes may be derived. For example, the configuration of the user's hand (or other control object) may be characterized by a three-dimensional surface model or simply the position of a few key points (e.g., the finger tips) or other key parameters; and the trajectory of a gesture may be characterized with one or more vectors and/or scaling parameters (e.g., a normalized vector from the start to the end point of the motion, a parameter indicating the overall scale of the motion, and a parameter indicating any rotation of the control object during the motion). Other parameters that can be associated with gesture primitives include an acceleration, a deceleration, a velocity, a rotational velocity, rotational acceleration, other parameters of motion, parameters of appearance of the control object such as color, apparent surface texture, temperature, other qualities or quantities capable of being sensed and/or various combinations thereof. In some embodiments, the raw motion data is filtered prior to ascertaining motion attributes, e.g., in order to eliminate unintended jitter.

A gesture-recognition module 116 takes the object and motion attributes, or other information from the image-analysis module, as input to identify gestures. In one embodiment, the gesture-recognition module 116 compares attributes of motion or character detected from imaging or sensing a control object to gestures of a library of gesture templates electronically stored in a database 120 (e.g., a relational database, an object-oriented database, or any other kind of database), which is implemented in the system 110, the electronic device 104, or on an external storage system. (As used herein, the term "electronically stored" includes storage in volatile or non-volatile storage, the latter including disks, Flash memory, etc., and extends to any computationally addressable storage media (including, for example, optical storage).) For example, gesture primitives may be stored as vectors, i.e., mathematically specified spatial trajectories, and the gesture information recorded may include the relevant part of the user's body making the gesture; thus, similar trajectories executed by a user's hand and head may be stored in the database as different gestures, so that an application can interpret them differently. In one embodiment, one or more components of trajectory information about a sensed gesture and potentially other gesture primitives—are mathematically compared against the stored trajectories to find potential matches from which a best match (or best matches) may be selected, and the gesture is recognized as corresponding to the located database entry based upon qualitative, statistical confidence factors or other quantitative criteria indicating a degree of match. For example, a confidence factor that exceeds a threshold can indicate a potential match.

Figure 1B:
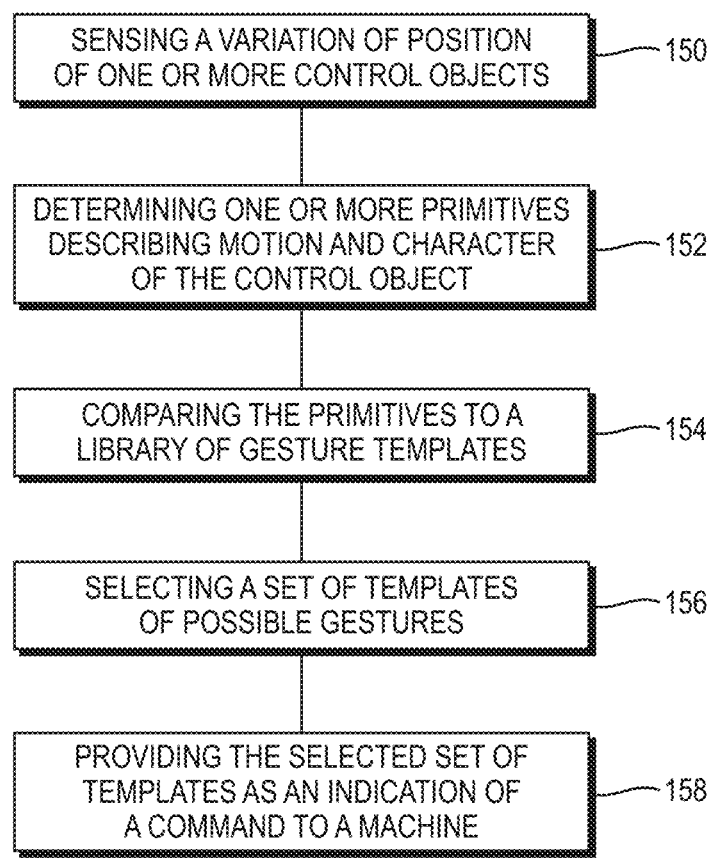
FIG. 1B is a flow chart illustrating a method for machine control in accordance with an embodiment.

Accordingly, as illustrated in FIG. 1B, a method of controlling a machine may involve sensing a variation of position of one or more control objects, e.g., by processing images acquired by motion-capture hardware 108 with an image-analysis module 104 (150). From the sensed variation, one or more primitives describing a motion and/or the character of the control object(s) may be determined (152), and the primitives may then be compared against one or more templates of a library (e.g., stored in a database 120) of gesture templates (154). From the result of the comparison, a set of templates of possible gestures corresponding to one or more primitives may be selected (156), and the selected set of templates may be provided as an indication of a command to be issued to a machine under control (such as, e.g., device 104) (158).

One technique for comparison (154) comprises dynamic time warping in which an observed trajectory information is temporally distorted and the distortions compared against stored gesture information (in a database for example). One type of distortion comprises frequency distortion in which the trajectory information is distorted for frequencies of motions to yield a set of distorted trajectories. The set of distorted trajectories can be searched for matches in the database. Such frequency distortions enable finding gestures made at different frequencies of motion than the template or templates stored in the database.

Another technique employs Fourier analysis to disassemble a portion of a trajectory (viewed as a signal over time) into frequency components. The set of frequencies can be searched for among the template(s) stored in the database.

A further technique employs wavelet analysis to disassemble a portion of a trajectory (viewed as a signal over time) into time dependent frequency components. The set of frequencies can be searched for among the template(s) stored in the database.

In a yet further embodiment, Gaussian (or other) functions can be fit to the set of frequencies representing the trajectory portion to form a set of Gaussian functions at the frequencies of the trajectory. The functions can be cepstra envelopes in some embodiments. The functions fit to the frequencies can be searched for among the template(s) stored in the database.

In a still yet further embodiments, techniques for finding similarity between two or more signal portions can facilitate locating template(s) in the database corresponding to the trajectory. For example, without limitation, correlation, convolution, sliding dot product, fixed dot product or combinations thereof can be determined from the trajectory information and one or more template(s) in the database to determine a quality of match.

Of course, frequency components may be scaled and/or shifted to facilitate finding appropriate templates in the database corresponding to the gesture(s) to be recognized. Further, in some embodiments, frequency filtering can be applied to frequency components to facilitate finding template(s) stored in the database. For example, filtering can be used to eliminate jitter from shaking hands by eliminating high frequency components from the trajectory spectrum. In an embodiment, trajectories can be smoothed by applying Frenet-Serret filtering techniques described in U.S. Provisional Application No. 61/856,976, filed on Jul. 22, 2013 and entitled "Filtering Motion Using Frenet-Serret Frames," the entire disclosure of which is hereby incorporated herein by reference.

In brief, as is known in the art, Frenet-Serret formulas describe the kinematic properties of a particle moving along a continuous, differentiable curve in 3D space. This representation of motion is better tailored to gestural movements than the conventional Cartesian (x,y,z) representation. Accordingly, embodiments convert captured motion from Cartesian space to Frenet-Serret space by attaching Frenet-Serret references frames to a plurality of locations on the control object's path. The Frenet-Serret frame consists of (i) a tangent unit vector (T) that is tangent to the path, (ii) a normal unit vector (N) that is the derivative of T with respect to an arclength parameter of the path divided by its length, and (iii) a binomial unit vector (B) that is the cross-product of T and N. Alternatively, the tangent vector may be determined by normalizing a velocity vector if it is known at a given location on the path. These unit vectors T, N, B collectively form the orthonormal basis of the Frenet-Serret frame in 3D space. The Frenet-Serret coordinate system is constantly rotating as the object traverses the path, and so may provide a more natural coordinate system for an object's trajectory than a strictly Cartesian system.

Once converted to Frenet-Serret space, the object's motions is filtered. The filtered data may then be converted back to Cartesian space or another desired reference frame. In one embodiment, filtering includes applying a smoothing filter to a set of sequential unit vectors corresponding to the tangent, normal, and/or binomial direction of the Frenet-Serret frame. To some filters, each unit vector is specified by one scalar value per dimension (i.e., by three scalar values in 3D) and filtered separately. The smoothing filter may be applied to each set of scalar values, and the direction of the vector may thereafter be reconstructed from its filtered values, and the other two vectors of the frame at each point may be recalculated accordingly. A 3D curve interpolation method may then be applied to generate a 3D curve that passes through the points in the given order, matching the filtered Frenet-Serret frame at each point and representing the object's path of motion.

In various alternative embodiments, noise filtering may be achieved by determining the rotation between consecutive Frenet-Serret frames along the path using the Frenet-Serret formulas describing curvature and torsion. The total rotation of the Frenet-Serret frame is the combination of the rotations of each of the three Frenet vectors described by the formulas $$\frac{dT}{ds} = \kappa N, \frac{dN}{ds} = -\kappa T + \tau B, \text{ and } \frac{dB}{ds} = -\tau N, \text{ where } \frac{d}{ds}$$

is the derivative with respect to arclength, $\kappa$ is the curvature, and $\tau$ is the torsion of the curve. The two scalars $\kappa$ and $\tau$ may define the curvature and torsion of a 3D curve, in that the curvature measures how sharply a curve is turning while torsion measures the extent of its twist in 3D space. Alternatively, the curvature and torsion parameters may be calculated directly from the derivative of best-fit curve functions (i.e., velocity) using, for example, the equations $$\kappa = \frac{|\vec{v} \times \vec{a}|}{|\vec{v}|^3} \text{ and } \tau = \frac{(\vec{v} \times \vec{a}) \cdot \vec{a}'}{|\vec{v} \times \vec{a}|^2}.$$

—The curvature and torsion parameters describing the twists and turns of the Frenet-Serret frames in 3D space may be filtered, and a smooth path depicting the object's motion may be constructed therefrom.

In some embodiments, additional filtering, modification or smoothing may be applied to the resulting path, e.g., utilizing the principles of an Euler spiral (or similar construct), to create aesthetically pleasing curves and transitions before converting the coordinates back to Cartesian coordinates. In one embodiment, the filtered Frenet-Serret path (with or without modification by, for example, application of the Euler spiral) may be used to better predict future motion of the object. By removing or reducing any noise, inconsistencies, or unintended motion in the path, the filtered path may better predict a user's intent in executing a gestural motion. The predicted future motion along the Frenet-Serret path is therefore based on past-detected motion and a kinematic estimate of the user's intent behind the motion.

Returning to the discussion of gestures stored in the database, gesture templates can comprise one or more frequencies, combinations of frequency and motion information and/or characteristics of control objects (e.g., apparent texture, color, size, combinations thereof). Templates can be created to embody one or more components from taught gestures using techniques described in U.S. Provisional Application No. 61/872,538, filed on Nov. 20, 2013 and entitled "Interactive Training Recognition of Free Space Gestures for Interface and Control," the entire disclosure of which is hereby incorporated herein by reference. In brief, a (typically computer-implemented) gesture training system may help application developers and/or end-users to define their own gestures and/or customize gestures to their needs and preferences—in other words, to go outside the realm of pre-programmed, or "canned," gestures. The gesture training system may interact with the user through normal language, e.g., a series of questions, to better define the action the user wants the system to be able to recognize. By answering these questions in a pre-described setup process, the user defines parameters and/or parameter ranges for the respective gesture, thereby resolving ambiguities. Advantageously, this approach affords reliable gesture recognition without the algorithmic complexity normally associated with the need for the computer to guess the answers; thus, it helps reduce software complexity and cost. In one embodiment, once the system has been trained to recognize a particular gesture or action, it may create an object (e.g., a file, data structure, etc.) for this gesture or action, facilitating recognition of the gesture or action thereafter. The object may be used by an application programming interface (API), and may be employed by both developers and non-developer users. In some embodiments, the data is shared or shareable between developers and non-developer users, facilitating collaboration and the like.

In some embodiment, gesture training is conversational, interactive, and dynamic; based on the responses the user gives, the next question, or the next parameter to be specified, may be selected. The questions may be presented to the user in visual or audio format, e.g., as text displayed on the computer screen or via speaker output. User responses may likewise be given in various modes, e.g., via text input through a keyboard, selection of graphic user-interface elements (e.g., using a mouse), voice commands, or, in some instances, via basic gestures that the system is already familiar to recognize. (For example, a "thumbs-up" or "thumbs-down" gesture may be used to answer any yes-no question.) Furthermore, as illustrated by way of example below, certain questions elicit an action—specifically, performance of an exemplary gesture (e.g., a typical gesture or the extremes of a range of gestures)—rather than a verbal response. In this case, the system may utilize, e.g., machine learning approaches, as are well-known to persons of skill in the art, to distill the relevant information from the camera images or video stream capturing the action.

In one embodiment, vector(s) or other mathematical constructs representing portions of gesture(s) may be scaled so that, for example, large and small arcs traced by a user's hand will be recognized as the same gesture (i.e., corresponding to the same database record) but the gesture recognition module will return both the identity and a value, reflecting the scaling, for the gesture. The scale may correspond to an actual gesture distance traversed in performance of the gesture, or may be normalized to some canonical distance. Comparison of a tracked motion against a gesture template stored in the library facilitates determining a degree of completion of the gesture (discussed in more detail below), and can enable some embodiments to provide increased accuracy with which detected motions are interpreted as control input.

In various embodiments, stored information about a gesture may contain an input parameter corresponding to the gesture (which may be scaled using the scaling value). If the gesture-recognition module 116 is implemented as part of a specific application (such as a game or controller logic for a television), the stored gesture information may also contain an input parameter corresponding to the gesture (which may be scaled using the scaling value); in some systems where the gesture-recognition module 116 is implemented as a utility available to multiple applications, this application-specific parameter is omitted: when an application invokes the gesture-recognition module 116, it interprets the identified gesture according in accordance with its own programming.

Figure 2:
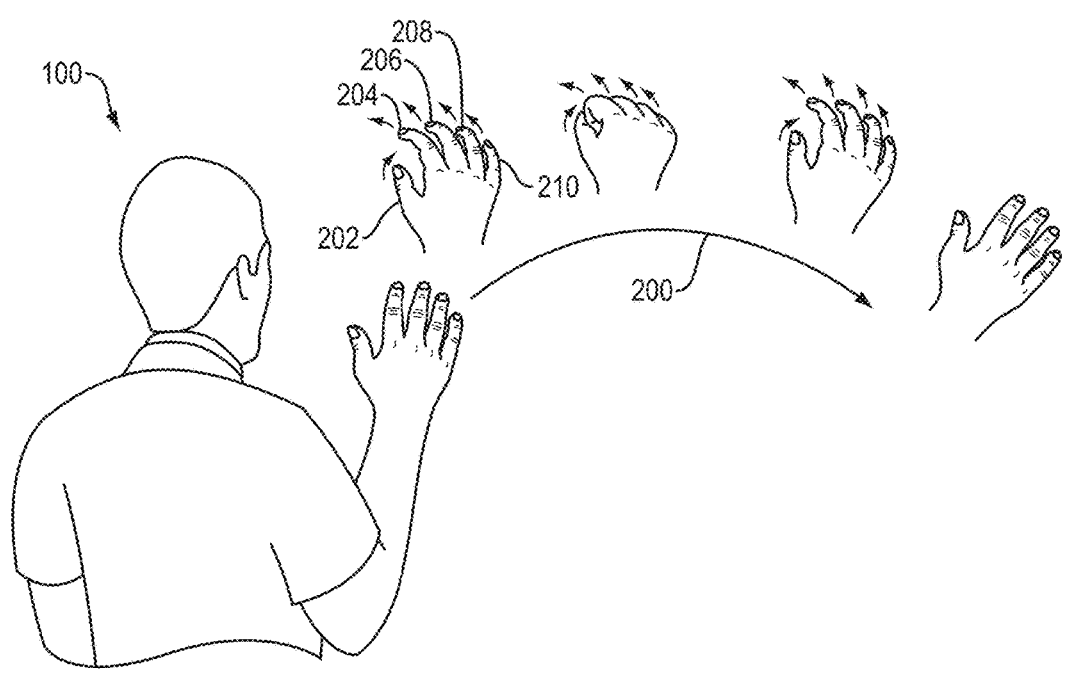
FIG. 2 illustrates the simultaneous execution of multiple gestures in accordance with an embodiment.

In some embodiments, the gesture-recognition module 116 detects more than one gesture. Referring to FIG. 2, for example, the user may perform an arm-waving gesture with fingers flexing. The gesture-recognition module 112 detects the waving and flexing gestures and records a waving trajectory 200 and five flexing trajectories 202, 204, 206, 208, 210 for the five fingers. Each trajectory may be converted into a vector along, for example, six Euler degrees of freedom (x, y, z, roll, pitch and yaw) in Euler space (or other mathematical formalism describing translation and rotation in space as a time series of rotations and translations of one or more points on the object. See e.g., Wikipedia "Euler Angles" (http://en.wikipedia.org/wiki/Euler_angles). The vector with the largest magnitude represents the dominant component of the motion (e.g., waving in this case) and the rest of vectors (e.g., corresponding to finger flexing) may be ignored. In one embodiment, a vector filter that can be implemented using any of a variety of filtering techniques is applied to the multiple vectors to filter out less relevant vectors, thereby enabling the dominant vector to be identified. This process may be repetitive, iterating until one vector—the dominant component of the motion—is identified. In some embodiments, a new filter is generated or initiated every time new gestures are detected. Alternatively to using simply the most prominent motion corresponding to the largest vector, gestures may be filtered based on context and/or predetermined classifications. For example, in application contexts where user input is based on subtle finger motions and configurations of the hand, such as virtual typing or manipulation of complex virtual controls, larger motions of the hand as a whole may be ignored. Thus, the user may, for instance, pace around the monitored region while gesturing, and the overall translational movement will have no effect on the input provided to the electronic device.

With renewed reference to FIG. 1A, the gestures identified by the gesture-recognition module 116 may be provided as input to a device and user-interface control module 118, which maps them to control signals. The control module 118 may be specific and/or customized to the electronic device 104 or application executed thereon, or provide standard signals via an application-programming-interface that are thereafter further interpreted by the electronic device 104. For example, the control module 118 may map gestures onto the control inputs available with a computer mouse (e.g., left-click, right-click, double-click, translation) or keyboard (i.e., the different keys), thus allowing mouse and/or keyboard operation to be emulated by free-space gestures. Of course, free-space gesture recognition in accordance herewith is not limited to traditional user-input actions, but facilitates defining entirely new and distinct actions (e.g., a "trigger-pulling" gesture, kicks and other gestures performed by body parts other than the hand, etc.) with associated special meanings and interpretations. Further, a gesture need not correspond to a particular discrete input, but may provide one or more input parameters along a continuum (e.g., an angle by which a virtual dial is to be rotated or a distance by which a cursor is to be moved). The control module 118 may also translate the gesture into a graphic representation thereof (e.g., a video stream showing the motions of a rendition of the control object 102) for display on the screen 106.

Gesture recognition and/or interpretation as control input may be context-dependent, i.e., the same motion may correspond to different control inputs, even for the same electronic device 104 under control, depending, e.g., on the application, application environment, window, or menu that is currently active; user settings and preferences; the presence or absence and the configuration or state of motion of one or more additional control objects; the motion relative to one or more virtual constructs (as discussed in detail below); and/or the recent history of control input. For example, a particular gesture performed with one hand may affect the interpretation of a gesture performed simultaneously with another hand; a finger swipe parallel to the screen may have different meanings in different operational modes as distinguished based on whether the finger pierces a virtual control surface; and a clicking gesture that normally causes selection of a virtual control may have a different effect if made during the course of a video game.

Of course, the functionality of the image-analysis module 114, gesture-recognition module 116, and device and user-interface control module 118 may be organized, grouped, and distributed among various devices and between the electronic device 104 and the gesture-based machine-control system 110 in many different ways, and the depiction of FIG. 1A is not to be understood as limiting. For example, the gesture-recognition module 116 may send signals indicative of the identified gesture (and, if applicable, a scaling parameter or other parameters associated with the gesture) directly to the electronic device 104, which may implement the user-interface control functionality. That is, the device 104 may treat the identified gesture and the scaling value as control input and assign an input parameter value (or values for multiple parameters) thereto; the input parameter(s) may then be used by applications executing on the electronic device 104, facilitating gesture-based user interactions therewith. In various embodiments, the system 100 and the device 104 are integrated in the same machine. For example, the device 104 may be a general-purpose computer, and the modules 114, 116, 118 may be implemented thereon as one or more software programs. Alternatively, part of the system's functionality may be integrated with the motion-capture hardware. A stand-alone device may, for instance, include both the cameras for capturing images and the computational facility for detecting, reconstructing, and tracking control objects based thereon, and raw data indicative of the detected motions may then be further processed and interpreted by a gesture-recognition module executing on a separate machine.

To further illustrate gesture-based machine control in accordance herewith, consider the following exemplary user interaction with an electronic device 104: To initiate communication with the electronic device 104, the user may first move a hand in a repetitive or distinctive way (e.g., performing a waving hand gesture). Upon detecting and recognizing this hand gesture, the gesture-recognition module 116 transmits a signal indicative thereof to the electronic device 104, which, in response, renders an appropriate display (e.g., a control panel 126). The user then performs another gesture (e.g., moving her hand in an "up" or "down" direction). The gesture-recognition module 116 detects and identifies the gesture and a scale associated therewith, and transmits this data to the electronic device 104; the device 104, in turn, interprets this information as an input parameter (as if the user had pressed a button on a remote control device) indicative of a desired action, enabling the user to manipulate the data displayed on the control panel 126 (such as selecting a channel of interest, adjusting the audio sound, or varying the brightness of the screen). In various embodiments, the device 104 connects to a source of video games (e.g., a video game console or CD or web-based video game); the user can perform various gestures to remotely interact with the virtual objects 112 in the virtual environment (video game). The detected gestures and scales are provided as input parameters to the currently running game, which interprets them and takes context-appropriate action, i.e., generates screen displays responsive to the gestures.

In various embodiments, after the user successfully initiates communications with the electronic device 104 via the gesture-based machine-control system 110, the system 110 generates a form of feedback (e.g., visual, aural, haptic or other sensory feedback or combinations thereof) for presentation on appropriate presentation mechanism(s). In the example embodiment illustrated by FIG. 1A, feedback comprises cursor 122 (e.g., an arrow, circle, cross hair, or other symbol) or graphic representation 124 (hereinafter also deemed encompassed with "cursor") of the detected body part (e.g., a hand) or other control object and displays it on the device's screen 106. In one embodiment, the system 110 coherently locks the movement of the cursor 122 on the screen 104 to follow the actual motion of the user's gesture. For example, when the user moves a hand 102 in the upward direction, the displayed cursor 122 also moves upward on the display screen 106 in response. As a result, the motion of the cursor 122 directly maps user gestures to displayed content such that, for example, the user's hand 102 and the cursor 122 behave like a PC mouse and a cursor on the monitor, respectively. This allows the user to evaluate the relationship between actual physical gesture movement and the resulting actions taking place on the screen 106, e.g., movement of virtual objects 112 displayed thereon. In mapping movements of the control object to cursor motions, the absolute position of the control object is not always important; rather, relative position and/or directions of movement may control the on-screen action (e.g., the movement of cursor 122). Such directions, however, are typically (although not necessarily) measured relative to the orientation of the screen 102 (e.g., such that movement to the right when facing the screen results in on-screen cursor movement to the right). Further, in some embodiments, the user can control the position of a cursor and/or other object on the screen by pointing directly at the desired screen location, e.g., with an index finger.

Thus, mapping movements of the control object to those of the cursor on-screen can be accomplished in different ways. In some embodiments, the position and orientation of the control object—e.g., a stretched-out index finger—relative to the screen are used to compute the intersection of a straight line through the axis of the finger with the screen, and a cursor symbol is displayed at the point of intersection. If the range of motion causes the intersection point to move outside the boundaries of the screen, the intersection with a (virtual) plane through the screen may be used, and the cursor motions may be re-scaled or translated, relative to the finger motions, to remain within the screen boundaries. Alternatively to extrapolating the finger towards the screen, the position of the finger (or control object) tip may be projected perpendicularly onto the screen; in this embodiment, the control object orientation may be disregarded. As will be readily apparent to one of skill in the art, many other ways of mapping the control object position and/or orientation onto a screen location may, in principle, be used; a particular mapping may be selected based on considerations such as, without limitation, the requisite amount of information about the control object, the intuitiveness of the mapping to the user, and the complexity of the computation. For example, in some embodiments, the mapping is based on intersections with or projections onto a (virtual) plane defined relative to the camera or other image-capture hardware, under the assumption that the screen is located within that plane (which is correct, at least approximately, if the camera is correctly aligned relative to the screen), whereas, in other embodiments, the screen location relative to the camera is established via explicit calibration (e.g., based on camera images including the screen).

Figure 3A:
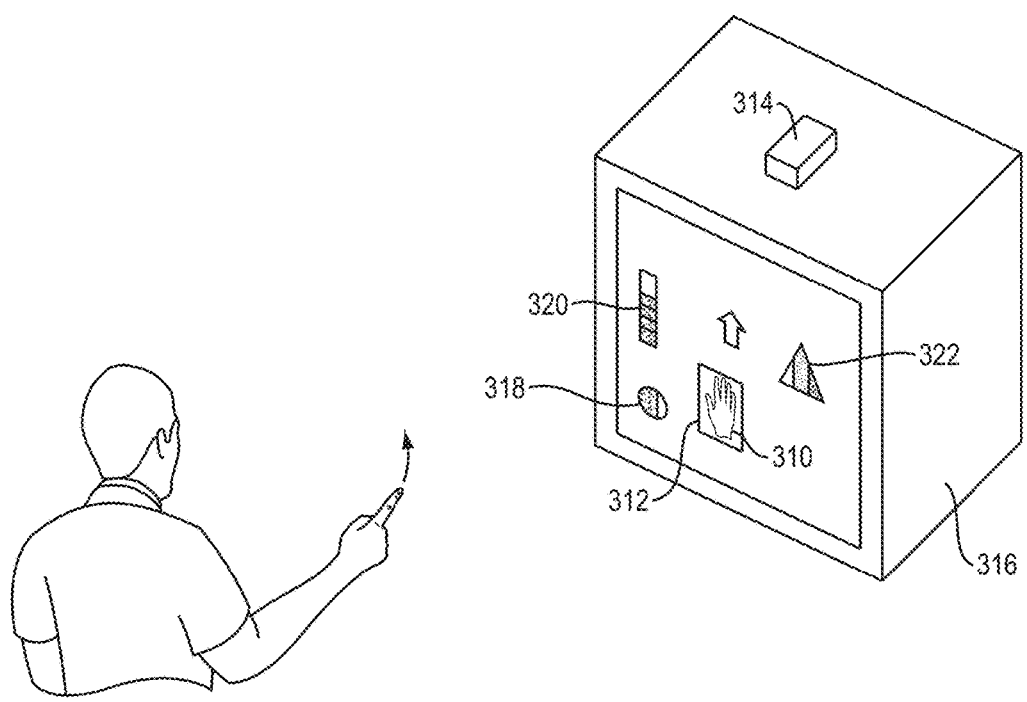
FIGS. 3A and 3B depict on-screen indicators reflecting a degree of completion of the user's gesture in accordance with an embodiment.

In various embodiments, certain gestures have an associated threshold of completion that needs to be exceeded before the gesture is recognized as such; this completion requirement may serve to enhance the reliability of gesture recognition, in particular, the elimination of false positives in gesture detection. As an example, consider the selection by the user of an on-screen virtual object, using a "finger click" in free space. With reference to FIG. 3A, the user may first move the displayed cursor 310, via suitable hand motions or other gestures, to a screen position where it at least partially overlaps with a displayed virtual object 312 of interest. Thereafter, the user may perform another gesture, e.g., "finger clicking," to select the desired object 312. To label the object 312 as a user-selected object, the finger motion may be required to satisfy a predetermined threshold (e.g., 95%) of completion of the gesture; this value may be stored in the database 120 or implemented by the application currently running on the electronic device 316. For example, a completion of a "clicking" gesture may require the user's finger to move a distance of five centimeters; upon detecting a finger movement of one centimeter, the gesture-recognition system 314 (which may include, e.g., suitable motion-capture hardware 108 for acquiring images and an associated computational system 110 for processing the images) recognizes the gesture by matching it to a database record, and determines a degree (in this case, 20%) of completion of the recognized gesture. In one embodiment, each gesture in the database includes multiple images or vectors each of which is associated with a degree (e.g., from 1% to 100%) of completion of the performed gesture; in other embodiments, the degree of completion is computed by interpolation or simple comparison of the observed vector to the stored vector.

The degree of completion of the performed gesture (e.g., how much the user has moved her finger or hand) may be rendered on the screen, and indeed, the assessment of gestural completion may be handled by the rendering application running on the device 316 rather than by the gesture-recognition system 314. For example, the electronic device 316 may display a hollow circular icon 318 that the rendering application gradually fills in with a color or multiple colors as the device receives simple motion (position-change) signals from the gesture-recognition system 314 as the user moves a finger closer to the device 316, while performing a clicking or "touching" gesture. The degree to which the circle is filled indicates how close the user's motion is to completing the gesture (or how far the user's finger has moved away from its original location). When the user fully performs the clicking or touching gesture, the circle is entirely filled in; this may result in, for example, labeling the virtual object 312 as a chosen object.

In some embodiments, the device temporarily displays a second indication (e.g., changing the shape, color or brightness of the indicator) to confirm the object selection. The indication of the degree of gesture completion and/or the confirming indication of object selection thus enable the user to easily predict the exact moment when the virtual object is selected; accordingly, the user can subsequently manipulate the selected object on-screen in an intuitive fashion. Although the discussion herein focuses on filling of the hollow circle 318, embodiments can include virtually any type of representation displayed on the screen that can indicate the completion of the performed gesture. For example, a hollow bar 320 progressively filled in by color, a gradient of color 322, the brightness of a color or any suitable indicator may be used to illustrate a degree of gesture completion performed by the user.

The gesture-recognition system 314 detects and identifies the user's gestures based on the shapes and positions of the gesturing part of the user's body in the captured 2D images. A 3D image of the gesture can be reconstructed by analyzing the temporal correlations of the identified shapes and positions of the user's gesturing body part in consecutively acquired images. Because the reconstructed 3D image can accurately detect and recognize all types of gestures (e.g., moving a finger a distance of less than one centimeter to greater than a meter) in real time, embodiments of the gesture-recognition system 314 provides high detection sensitivity as well as selectivity. In various embodiments, once the gesture is recognized and the instruction associated therewith is identified, the gesture-recognition system 314 transmits signals to the device 316 to activate an on-screen indicator displaying a degree of completion of the user's gesture. The on-screen indicator provides feedback that allows the user to control the electronic device 316 and/or manipulate the displayed virtual objects 312 using various degrees of movement. For example, the user gesture may be as large as a body length jump or as small as a finger clicking.

In one embodiment, once the object 312 is labeled as a chosen object, the gesture-recognition system 314 locks the object 312 together with the cursor 310 on the screen to reflect the user's subsequently performed movement. For example, when the user moves a hand in the downward direction, the displayed cursor 310 and the selected virtual object 312 also move downward together on the display screen in response. Again, this allows the user to accurately manipulate the virtual objects 312 in the virtual environment.

Figure 3B:
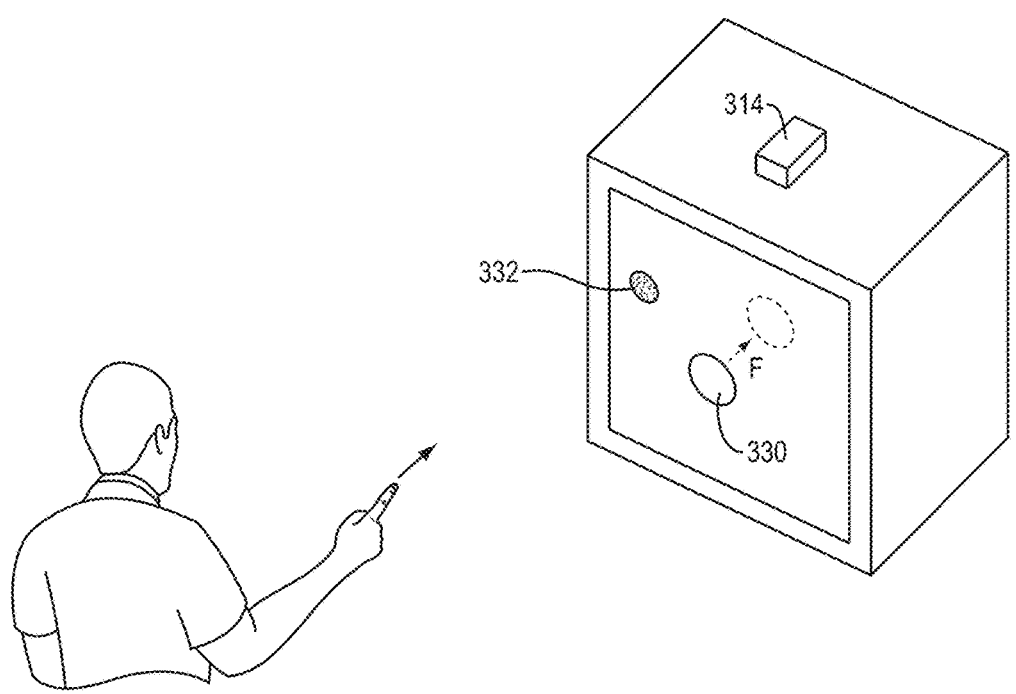

In another embodiment, when a virtual object is labeled as a chosen item, the user's subsequent movement is converted computationally to a simulated physical force applied to the selected object. Referring to FIG. 3B, the user may, for example, first move one finger forward for a distance of one centimeter to complete the selection of the virtual object 330; this selection can be confirmed by the hollow circle 332 displayed on the screen being entirely filled in. The user may then move the finger forward for another centimeter. Upon detecting such movement, the gesture-recognition system 314 may convert the motion to a simulated force; the force may be converted based on a conventional physics simulation model, the degree of body movement, the mass and moving velocity of the body part, gravity, and/or any other relevant parameters. The application running on the device 316, which generates the virtual object 330, responds to the force data by rendering the simulated behavior of the virtual object 330 under the influence of the force, e.g., as computed based on a motion model which includes the Newtonian physical principles. For example, if the user's movement is relatively small within a predetermined range (e.g., less than one centimeter) and/or relatively slow, the converted force deforms the shape of the selected object 330; if, however, the user's movement exceeds the determined range (i.e., more than 10 centimeters) or a threshold velocity, the device 316 treats the converted force as large enough (i.e., larger than the simulated static friction force) to move the selected object 330. The motion of the object 330 in response to such push forces is simulated by the rendering application of the device 316 based on the motion model; the position of the object on the screen is then updated to reflect such motion. The rendering application may take other actions with respect to the virtual object 330, e.g., stretching, bending, or operating mechanical controls over buttons, levers, hinges, handles, etc. As a result, the simulated force replicates the effect of equivalent forces in the real world and makes the interaction predictable and realistic for the user.

It should be stressed that the foregoing functional division between the gesture-recognition system 314 and the rendering application running on the device 316 is exemplary only; in some embodiments the two entities are more tightly coupled or even unified so that, rather than simply passing generic force data to the application, the gesture-recognition system 314 has world knowledge of the environment as rendered on the device 316. In this way, the gesture-recognition system 314 can apply object-specific knowledge (e.g., friction forces and inertia) to the force data so that the physical effects of user movements on the rendered objects are computed directly (rather than based on generic force data generated by the gesture-recognition system 314 and processed on an object-by-object basis by the device 316). Moreover, in various embodiments, the motion-capture and gesture-recognition functionality is implemented on the device 316, e.g., as a separate application that provides gesture information to the rendering application (such as a game) running on the device 316, or, as discussed above, as a module integrated within the rendering application (e.g., a game application may be provided with suitable motion-capture and gesture-recognition functionality). The division of computational responsibility between different hardware devices as well as between hardware and software represents a design choice.

Figure 3C:
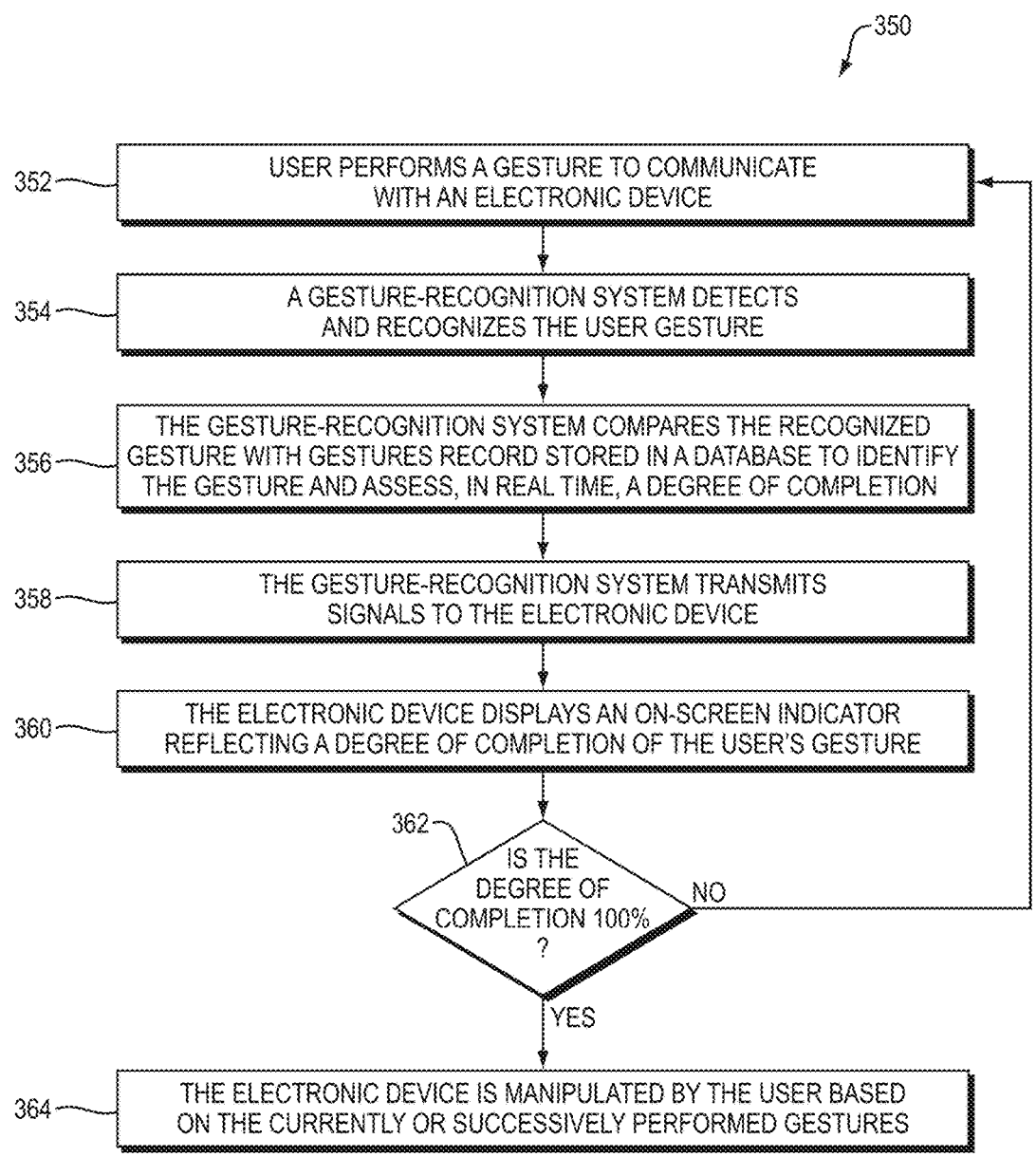
FIG. 3C is a flow chart illustrating a method of predicting when the virtual object is selected by a user and subsequently timely manipulating the selected object in accordance with an embodiment.

A representative method 350 for supporting a user's interaction with an electronic device by means of free-space gestures, and particularly to monitor the degree of gesture completion so that on-screen action can be deferred until the gesture is finished, is shown in FIG. 3C. The user first initiates communications with an electronic device by performing a gesture (352). This gesture is detected by a motion-capture device and associate gesture-based machine-control system (354). The gesture-recognition module of the system compares the recognized gesture with gesture records stored in a database, both to identify the gesture and to assess, in real time, a degree of completion (356). The system then transmits signals to the electronic device (358). (As noted earlier, the degree-of-completion functionality may be implemented on the device rather than by the gesture-recognition module, with the latter system merely providing movement-tracking data.) Based on the signals, the electronic device displays an on-screen indicator reflecting a degree of completion of the user's gesture (360). If the degree of completion is above a threshold value (e.g., 95%), the electronic device and/or the virtual objects displayed on the screen are then timely manipulated by the user based on the current gesture and/or subsequently performed gestures (362, 364).

Figure 4A:
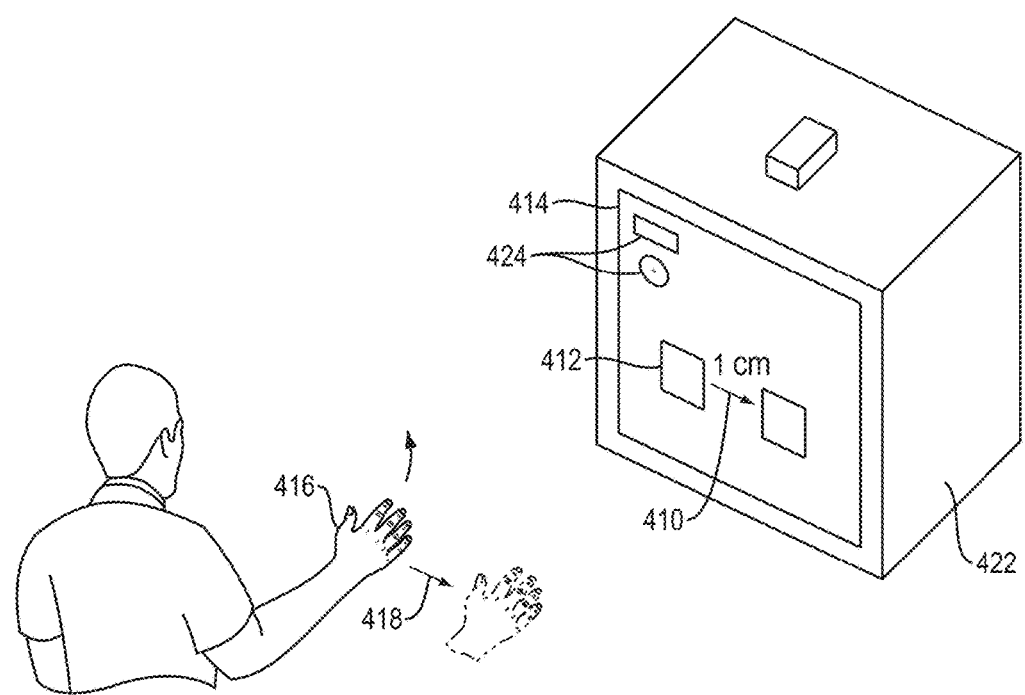
FIGS. 4A and 4B illustrate a dynamic adjustment of a relationship between the user's actual movements and the resulting action displayed on the screen in accordance with an embodiment.

Referring to FIG. 4A, in one embodiment, the displayed motion 410 of the object 412 on the screen 414 is determined based on the absolute spatial displacement associated with the user's actual movement. For example, the user may first slide his hand 416 to the right by one centimeter (as indicated by the arrow 418). Upon detecting and recognizing this hand gesture, the gesture-recognition module transmits a signal to the electronic device 422 indicative of the movement; the device 422 interprets this signal as an input parameter and, in response, takes action to move (i.e., to render as moving) the cursor or virtual object 412 in the same direction by, for example, one hundred pixels on the screen 414. The relationship between the user's physical movement and the rendered movement can be set by the user by, for example, altering the scaling factor stored by the gesture-recognition module (e.g., in the database) for the associated gesture. If the gesture-recognition module is integrated with a rendering application, the user can make this change with gestures. For example, the user may specify a larger on-screen movement (i.e., a movement traversing a large number of pixels) of the cursor or object 412 in response to a given hand movement. To do so, the user may first activate a ratio control panel 424 displayed on the screen by performing a distinct gesture. The control panel 424 may be rendered, for example, as a slide bar, a circular scale, or in any other suitable form. The user subsequently performs another gesture, suited to the type of the scale control panel 424, to adjust the ratio. For example, if the scale control panel is a slide bar, the user slides her finger to vary the ratio. In another embodiment, no scale control panel is displayed on the screen; the ratio is, instead, adjusted based on the user's subsequent gestures. For example, the user may increase the scale ratio by opening her fist or moving her thumb and index finger apart and reduce the scale ratio by closing her fist or moving her index finger towards the thumb. Although the discussion herein focuses on hand or finger gestures for purposes of illustration, embodiments can process virtually any gesture performed by any particular part of the human body. Any suitable gesture for communications between the user and the electronic device may be used.

In still other embodiments, the ratio adjustment is achieved using a conventional remote-control device, which the user controls by pushing buttons, or using a wireless device such as a tablet or smart phone. A different scaling ratio may be associated with each gesture and stored in association therewith e.g., as part of the specific gesture record in the database (i.e., the scaling ration may be local and potentially differ between gestures). Alternatively, the scaling ratio may be applicable to several or all gestures stored in the gesture database (i.e., the scaling ratio may be global and shared among several or all of the gestures).

Figure 4B:
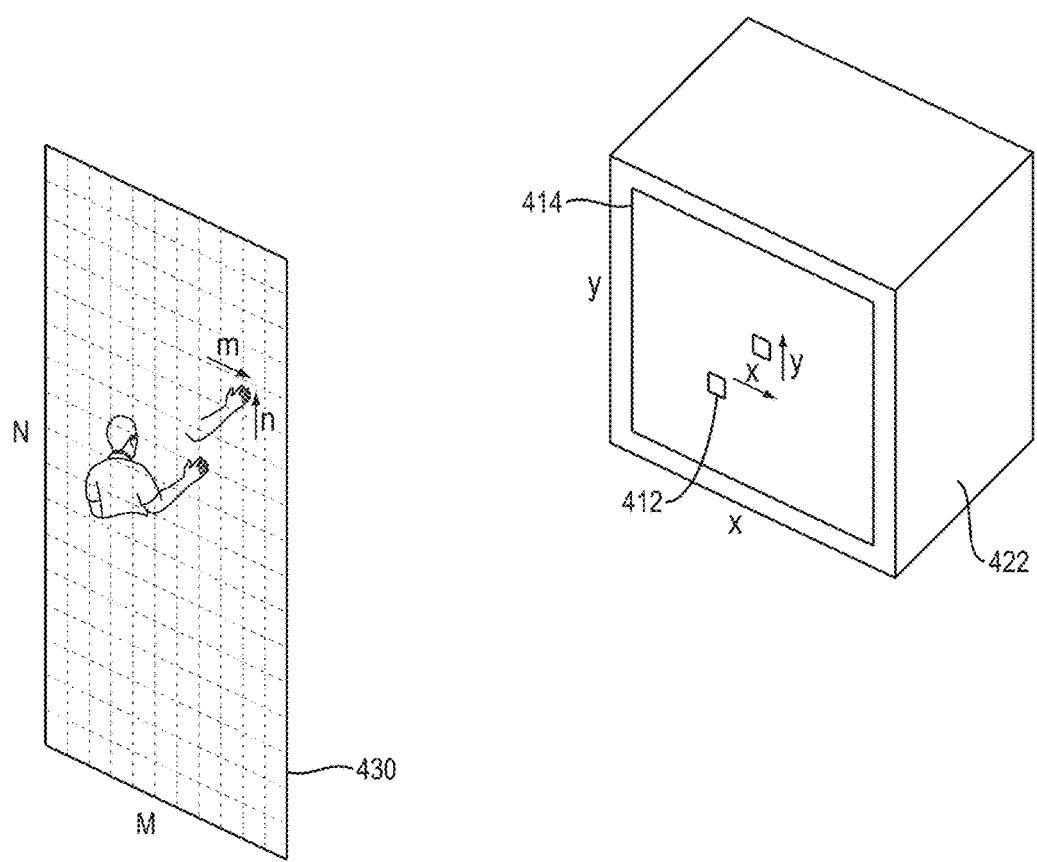

Alternatively, the relationship between physical and on-screen movements may be determined, at least in part, based on the characteristics of the display and/or the rendered environment. For example, with reference to FIG. 4B, the acquired (camera) image 430 may be stored as a matrix of M×N pixels, each specifying the detected light intensity or brightness, and the (rendered) frame of the display screen of the electronic device 422 may have X×Y pixels. When the user makes a hand-waving gesture 420 that results in a horizontal displacement by m pixels and a vertical displacement by n pixels in the camera images, the relative horizontal and vertical displacements are set as m/M, n/N, respectively, for scaling purposes. In response to this hand gesture, the cursor or object 412 on the display screen 414 may be moved by x pixels horizontally and by y pixels vertically, where x and y are determined as x=m/M×X, y=n/N×Y, respectively, in the simplest case. But even to display essentially unitary (1:1) scaling adjusted for the relative sizes of the user's environment and the display screen, account is generally taken of the camera position and distance from the user, focal length, resolution of the image sensor, viewing angle, etc., and as a result the quantities x and y are multiplied by a constant that results in an essentially affine mapping from "user space" to the rendered image. Once again, the constant may be adjusted to amplify or decrease on-screen movement responsiveness. Such rendition of user interactions with the virtual object 412 on the display screen may provide the user with a realistic feeling while she moves the object in the virtual environment.

The scaling relationship between the user's actual movement and the resulting action taking place on the display screen may result in performance challenges, especially when limited space is available to the user. For example, when two family members sit together on a couch playing a video game displayed on a TV, each user's effective range of motion is limited by the presence of the other user. Accordingly, the scaling factor may be altered to reflect a restricted range of motion, so that small physical movements correspond to larger on-screen movements. This can take place automatically upon detection, by the machine-control system, of multiple adjacent users. The scaling ratio may also depend, in various embodiments, on the rendered content of the screen. For example, in a busy rendered environment with many objects, a small scaling ratio may be desired to allow the user to navigate with precision; whereas for simpler or more open environments, such as where the user pretends to throw a ball or swing a golf club and the detected action is rendered on the screen, a large scaling ratio may be preferred.

As noted above, the proper relationship between the user's movement and the corresponding motion displayed on the screen may depend on the user's position relative to the recording camera. For example, the ratio of the user's actual movement m to the pixel size M in the captured image may depend on the viewing angle of the camera as well as the distance between the camera and the user. If the viewing angle is wide or the user is at a distance far away from the camera, the detected relative movement of the user's gesture (i.e., m/M) is smaller than it would be if the viewing angle was not so wide or the user was closer to the camera. Accordingly, in the former case, the virtual object moves too little on the display in response to a gesture, whereas in the latter case the virtual object moves too far. In various embodiments, the ratio of the user's actual movement to the corresponding movement displayed on the screen is automatically coarsely adjusted based on, for example, the distance between the user and the camera (which may be tracked by ranging); this allows the user to move toward or away from the camera without disrupting the intuitive feel that the user has acquired for the relationship between actual and rendered movements.

In various embodiments, when the gesture is recognized but the detected user movement is minuscule (i.e., below a predetermined threshold), the gesture-based machine-control system switches from a low-sensitivity detection mode to a high-sensitivity mode where a 3D image of the hand gesture is accurately reconstructed based on the acquired 2D images and/or a 3D model. Because the high-sensitivity system can accurately detect small movements (e.g., less than a few millimeters) performed by a small part of the body, e.g., a finger, the ratio of the user's actual movement to the resulting movement displayed on the screen may be adjusted within a large range, for example, between 1000:1 and 1:1000.

Figure 4C:
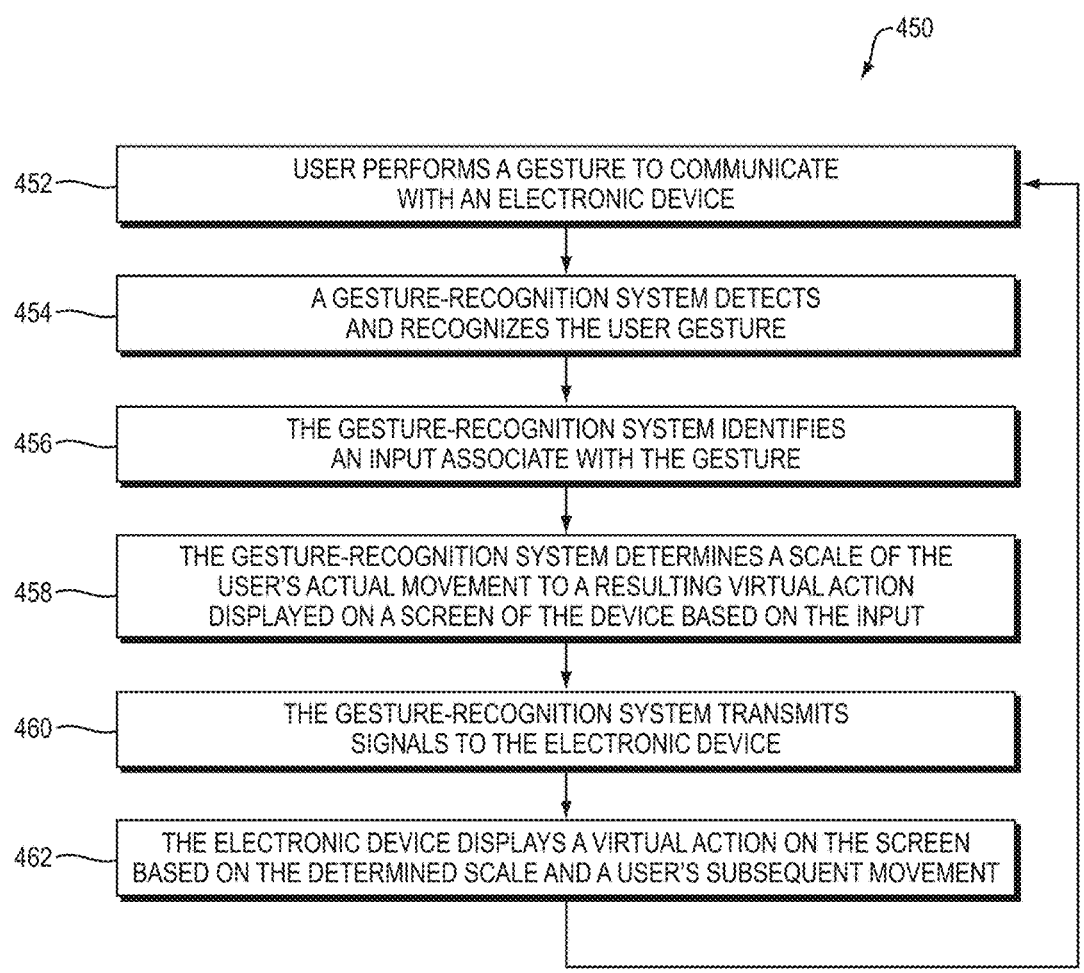
FIG. 4C is a flow chart illustrating a method of dynamically adjusting the relationship between a user's actual motion and the resulting object movement displayed on the electronic device's screen in accordance with an embodiment.

A representative method 450 for a user to dynamically adjust the relationship between her actual motion and the resulting object movement displayed on the electronic device's screen in accordance with embodiments is shown in FIG. 4C. First, the user initiates communications with an electronic device by performing a gesture (452). The gesture is detected and recognized by a motion-capture device and associated gesture-based machine control system (454). An instruction associated with the gesture is identified (e.g., by a gesture-recognition module of the system) by comparing the detected gesture with gestures stored in a database (456). Then, the ratio of the user's actual movement to a resulting virtual action displayed on the screen is determined based on the instruction (458). Signals indicative of the instruction are then transmitted to the electronic device (460). Finally, upon receiving the signals, the electronic device displays a virtual action on the screen based on the determined ratio and a user's subsequent movement (462).

As discussed above with respect to FIG. 1A and in more detail below with respect to FIGS. 9A and 9B, a gesture-recognition system (e.g., the system illustrated in FIG. 1A, which includes motion-capture hardware 108 and an associated computational system 110) captures images of an object, such as a hand 102, e.g., using one or more cameras; the object may be illuminated with one or more light sources 108, 110. An image-analysis module 114 detects the object in the images, and a gesture-recognition module 116 detects a gesture made using the object. Once detected, the gesture is input to an electronic device 104, which may use the gesture in a variety of ways (such as in manipulating a virtual object). Many different kinds of gestures may be detected, however, and an application running on the electronic device may not use or need every detected gesture. The sending of the unused gestures to the application may create unnecessary complexity in the application and/or consume unnecessary bandwidth over the link between the application and the gesture-recognition system.

In one embodiment, only a subset of the gestures captured by the gesture-recognition system is sent to the application running on the electronic device. The recognized gestures may be sent from the gesture-recognition module 116 to a gesture filter 130, as illustrated in FIG. 1A, and filtered based on one or more characteristics of the gestures. Gestures that pass the criteria of the filter 130 are sent to the application, and gestures that do not pass are not sent and/or deleted. The gesture filter 130 may be implemented as a separate program module, however this is not required; the functionality of the filter 130 may be wholly or partially incorporated into the gesture-recognition module 116. In various embodiments, the gesture-recognition module 116 recognizes all detected gestures regardless of the settings of the filter 130 or recognizes a subset of detected gestures in accordance with the settings of the filter 130.

The characteristics of the filter 130 may be defined to suit a particular application or group of applications. In various embodiments, the features may be received from a menu interface, read from a command file or configuration file, communicated via an API, or any other similar method. The filter 130 may include sets of preconfigured characteristics and allow a user or application to select one of the sets. Examples of filter characteristics include the path that a gesture makes (the filter 130 may pass gestures having only relatively straight paths, for example, and block gestures having curvilinear paths); the velocity of a gesture (the filter 130 may pass gestures having high velocities, for example, and block gestures having low velocities); and/or the direction of a gesture (the filter may pass gestures having left-right motions, for example, and block gestures having forward-back motions). Further filter characteristics may be based on the configuration, shape, or disposition of the object making the gesture; for example, the filter 130 may pass only gestures made using a hand pointing with a certain finger (e.g., a third finger), a hand making a fist, or an open hand. The filter 130 may further pass only gestures made using a thumbs-up or thumbs-down gesture, for example for a voting application.

The filtering performed by the filter 130 may be implemented in accordance with any method known in the art. In one embodiment, gestures detected by the gesture-recognition module 116 are assigned a set of one or more characteristics (e.g., velocity or path) and the gestures and characteristics are maintained in a data structure. The filter 130 detects which of the assigned characteristics meet its filter characteristics and passes the gestures associated with those characteristics. The gestures that pass the filter 130 may be returned to one or more applications via an API or via a similar method. The gestures may, instead or in addition, be displayed on the display 106 and/or shown in a menu (for, e.g., a live teaching IF application).

As described above, the gesture-recognition module 116 compares a detected motion of an object to a library of known gestures and, if there is a match, returns the matching gesture. In one embodiment, a user, programmer, application developer, or other person supplements, changes, or replaces the known gestures with user-defined gestures. If the gesture-recognition module 116 recognizes a user-defined gesture, it returns the gesture to one or more programs via an API (or similar method). In one embodiment, still with reference again to FIG. 1A, a gesture-settings module 132 screens motions for gestures based on an input of characteristics defining a gesture and returns a set of gestures having matching characteristics.

The user-defined characteristics may include any number of a variety of different attributes of a gesture. For example, the characteristics may include a path of a gesture (e.g., relatively straight, curvilinear; circle vs. swipe); parameters of a gesture (e.g., a minimum or maximum length); spatial properties of the gesture (e.g., a region of space in which the gesture occurs); temporal properties of the gesture (e.g., a minimum or maximum duration of the gesture); and/or a velocity of the gesture (e.g., a minimum or maximum velocity). Embodiments are not limited to only these attributes, however.

A conflict between a user-defined gesture and a predetermined gesture may be resolved in any number of ways. A programmer may, for example, specify that a predetermined gesture should be ignored. In another embodiment, a user-defined gesture is given precedence over a predetermined gesture such that, if a gesture matches both, the user-defined gesture is returned.

In various embodiments, gestures are interpreted based on their location and orientation relative to a virtual control construct. A "virtual control construct" as used herein with reference to an embodiment denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object intersects the virtual control construct. The virtual control construct, in turn, may be, e.g., a virtual surface construct (a plane oriented relative to a tracked orientation of the control object or an orientation of a screen displaying the user interface) or a point along a line or line segment extending from the tip of the control object. The term "intersect" is herein used broadly with reference to an embodiment to denote any instance in which the control object, which is an extended object, has at least one point in common with the virtual control construct and, in the case of an extended virtual control construct such as a line or two-dimensional surface, is not parallel thereto. This includes "touching" as an extreme case, but typically involves that portions of the control object fall on both sides of the virtual control construct.

In an embodiment and by way of example, one or more virtual control constructs can be defined computationally (e.g., programmatically using a computer or other intelligent machinery) based upon one or more geometric constructs to facilitate determining occurrence of engagement gestures from information about one or more control objects. Virtual control constructs in an embodiment can include virtual surface constructs, virtual linear or curvilinear constructs, virtual point constructs, virtual solid constructs, and complex virtual constructs comprising combinations thereof. Virtual surface constructs can comprise one or more surfaces, e.g., a plane, curved open surface, closed surface, bounded open surface, or generally any multi-dimensional virtual surface definable in two or three dimensions. Virtual linear or curvilinear constructs can comprise any one-dimensional virtual line, curve, line segment or curve segment definable in one, two, or three dimensions. Virtual point constructs can comprise any zero-dimensional virtual point definable in one, two, or three dimensions. Virtual solids can comprise one or more solids, e.g., spheres, cylinders, cubes, or generally any three-dimensional virtual solid definable in three dimensions.

In an embodiment, an engagement target can be defined using one or more virtual construct(s) coupled with a virtual control (e.g., slider, button, rotatable knob, or any graphical user interface component) for presentation to user(s) by a presentation system (e.g., displays, 3D projections, holographic presentation devices, non-visual presentation systems such as haptics, audio, and the like, any other devices for presenting information to users, or combinations thereof). Coupling a virtual control with a virtual construct enables the control object to "aim" for, or move relative to, the virtual control—and therefore the virtual control construct. Engagement targets in an embodiment can include engagement volumes, engagement surfaces, engagement lines, engagement points, or the like, as well as complex engagement targets comprising combinations thereof. An engagement target can be associated with an application or non-application (e.g., OS, systems software, etc.) so that virtual control managers (i.e., program routines, classes, objects, etc. that manage the virtual control) can trigger differences in interpretation of engagement gestures including presence, position and/or shape of control objects, control object motions, or combinations thereof to conduct machine control.

Engagement targets can be used to determine engagement gestures by providing the capability to discriminate between engagement and non-engagement (e.g., virtual touches, moves in relation to, and/or virtual pierces) of the engagement target by the control object. Thus, the user can, for example, operate a cursor in at least two modes: a disengaged mode in which it merely indicates a position on the screen, typically without otherwise affecting the screen content; and one or more engaged modes, which allow the user to manipulate the screen content. In the engaged mode, the user may, for example, drag graphical user-interface elements (such as icons representing files or applications, controls such as scroll bars, or displayed objects) across the screen, or draw or write on a virtual canvas. Further, transient operation in the engaged mode may be interpreted as a click event. Thus, operation in the engaged mode may correspond to, or emulate, touching a touch screen or touch pad, or controlling a mouse with a mouse button held down.

Different or additional operational modes may also be defined, and may go beyond the modes available with traditional contact-based user input devices. The disengaged mode may simulate contact with a virtual control, and/or a hover in which the control is selected but not actuated). Other modes useful in various embodiments include an "idle," in which no control is selected nor virtually touched, and a "lock," in which the last control to be engaged with remains engaged until disengaged. Yet further, hybrid modes can be created from the definitions of the foregoing modes in embodiments.

The term "cursor," as used in this discussion, refers generally to the cursor functionality rather than the visual element; in other words, the cursor is a control element operable to select a screen position—whether or not the control element is actually displayed and manipulate screen content via movement across the screen, i.e., changes in the selected position. The cursor need not always be visible in the engaged mode. In some instances, a cursor symbol still appears, e.g., overlaid onto another graphical element that is moved across the screen, whereas in other instances, cursor motion is implicit in the motion of other screen elements or in newly created screen content (such as a line that appears on the screen as the control object moves), obviating the need for a special symbol. In the disengaged mode, a cursor symbol is typically used to visualize the current cursor location. Alternatively or additionally, a screen element or portion presently co-located with the cursor (and thus the selected screen location) may change brightness, color, or some other property to indicate that it is being pointed at. However, in certain embodiments, the symbol or other visual indication of the cursor location may be omitted so that the user has to rely on his own observation of the control object relative to the screen to estimate the screen location pointed at. (For example, in a shooter game, the player may have the option to shoot with or without a "virtual sight" indicating a pointed-to screen location.)

In various embodiments, to trigger an engaged mode— corresponding to, e.g., touching an object or a virtual object displayed on a screen—the control object's motion toward an engagement target such as a virtual surface construct (i.e., a plane, plane portion, or other (non-planar or curved) surface computationally or programmatically defined in space, but not necessarily corresponding to any physical surface) may be tracked; the motion may be, e.g., a forward motion starting from a disengaged mode, or a backward retreating motion. When the control object reaches a spatial location corresponding to this virtual surface construct—i.e., when the control object intersects "touches" or "pierces" the virtual surface construct—the user interface (or a component thereof, such as a cursor, user-interface control, or user-interface environment) is operated in the engaged mode; as the control object retracts from the virtual surface construct, user-interface operation switches back to the disengaged mode.

In embodiments, the virtual surface construct may be fixed in space, e.g., relative to the screen; for example, it may be defined as a plane (or portion of a plane) parallel to and located several inches in front of the screen in one application, or as a curved surface defined in free space convenient to one or more users and optionally proximately to display(s) associated with one or more machines under control. The user can engage this plane while remaining at a comfortable distance from the screen (e.g., without needing to lean forward to reach the screen). The position of the plane may be adjusted by the user from time to time. In embodiments, however, the user is relieved of the need to explicitly change the plane's position; instead, the plane (or other virtual surface construct) automatically moves along with, as if tethered to, the user's control object. For example, a virtual plane may be computationally defined as perpendicular to the orientation of the control object and located a certain distance, e.g., 3-4 millimeters, in front of its tip when the control object is at rest or moving with constant velocity. As the control object moves, the plane follows it, but with a certain time lag (e.g., 0.2 second). As a result, as the control object accelerates, the distance between its tip and the virtual touch plane changes, allowing the control object, when moving towards the plane, to eventually "catch" the plane—that is, the tip of the control object to touch or pierce the plane. Alternatively, instead of being based on a fixed time lag, updates to the position of the virtual plane may be computed based on a virtual energy potential defined to accelerate the plane towards (or away from) the control object tip depending on the plane-to-tip distance, likewise allowing the control object to touch or pierce the plane. Either way, such virtual touching or piercing can be interpreted as engagement events. Further, in some embodiments, the degree of piercing (i.e., the distance beyond the plane that the control object reaches) is interpreted as an intensity level. To guide the user as she engages with or disengages from the virtual plane (or other virtual surface construct), the cursor symbol may encode the distance from the virtual surface visually, e.g., by changing in size with varying distance.

In an embodiment, once engaged, further movements of the control object may serve to move graphical components across the screen (e.g., drag an icon, shift a scroll bar, etc.), change perceived "depth" of the object to the viewer (e.g., resize and/or change shape of objects displayed on the screen in connection, alone, or coupled with other visual effects) to create perception of "pulling" objects into the foreground of the display or "pushing" objects into the background of the display, create new screen content (e.g., draw a line), or otherwise manipulate screen content until the control object disengages (e.g., by pulling away from the virtual surface, indicating disengagement with some other gesture of the control object (e.g., curling the forefinger backward); and/or with some other movement of a second control object (e.g., waving the other hand, etc.)). Advantageously, tying the virtual surface construct to the control object (e.g., the user's finger), rather than fixing it relative to the screen or other stationary objects, allows the user to consistently use the same motions and gestures to engage and manipulate screen content regardless of his precise location relative to the screen. To eliminate the inevitable jitter typically accompanying the control object's movements and which might otherwise result in switching back and forth between the modes unintentionally, the control object's movements may be filtered and the cursor position thereby stabilized. Since faster movements will generally result in more jitter, the strength of the filter may depend on the speed of motion.

Figure 5A:
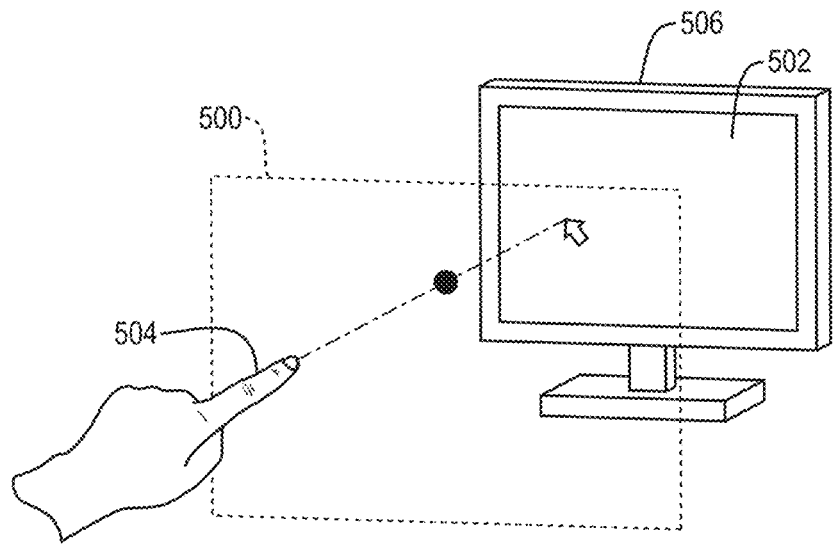
FIGS. 5A and 5B are perspective views of a planar virtual surface construct and a control object in the disengaged and engaged modes, respectively, illustrating free-space gesture control of a desktop computer in accordance with various embodiments.
Figure 5B:
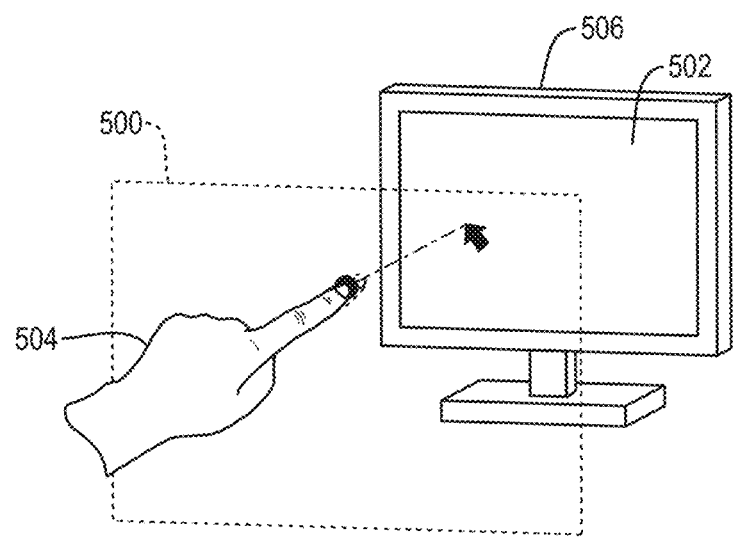

In an embodiment and by way of example, as illustrated in FIGS. 5A and 5B, a virtual control construct implemented by a virtual plane 500 may be defined in front of and substantially parallel to the screen 502 of a machine under control. When the control object 504 (e.g., as shown, the user's index finger) "touches" or "pierces" the virtual plane (i.e., when its spatial location coincides with, intersects, or moves beyond the virtual plane's computationally defined spatial location), the cursor 506 and/or machine interface operates in the engaged mode (FIG. 5B); otherwise, the cursor and/or machine interface operates in the disengaged mode (FIG. 5A). To implement two or more distinct engaged modes, multiple virtual planes may be defined. For instance, a drawing application may define two substantially parallel virtual planes at different distances from the screen. When the user, moving his finger towards the screen, pierces the first virtual plane, the user may be able to operate menus and controls within the application; when his finger pierces the second virtual plane, the finger's further (e.g., lateral) motions may be converted to line drawings on the screen. Two parallel virtual planes may also be used to, effectively, define a virtual control construct with a certain associated thickness (i.e., a "virtual slab"). Control object movements within that virtual slab may operate the cursor in the engaged mode, while movements on either side of the virtual slab correspond to the disengaged mode. A planar virtual control construct with a non-zero thickness may serve to avoid unintended engagement and disengagement resulting from inevitable small motions in and out of the virtual plane (e.g., due to the inherent instability of the user's hand and/or the user's perception of depth). The thickness may vary depending on one or more sensed parameters (e.g., the overall speed of the control object's motion; the faster the movements, the thicker the slice may be chosen to be).

Transitions between the different operational modes may, but need not, be visually indicated by a change in the shape, color (as in FIGS. 5A and 5B), or other visual property of the cursor or other displayable object and/or audio feedback. In some embodiments, the cursor symbol indicates not only the operational mode, but also the control object's distance from the virtual control construct. For instance, the cursor symbol may take the form of a circle, centered at the cursor location, whose radius is proportional to (or otherwise monotonically increasing with) the distance between control object and virtual control construct, and which, optionally, changes color when switching from the disengaged mode into the engaged mode.

Figures 1, 5C:
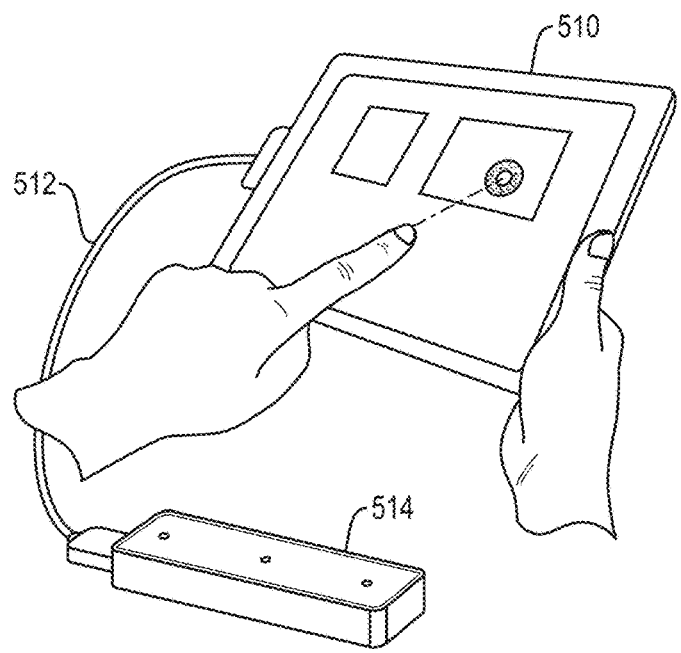
FIG. 5C-1 is a perspective view of a tablet connected to a motion-capture device, illustrating free-space gesture control of the tablet in accordance with various embodiments.
Figures 2, 5C:
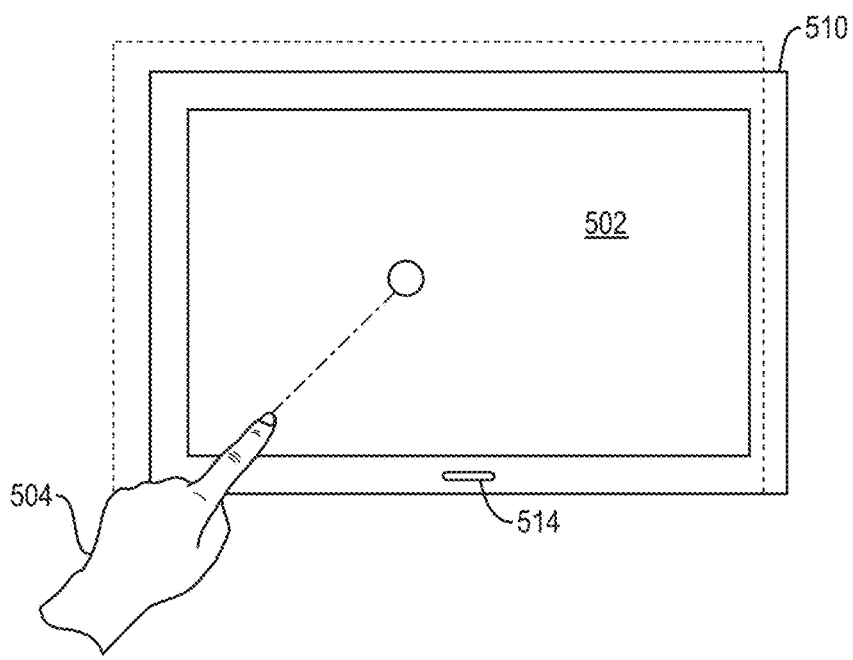

Of course, the system under control need not be a desktop computer. FIG. 5C-1 illustrates an embodiment in which free-space gestures are used to operate a handheld tablet 510. The tablet 510 may be connected, e.g., via a USB cable 512 (or any other wired or wireless connection), to a motion-capture device 114 (such as for example, a dual-camera motion controller as provided by Leap Motion, Inc., San Francisco, Calif. or other interfacing mechanisms and/or combinations thereof) that is positioned and oriented so as to monitor a region where hand motions normally take place. For example, the motion-capture device 514 may be placed onto a desk or other working surface, and the tablet 510 may be held at an angle to that working surface to facilitate easy viewing of the displayed content. The tablet 510 may be propped up on a tablet stand or against a wall or other suitable vertical surface to free up the second hand, facilitating two-hand gestures. FIG. 5C-2 illustrates a modified tablet embodiment, in which the motion-capture device 514 is integrated into the frame of the tablet 510.

Figure 5D:
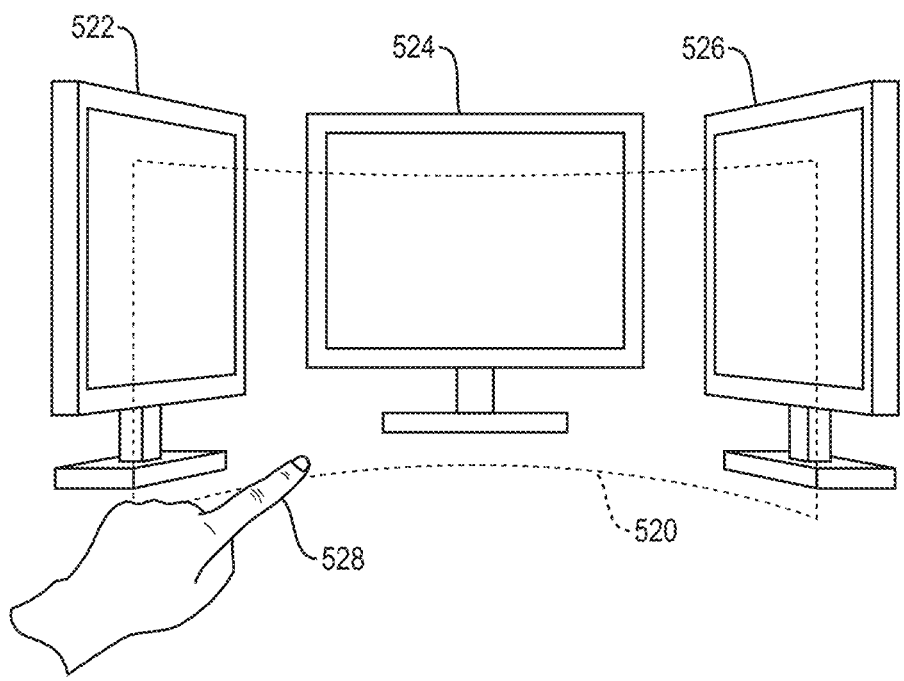
FIG. 5D is a perspective view of a curved virtual surface construct accommodating free-space gesture control of a multi-screen computer system in accordance with various embodiments.

The virtual surface construct need not be planar, but may be curved in space, e.g., to conform to the user's range of movements. FIG. 5D illustrates, for example, a cylindrical virtual surface construct 520 in front of an arrangement of three monitors 522, 524, 526, which may all be connected to the same computer. The user's finger motions may control screen content on any one of the screens, depending on the direction in which the finger 528 points and/or the portion of the virtual surface construct 520 that it pierces. Of course, other types of curved virtual surfaces constructs of regular (e.g., spherical) or irregular shape, or virtual surface constructs composed of multiple (planar or curved) segments, may also be used in combination with one or more screens. Further, in some embodiments, the virtual control construct is a virtual solid construct or a virtual closed surface (such as, e.g., a sphere, box, oriented ellipsoid, etc.) or portion thereof, having an interior (or, alternatively, exterior) that defines a three-dimensional engagement target. For instance, in an application that allows the user to manipulate a globe depicted on the screen, the virtual control construct may be a virtual sphere located at some distance in front of the screen. The user may be able to rotate the on-screen globe by moving his fingertips while they are touching or piercing the spherical virtual surface construct (from outside). To allow the user to manipulate the globe from inside, the spherical virtual surface construct may be defined as surrounding the user (or at least his hand), with its exterior serving as the engagement target. Engagement and disengagement of the control object need not necessarily be defined relative to a two-dimensional surface. Rather, in some embodiments, the virtual control construct may be a virtual point construct along a virtual line (or line segment) extending from the control object, or a line within a plane extending from the control object.

The location and/or orientation of the virtual surface construct (or other virtual control construct) may be defined relative to the room and/or stationary objects (e.g., a screen) therein, relative to the user, relative to the device 514 or relative to some combination. For example, a planar virtual surface construct may be oriented parallel to the screen, perpendicular to the direction of the control object, or at some angle in between. The location of the virtual surface construct can, in some embodiments, be set by the user, e.g., by means of a particular gesture recognized by the motion-capture system. To give just one example, the user may, with her index finger stretched out, have her thumb and middle finger touch so as to pin the virtual surface construct at a certain location relative to the current position of the index-finger-tip. Once set in this manner, the virtual surface construct may be stationary until reset by the user via performance of the same gesture in a different location.

In some embodiments, the virtual surface construct is tied to and moves along with the control object, i.e., the position and/or orientation of the virtual surface construct are updated based on the tracked control object motion. This affords the user maximum freedom of motion by allowing the user to control the user interface from anywhere (or almost anywhere) within the space monitored by the motion-capture system. To enable the relative motion between the control object and virtual surface construct that is necessary for piercing the surface, the virtual surface construct follows the control object's movements with some delay. Thus, starting from a steady-state distance between the virtual surface construct and the control object tip in the disengaged mode, the distance generally decreases as the control object accelerates towards the virtual surface construct, and increases as the control object accelerates away from the virtual surface construct. If the control object's forward acceleration (i.e., towards the virtual surface construct) is sufficiently fast and/or prolonged, the control object eventually pierces the virtual surface construct. Once pierced, the virtual surface construct again follows the control object's movements. However, whereas, in the disengaged mode, the virtual surface construct is "pushed" ahead of the control object (i.e., is located in front of the control object tip), it is "pulled" behind the control object in the engaged mode (i.e., is located behind the control object tip). To disengage, the control object generally needs to be pulled back through the virtual surface construct with sufficient acceleration to exceed the surface's responsive movement.

In an embodiment, an engagement target can be defined as merely the point where the user touches or pierces a virtual control construct. For example, a virtual point construct may be defined along a line extending from or through the control object tip, or any other point or points on the control object, located a certain distance from the control object tip in the steady state, and moving along the line to follow the control object. The line may, e.g., be oriented in the direction of the control object's motion, perpendicularly project the control object tip onto the screen, extend in the direction of the control object's axis, or connect the control object tip to a fixed location, e.g., a point on the display screen. Irrespective of how the line and virtual point construct are defined, the control object can, when moving sufficiently fast and in a certain manner, "catch" the virtual point construct. Similarly, a virtual line construct (straight or curved) may be defined as a line within a surface intersecting the control object at its tip, e.g., as a line lying in the same plane as the control object and oriented perpendicular (or at some other non-zero angle) to the control object. Defining the virtual line construct within a surface tied to and intersecting the control object tip ensures that the control object can eventually intersect the virtual line construct.

In an embodiment, engagement targets defined by one or more virtual point constructs or virtual line (i.e., linear or curvilinear) constructs can be mapped onto engagement targets defined as virtual surface constructs, in the sense that the different mathematical descriptions are functionally equivalent. For example, a virtual point construct may correspond to the point of a virtual surface construct that is pierced by the control object (and a virtual line construct may correspond to a line in the virtual surface construct going through the virtual point construct). If the virtual point construct is defined on a line projecting the control object tip onto the screen, control object motions perpendicular to that line move the virtual point construct in a plane parallel to the screen, and if the virtual point construct is defined along a line extending in the direction of the control object's axis, control object motions perpendicular to that line move the virtual point construct in a plane perpendicular to that axis; in either case, control object motions along the line move the control object tip towards or away from the virtual point construct and, thus, the respective plane. Thus, the user's experience interacting with a virtual point construct may be little (or no) different from interacting with a virtual surface construct. Hereinafter, the description will, for ease of illustration, focus on virtual surface constructs. A person of skill in the art will appreciate, however, that the approaches, methods, and systems described can be straightforwardly modified and applied to other virtual control constructs (e.g., virtual point constructs or virtual linear/curvilinear constructs).

The position and/or orientation of the virtual surface construct (or other virtual control construct) are typically updated continuously or quasi-continuously, i.e., as often as the motion-capture system determines the control object location and/or direction (which, in visual systems, corresponds to the frame rate of image acquisition and/or image processing). However, embodiments in which the virtual surface construct is updated less frequently (e.g., only every other frame, to save computational resources) or more frequently (e.g., based on interpolations between the measured control object positions) can be provided for in embodiments.

Figure 6:
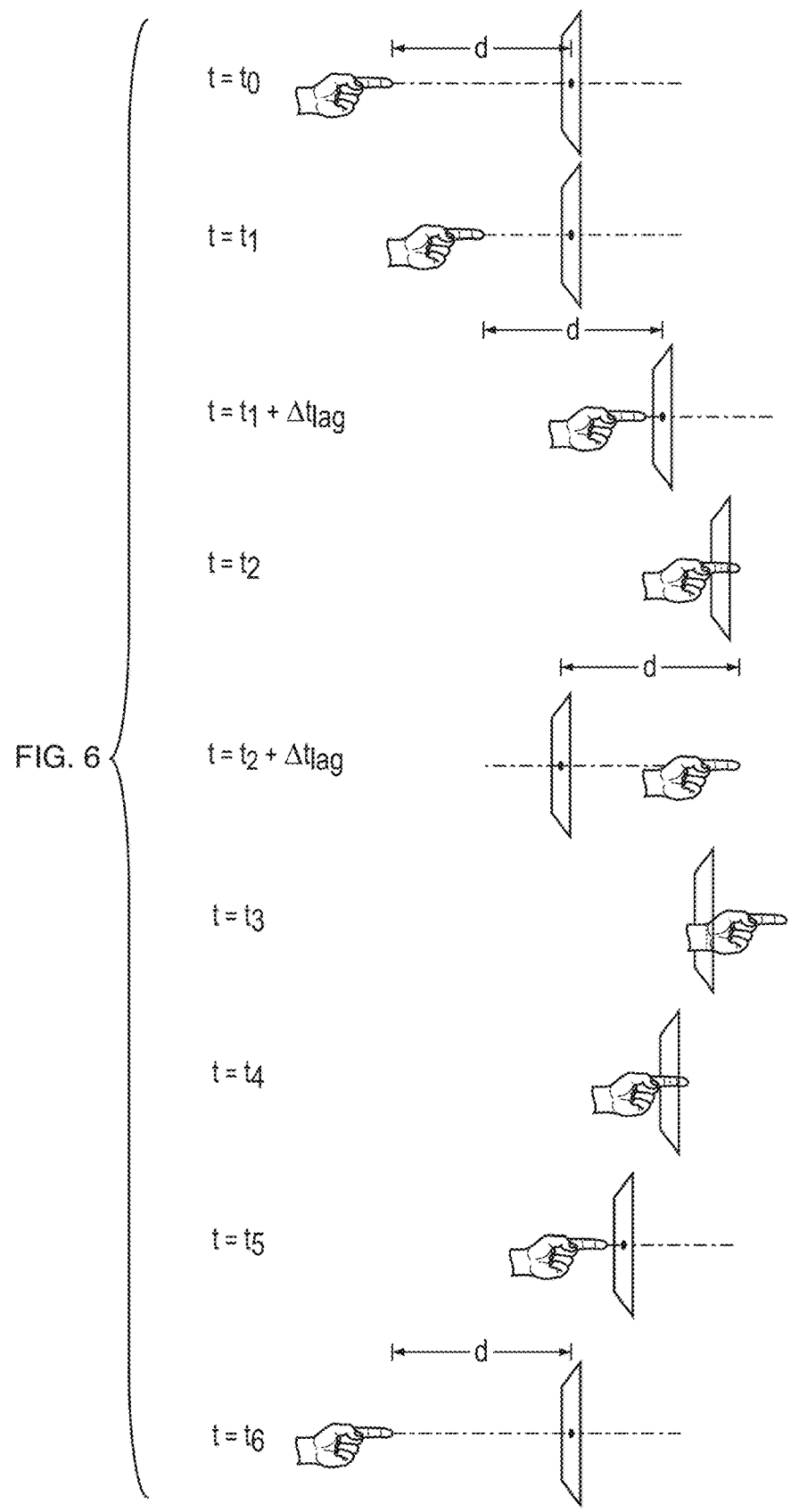
FIG. 6 illustrates motion of a virtual surface construct relative to a user's finger in accordance with various embodiments.

In some embodiments, the virtual surface construct follows the control object with a fixed time lag, e.g., between 0.1 and 1.0 second. In other words, the location of the virtual surface construct is updated, for each frame, based on where the control object tip was a certain amount of time (e.g., 0.2 second) in the past. This is illustrated in FIG. 6, which shows the control object and the virtual surface construct (represented as a plane) at locations within a consistent coordinate system across the subfigures for various points in time according to various embodiments. As depicted, the plane may be computationally defined as substantially perpendicular to the orientation of the control object (meaning that its normal is angled relative to the control object orientation by less than a certain small amount, e.g., less than 5°, and preferably smaller than 1°). Of course, the virtual plane need not necessarily be perpendicular to the orientation of the control object. In some embodiments, it is, instead, substantially parallel to the screen, but still dynamically positioned relative to the control object (e.g., so as to remain at a certain distance from the control object tip, where distance may be measured, e.g., in a direction perpendicular to the screen or, alternatively, in the direction of the control object).

At a first point $t=t_0$ in time, when the control object is at rest, the virtual plane is located at its steady-state distance d in front of the control object tip; this distance may be, e.g., a few millimeters. At a second point $t=t_1$ in time—after the control object has started moving towards the virtual plane, but before the lag period has passed—the virtual plane is still in the same location, but its distance from the control object tip has decreased due to the control object's movement. One lag period later, at $t=t_1+\Delta t_{lag}$, the virtual plane is positioned the steady-state distance away from the location of the control object tip at the second point in time, but due to the control object's continued forward motion, the distance between the control object tip and the virtual plane has further decreased. Finally, at a fourth point in time $t=t_2$, the control object has pierced the virtual plane. One lag time after the control object has come to a halt, at $t=t_2+\Delta t_{lag}$, the virtual plane is again a steady-state distance away from the control object tip—but now on the other side. When the control object is subsequently pulled backwards, the distance between its tip and the virtual plane decreases again ($t=t_3$ and $t=t_4$), until the control object tip emerges at the first side of the virtual plane ($t=t_5$). The control object may stop at a different position than where it started, and the virtual plane will eventually follow it and be, once more, a steady-state distance away from the control object tip ($t=t_6$). Even if the control object continues moving, if it does so at a constant speed, the virtual plane will, after an initial lag period to "catch up," follow the control object at a constant distance.

The steady-state distances in the disengaged mode and the engaged mode may, but need not be the same. In some embodiments, for instance, the steady-state distance in the engaged mode is larger, such that disengaging from the virtual plane (i.e., "unclicking") appears harder to the user than engaging (i.e., "clicking") because it requires a larger motion. Alternatively or additionally, to achieve a similar result, the lag times may differ between the engaged and disengaged modes. Further, in some embodiments, the steady-state distance is not fixed, but adjustable based on the control object's speed of motion, generally being greater for higher control object speeds. As a result, when the control object moves very fast, motions toward the plane are "buffered" by the rather long distance that the control object has to traverse relative to the virtual plane before an engagement event is recognized (and, similarly, backwards motions for disengagement are buffered by a long disengagement steady-state distance). A similar effect can also be achieved by decreasing the lag time, i.e., increasing the responsiveness of touch-surface position updates, as the control object speed increases. Such speed-based adjustments may serve to avoid undesired switching between the modes that may otherwise be incidental to fast control object movements.

Figure 7A:
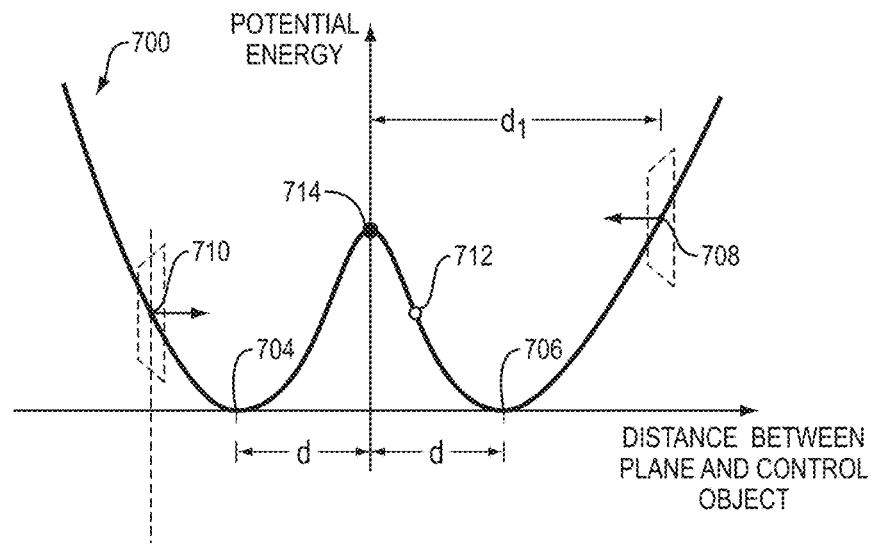
FIGS. 7A and 7B are plots of a virtual energy potential and its derivative, respectively, in accordance with various embodiments for updating the position of a virtual surface construct.
Figure 7B:
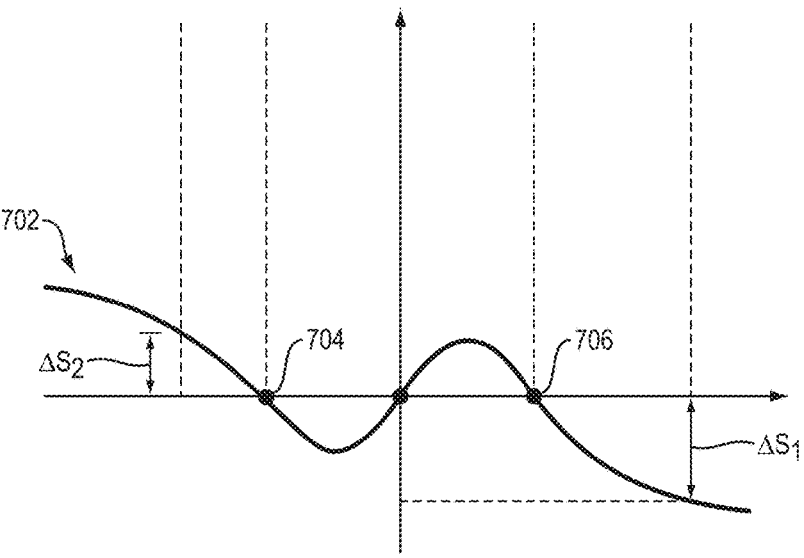

In various embodiments, the position of the virtual plane (or other virtual surface construct) is updated not based on a time lag, but based on its current distance from the control object tip. That is, for any image frame, the distance between the current control object tip position and the virtual plane is computed (e.g., with the virtual-plane position being taken from the previous frame), and, based thereon, a displacement or shift to be applied to the virtual plane is determined. In some embodiments, the update rate as a function of distance may be defined in terms of a virtual "potential-energy surface" or "potential-energy curve." In FIG. 7A, an exemplary such potential-energy curve 700 is plotted as a function of the distance of the virtual plane from the control object tip according to various embodiments. The negative derivative 702 (or slope) of this curve, which specifies the update rate, i.e., the shift in the virtual plane's position per frame (in arbitrary units), is shown in FIG. 7B. The minima of the potential-energy curve 700 determine the steady-state distances 704, 706 to both sides of the control object; at these distances, the virtual plane is not updated at all. At larger distances, the virtual plane is attracted towards the control object tip, at a rate that generally increases with distance. For example, at point 708, where the virtual plane is a positive distance $d_1$ away from the control object, a negative displacement or shift $Ds_1$ is applied to bring the virtual plane closer. Conversely, at point 710, where the virtual plane has a negative distance $d_2$ from the control object tip (corresponding to piercing of the virtual plane, i.e., the engaged mode), a positive shift $Ds_2$ is applied to move the virtual plane closer to the control object. At distances below the steady-state distance (e.g., at point 712), the virtual plane is repelled by the control object and driven back towards the steady state. The magnitude of the local maximum 714 between the two steady states determines the level of force or acceleration needed to cross from the disengaged to the engaged mode or back. In certain embodiments, the potential-energy curve 700 is given an even more physical interpretation, and its negative slope is associated with an acceleration, i.e., a change in the velocity of the virtual plane, rather than a change in its position. In this case, the virtual plane does not immediately stop as it reaches a steady state, but oscillates around the steady state. To slow down the virtual plane's motion and thereby stabilize its position, a friction term may be introduced into the physical model.

Figure 7C:
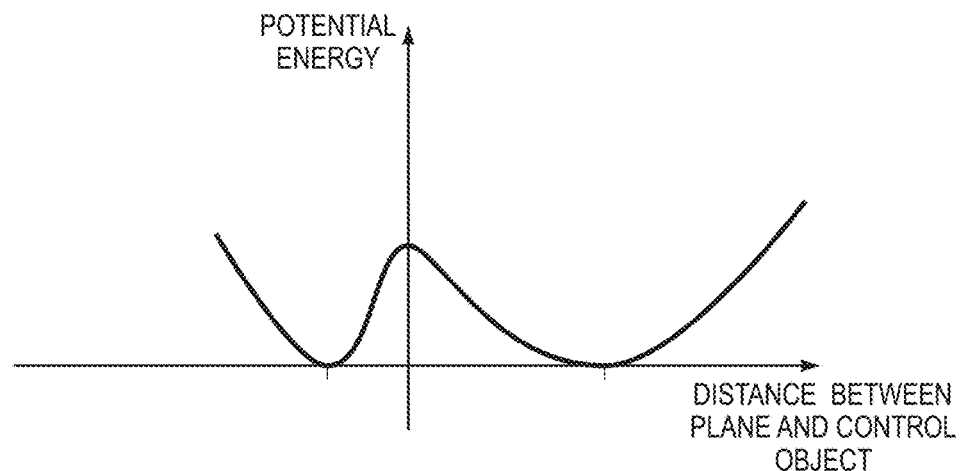
FIGS. 7C-7E are plots of alternative virtual energy potentials in accordance with various embodiments for updating the position of a virtual surface construct.
Figure 7D:
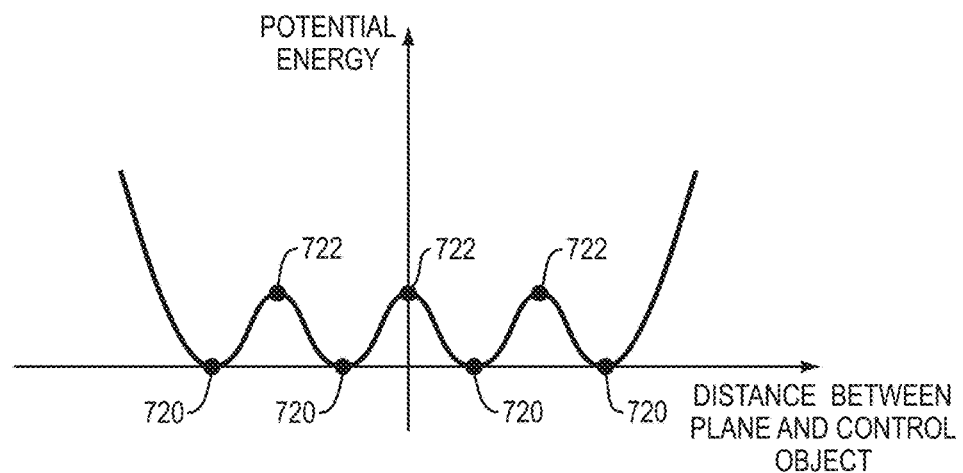
Figure 7E:
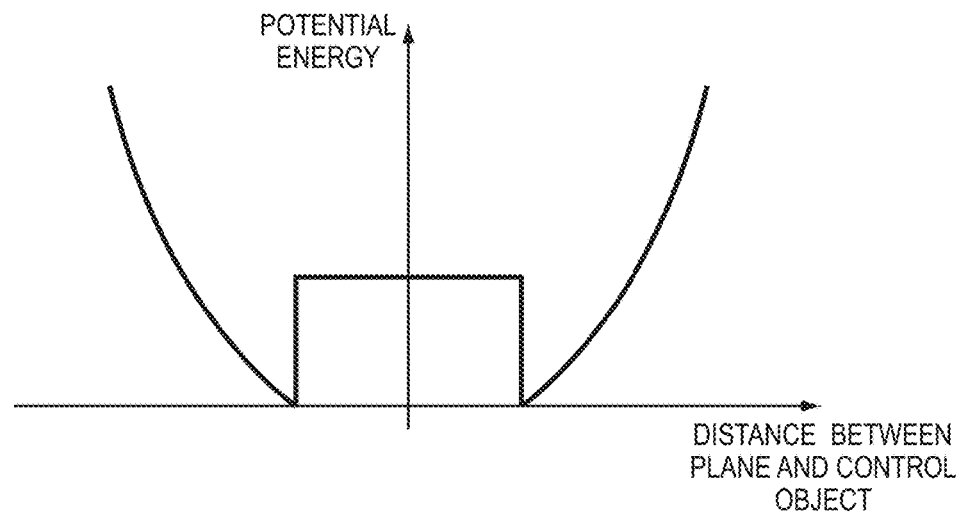

The potential-energy curve need not be symmetric, or course. FIG. 7C, for example, shows an asymmetric curve in which the steady-state distance in the engaged mode is larger than that in the disengaged mode, rendering disengagement harder. Further, as illustrated in FIG. 7D, the curve may have more than two (e.g., four) steady states 720, which may correspond to one disengaged and three engaged modes. The requisite force to transition between modes depends, again, on the heights of the local maxima 722 between the steady states. In some embodiments, the curve abruptly jumps at the steady-state points and assumes a constant, higher value therebetween. In this case, which is illustrated in FIG. 7E, the position of the virtual plane is not updated whenever the control object tip is within the steady-state distance from the virtual plane on either side, allowing fast transitions between the modes. Accordingly, the potential-energy curve may take many other forms, which may be tailored to a desired engagement-disengagement force profile experienced by the user. Moreover, the virtual plane may be updated in accordance with a two-dimensional potential-energy surface that defines the update rate depending on, e.g., the distances between the virtual plane and control object tip along various directions (as opposed to only one, e.g., the perpendicular and shortest, distance of the control object tip from the virtual plane). For example, the virtual plane may follow the control object differently for different relative orientations between the control object and the virtual plane, and each such relative orientation may correspond to a cross-section through the potential-energy surface. Two-dimensional potential-energy surfaces may also be useful to control position updates applied to a curved virtual surface construct.

Furthermore, the potential piercing energy need not, or not only, be a function of the distance from the control object tip to the virtual surface construct, but may depend on other factors. For example, in some embodiments, a stylus with a pressure-sensitive grip is used as the control object. In this case, the pressure with which the user squeezes the stylus may be mapped to the piercing energy.

Whichever way the virtual surface construct is updated, jitter in the control object's motions may result in unintentional transitions between the engaged and disengaged modes. While such modal instability may be combatted by increasing the steady-state distance (i.e., the "buffer zone" between control object and virtual surface construct), this comes at the cost of requiring the user, when she intends to switch modes, to perform larger movements that may feel unnatural. The trade-off between modal stability and user convenience may be improved by filtering the tracked control object movements. Specifically, jitter may be filtered out, based on the generally more frequent changes in direction associated with it, with some form of time averaging. Accordingly, in one embodiment, a moving-average filter spanning, e.g., a few frames, is applied to the tracked movements, such that only a net movement within each time window is used as input for cursor control. Since jitter generally increases with faster movements, the time-averaging window may be chosen to likewise increase as a function of control object velocity (such as a function of overall control object speed or of a velocity component, e.g., perpendicular to the virtual plane). In another embodiment, the control object's previous and newly measured position are averaged with weighting factors that depend, e.g., on velocity, frame rate, and/or other factors. For example, the old and new positions may be weighted with multipliers of x and (1−x), respectively, where x varies between 0 and 1and increases with velocity. In one extreme, for x=1, the cursor remains completely still, whereas for the other extreme, x=0, no filtering is performed at all.

Figure 8A:
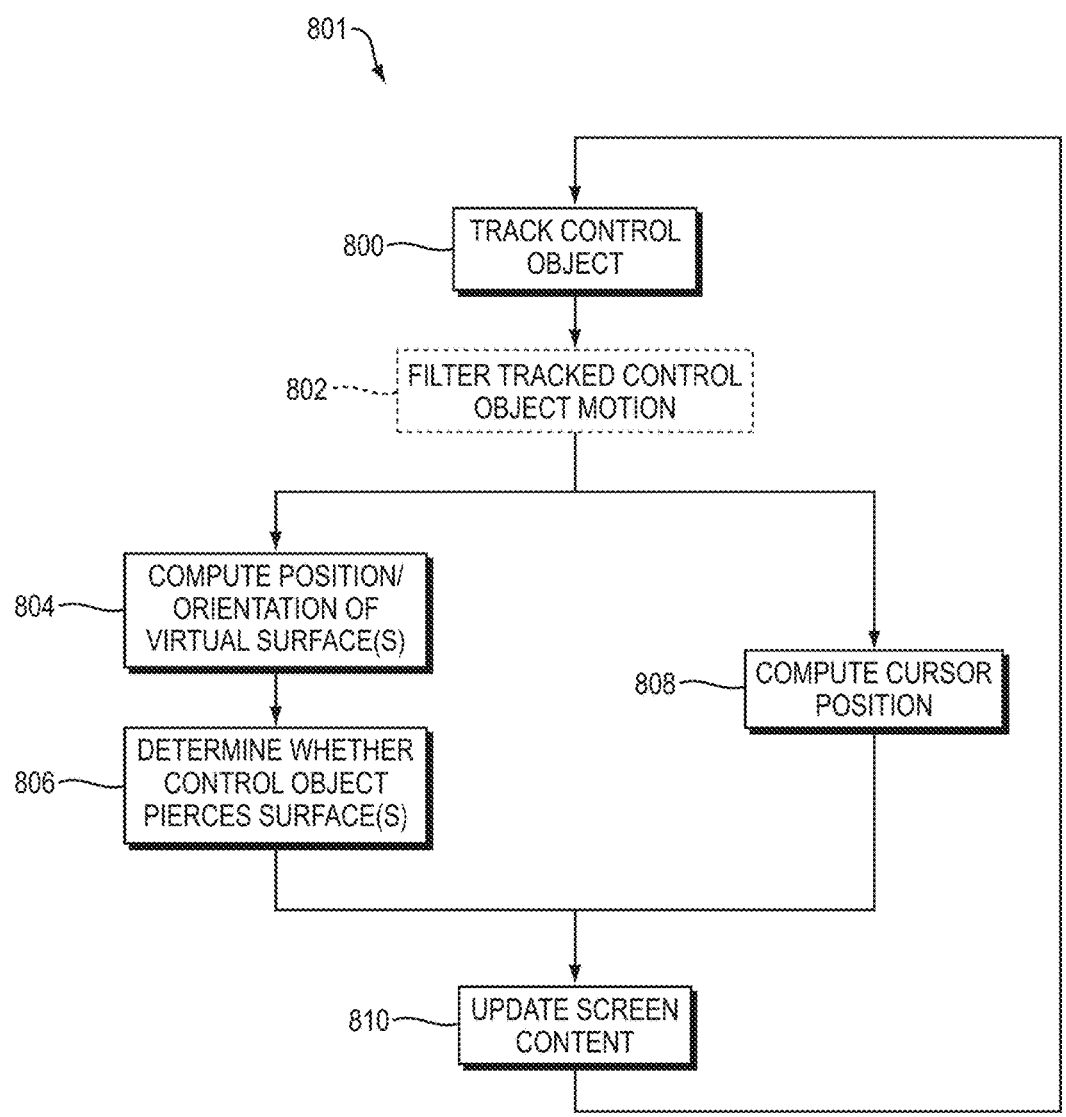

FIG. 8A summarizes representative methods for control-object-controlled cursor operation that utilize a virtual surface construct moving with the control object in accordance with various embodiments. In the method embodiment illustrated by FIG. 8A, a control object is tracked (800), based on computer vision or otherwise, to determine its position and/or orientation in space (typically within a detection zone proximate to the computer screen). Optionally, the tracked control object motion is computationally filtered to reduce jitter (802). Based on the tracked control object in conjunction with a definition of the virtual surface construct relative thereto, the position and/or orientation of the virtual surface construct are then computed (804). In embodiments where the virtual surface construct is updated based on a control object position in the past, it may initially take a few control object tracking cycles (e.g., frames in image-based tracking) before the first position of the virtual surface construct is established; thereafter, the virtual surface construct can be updated every cycle. In embodiments where the virtual surface construct is shifted from cycle to cycle based on its instantaneous distance from the control object tip, the position of the virtual surface construct may be initiated arbitrarily, e.g., such that the virtual surface construct starts a steady-state distance away from the control object. Following computation of the virtual surface construct, the current operational mode (engaged or disengaged) is identified based on a determination whether the control object touches or pierces the virtual surface construct or not (806). Further, the current cursor position is calculated, typically from the control object's position and orientation relative to the screen (808). (This step may be performed prior to, or in parallel with, the computations of the virtual surface construct.) Based on the operational mode and cursor position, the screen content is then updated (810), e.g., to move the cursor symbol or re-arrange other screen content. Steps 800-810 are executed in a loop as long as the user interacts with the system via free-space control object motions.

In some embodiments, temporary piercing of the virtual surface construct—i.e., a clicking motion including penetration of the virtual surface construct immediately followed by withdrawal from the virtual surface construct—switches between modes and locks in the new mode. For example, starting in the disengaged mode, a first click event may switch the control object into the engaged mode, where it may then remain until the virtual surface construct is clicked at again.

Further, in some embodiments, the degree of piercing (i.e., the distance beyond the virtual surface construct that the control object initially reaches, before the virtual surface construct catches up) is interpreted as an intensity level that can be used to refine the control input. For example, the intensity (of engagement) in a swiping gesture for scrolling through screen content may determine the speed of scrolling. Further, in a gaming environment or other virtual world, different intensity levels when touching a virtual object (by penetrating the virtual surface construct while the cursor is positioned on the object as displayed on the screen) may correspond to merely touching the object versus pushing the object over. As another example, when hitting the keys of a virtual piano displayed on the screen, the intensity level may translate into the volume of the sound created. Thus, touching or engagement of a virtual surface construct (or other virtual control construct) may provide user input beyond the binary discrimination between engaged and disengaged modes.

Figure 8B:
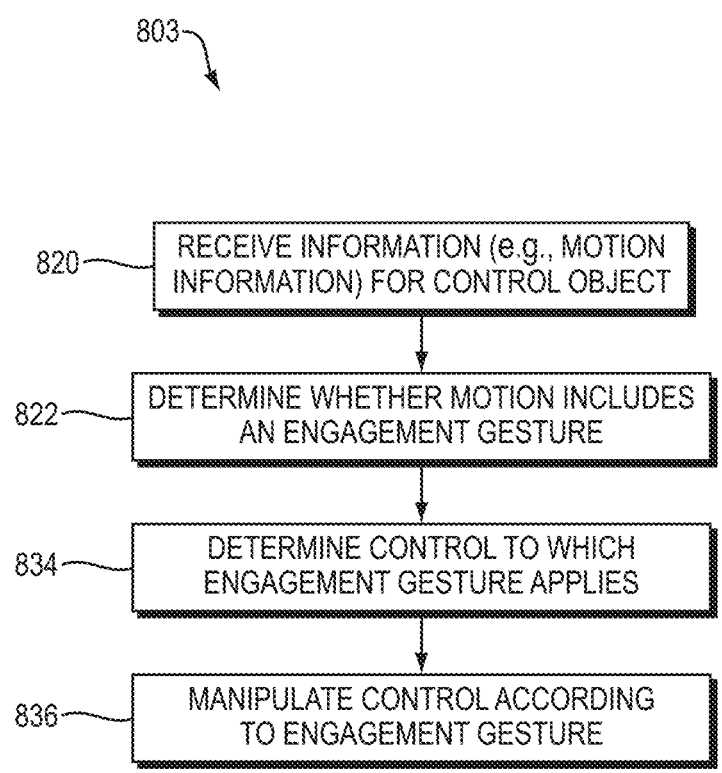
Figures 1, 8B:
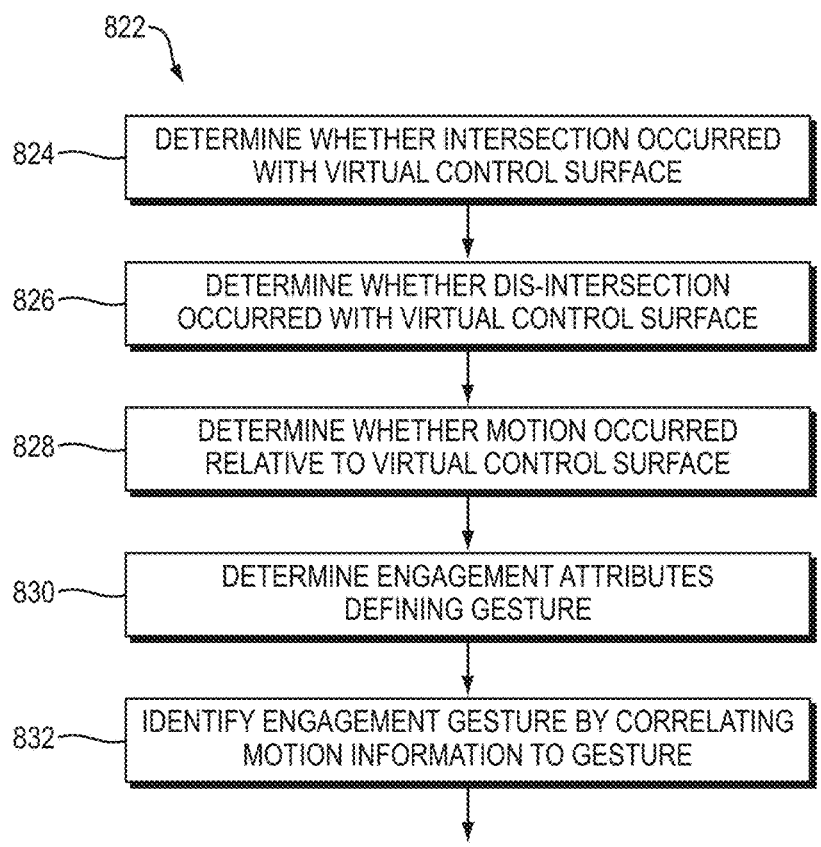

FIGS. 8B and 8B-1 illustrate at a higher conceptual level various methods for controlling a machine-user interface using free-space gestures or motions performed by a control object. The method involves receiving information including motion information for a control object (820). Further, it includes determining from the motion information whether the motion corresponds to an engagement gesture (822). This determination may be made by determining whether an intersection occurred between the control object and a virtual control construct (824); whether a dis-intersection of the control object from the at least one virtual control construct occurred (826); and/or whether motion of the control object occurred relative to at least one virtual control construct (828). Further, the determination may involve determining, from the motion information, one or more engagement attributes (e.g., a potential energy) defining an engagement gesture (830), and/or identifying an engagement gesture by correlating the motion information to one of a plurality of engagement gestures based in part upon one or more of motion of the control object, occurrence of any of an intersection, a dis-intersection or a non-intersection of the control object with the virtual control construct, and the set of engagement attributes (832). Once an engagement gesture has been recognized, the user-interface control to which the gesture applies (e.g., a control associated with an application or an operating environment, or a special control) is selected or otherwise determined (834). The control may then be manipulated according to the gesture (836).

As will be readily apparent to those of skill in the art, the methods described above can be readily extended to the control of a user interface with multiple simultaneously tracked control objects. For instance, both left and right index fingers of a user may be tracked, each relative to its own associated virtual touch surface, to operate to cursors simultaneously and independently. As another example, the user's hand may be tracked to determine the positions and orientations of all fingers; each finger may have its own associated virtual surface construct (or other virtual control construct) or, alternatively, all fingers may share the same virtual surface construct, which may follow the overall hand motions. A joint virtual plane may serve, e.g., as a virtual drawing canvas on which multiple lines can be drawn by the fingers at once.

In an embodiment and by way of example, one or more control parameter(s) and the control object are applied to some control mechanism to determine the distance of the virtual control construct to a portion of the control object (e.g., tool tip(s), point(s) of interest on a user's hand or other points of interest). In some embodiments, a lag (e.g., filter or filtering function) is introduced to delay, or modify, application of the control mechanism according to a variable or a fixed increment of time, for example. Accordingly, embodiments can provide enhanced verisimilitude to the human-machine interaction, and/or increased fidelity of tracking control object(s) and/or control object portion(s).

In one example, the control object portion is a user's finger-tip. A control parameter is also the user's finger-tip. A control mechanism includes equating a plane-distance between virtual control construct and finger-tip to a distance between finger-tip and an arbitrary coordinate (e.g., center (or origin) of an interaction zone of the controller). Accordingly, the closer the finger-tip approaches to the arbitrary coordinate, the closer the virtual control construct approaches the finger-tip.

In another example, the control object is a hand, which includes a control object portion, e.g., a palm, determined by a "palm-point" or center of mass of the entire hand. A control parameter includes a velocity of the hand, as measured at the control object portion, i.e., the center of mass of the hand. A control mechanism includes filtering forward velocity over the last one (1) second. Accordingly, the faster the palm has recently been travelling forward, the closer the virtual control construct approaches to the control object (i.e., the hand).

In a further example, a control object includes a control object portion (e.g., a finger-tip). A control mechanism includes determining a distance between a thumb-tip (e.g., a first control object portion) and an index finger (e.g., a second control object portion). This distance can be used as a control parameter. Accordingly, the closer the thumb-tip and index-finger, the closer the virtual control construct is determined to be to the index finger. When the thumb-tip and index finger touch one another, the virtual control construct is determined to be partially pierced by the index finger. A lag (e.g., filter or filtering function) can introduce a delay in the application of the control mechanism by some time-increment proportional to any quantity of interest, for example horizontal jitter (i.e., the random motion of the control object in a substantially horizontal dimension). Accordingly, the greater the shake in a user's hand, the more lag will be introduced into the control mechanism.

Machine and user-interface control via free-space motions relies generally on a suitable motion-capture device or system for tracking the positions, orientations, and motions of one or more control objects. For a description of tracking positions, orientations, and motions of control objects, reference may be had to U.S. patent application Ser. No. 13/414,485, filed on Mar. 7, 2012, the entire enclosure of which is incorporated herein by reference. In various embodiments, motion capture can be accomplished visually, based on a temporal sequence of images of the control object (or a larger object of interest including the control object, such as the user's hand) captured by one or more cameras. In one embodiment, images acquired from two (or more) vantage points are used to define tangent lines to the surface of the object and approximate the location and shape of the object based thereon, as explained in more detail below. Other vision-based approaches that can be used in embodiments include, without limitation, stereo imaging, detection of patterned light projected onto the object, or the use of sensors and markers attached to or worn by the object (such as, e.g., markers integrated into a glove) and/or combinations thereof. Alternatively or additionally, the control object may be tracked acoustically or ultrasonically, or using inertial sensors such as accelerometers, gyroscopes, and/or magnetometers (e.g., MEMS sensors) attached to or embedded within the control object. Embodiments can be built employing one or more of particular motion-tracking approaches that provide control object position and/or orientation (and/or derivatives thereof) tracking with sufficient accuracy, precision, and responsiveness for the particular application.

Figure 9A:
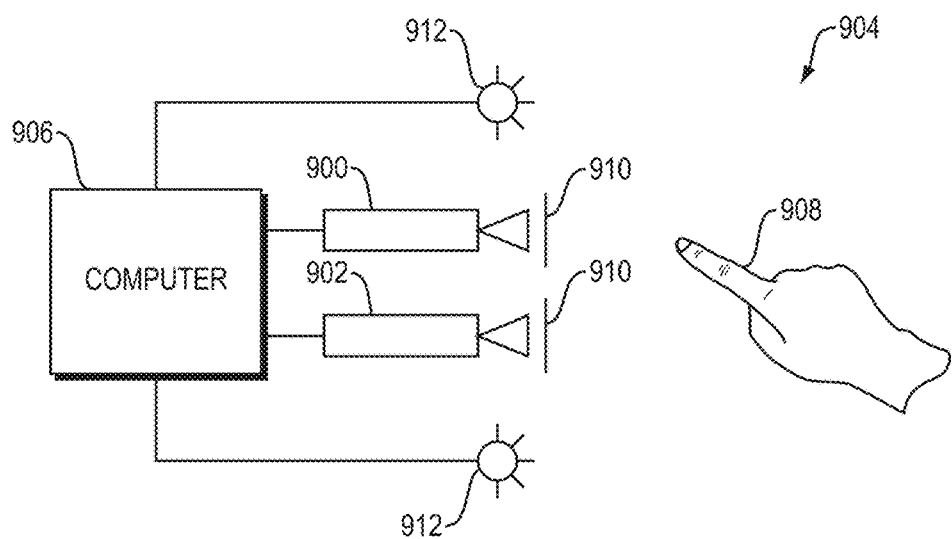
FIG. 9A is a schematic diagram of a system for capturing image data and tracking a control object based thereon in accordance with various embodiments.
Figure 9B:
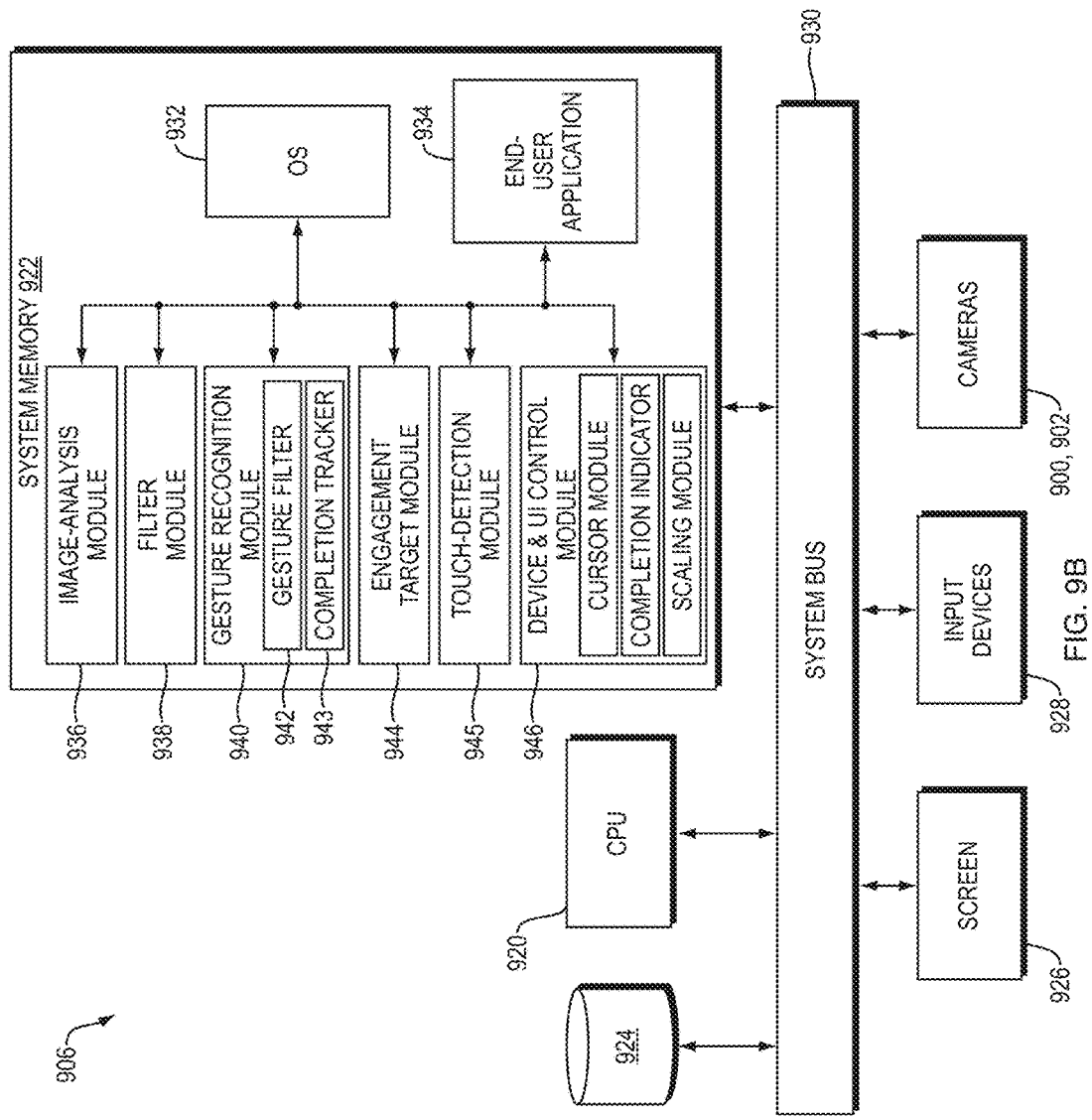
FIG. 9B is a block diagram of a computer system for gesture recognition and machine control in accordance with various embodiments.

FIGS. 9A and 9B illustrate an exemplary system for capturing images and controlling a machine based on motions of a control object according to various embodiments. As shown in FIG. 9A, the system includes motion-capture hardware including two video cameras 900, 902 that acquire a stream of images of a region of interest 904 from two different vantage points. The cameras 900, 902 are connected to a computer 906 that processes these images to infer three-dimensional information about the position and orientation of a control object 908, or a larger object of interest including the control object (e.g., a user's hand), in the region of interest 904, and computes suitable control signals to the user interface based thereon. The cameras may be, e.g., CCD or CMOS cameras, and may operate, e.g., in the visible, infrared (IR), or ultraviolet wavelength regime, either by virtue of the intrinsic sensitivity of their sensors primarily to these wavelengths, or due to appropriate filters 910 placed in front of the cameras. In some embodiments, the motion-capture hardware includes, co-located with the cameras 900, 902, one or more light sources 912 that illuminate the region of interest 904 at wavelengths matching the wavelength regime of the cameras 900, 902. For example, the light sources 912 may be LEDs that emit IR light, and the cameras 900, 902 may capture IR light that is reflected off the control object and/or objects in the background. Due to the inverse-square dependence of the illumination intensity on the distance between the light sources 912 and the illuminated object, foreground objects such as the control object generally appear significantly brighter in the images than background objects, aiding in intensity-based foreground/background discrimination. In some embodiments, the cameras 900, 902 and light sources 912 are disposed below the control object to be tracked and point upward. For example, they may be placed on a desk to capture hand motions taking place in a spatial region above the desk, e.g., in front of the screen. This location may be optimal both for foreground/background discrimination (because the background is in this case typically the ceiling and, thus, far away) and for discerning the control object's direction and tip position (because the usual pointing direction will lie, more or less, in the image plane).

As mentioned above, the control object may, alternatively, be tracked acoustically. In this case, the light sources 900, 902 are replaced by sonic sources. The sonic sources transmit sound waves (e.g., ultrasound that is not audible by the user) to the user; the user either blocks or alters the sound waves that impinge upon her, i.e., causes "sonic shadowing" or "sonic deflection." Such sonic shadows and/or deflections can also be sensed and analyzed to reconstruct the shape, configuration, position, and orientation of the control object, and, based thereon, detect the user's gestures.

The computer 906 processing the images acquired by the cameras 900, 902 may be a suitably programmed general-purpose computer. As shown in FIG. 9B, it may include a processor (or CPU) 920, associated system memory 922 (typically volatile memory, e.g., RAM), one or more permanent storage devices 924 (such as hard disks, CDs, DVDs, memory keys, etc.), a display screen 926 (e.g., an LCD screen or CRT monitor), input devices (such as a keyboard and, optionally, a mouse) 928, and a system bus 930 that facilitates communication between these components and, optionally via a dedicated interface, with the cameras 900, 902 and/or other motion-capture hardware. The memory 922 may store computer-executable instructions, conceptually illustrated as a group of modules and programmed in any of various suitable programming languages (such as, e.g., C, C++, Java, Basic, Python, Pascal, Fortran, assembler languages, etc.), that control the operation of the CPU and provide the requisite computational functionality for implementing methods in accordance herewith. One of these modules is typically an operating system 932, such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system, iOS and Android mobile operating systems, or another operating system of platform. In addition to the operating system 932, which stores low-level system functions (such as memory allocation and file management), the modules may include one or more end-user applications 934 (such as, e.g., web browsers, office applications, or video games), and modules for image processing/analysis and control-object tracking, gesture recognition, computation of the virtual control construct and determination of the operational mode, and cursor operation and user-interface control.

In one embodiment, an image analysis module 936 may analyze pairs of image frames acquired by the two cameras 900, 902 (and stored, e.g., in image buffers in memory 922) to identify the control object (or an object including the control object or multiple control objects, such as a user's hand) therein (e.g., as a non-stationary foreground object) and detect its edges. Next, the module 936 may, for each pair of corresponding rows in the two images, find an approximate cross-section of the control object by defining tangent lines on the control object that extend from the vantage points (i.e., the cameras) to the respective edge points of the control object, and inscribe an ellipse (or other geometric shape defined by only a few parameters) therein. The cross-sections may then be computationally connected in a manner that is consistent with certain heuristics and known properties of the control object (e.g., the requirement of a smooth surface) and resolves any ambiguities in the fitted ellipse parameters. As a result, the control object is reconstructed or modeled in three dimensions. This method, and systems for its implementation, are described in more detail in U.S. patent application Ser. No. 13/414,485, filed on Mar. 7, 2012, the entire enclosure of which is incorporated herein by reference. A larger object including multiple control objects can similarly be reconstructed with respective tangent lines and fitted ellipses, typically exploiting information of internal constraints of the object (such as a maximum physical separation between the fingertips of one hand). The image-analysis module 934 may, further, extract relevant control object parameters, such as tip positions and orientations as well as velocities, from the three-dimensional model. In some embodiments, this information can be inferred from the images at a lower level, prior to or without the need for fully reconstructing the control object. These operations are readily implemented by those skilled in the art without undue experimentation. In some embodiments, a filter module 938 receives input from the image-analysis module 964, and smoothens or averages the tracked control object motions; the degree of smoothing or averaging may depend on a control object velocity as determined by the image-analysis module 936.

A gesture-recognition module 940 may receive the tracking data about the control object from the image-analysis module 936 (or, after filtering, from the filter module 938), and use it to identify gestures, e.g., by comparison with gesture records stored in a database 941 on the permanent storage devices 924 and/or loaded into system memory 922. The gesture-recognition module may also include, e.g., as sub-modules, a gesture filter 942 that provides the functionality for ascertaining a dominant gesture among multiple simultaneously detected gestures, and a completion tracker 943 that determines a degree of completion of the gesture as the gesture is being performed.

An engagement-target module 944 may likewise receive data about the control object's location and/or orientation from the image-analysis module 936 and/or the filter module 938, and use the data to compute a representation of the virtual control construct, i.e., to define and/or update the position and orientation of the virtual control construct relative to the control object (and/or the screen); the representation may be stored in memory in any suitable mathematical form. A touch-detection module 945 in communication with the engagement-target module 944 may determine, for each frame, whether the control object touches or pierces the virtual control construct.

A user-interface control module 946 may map detected motions in the engaged mode into control input for the applications 934 running on the computer 906. Collectively, the end-user application 934 and the user-interface control module 946 may compute the screen content, i.e., an image for display on the screen 526, which may be stored in a display buffer (e.g., in memory 922 or in the buffer of a GPU included in the system). In particular, the user-interface control module 946 may include a cursor (sub)module 947 that determines a cursor location on the screen based on tracking data from the image-analysis module 936 (e.g., by computationally projecting the control object tip onto the screen), and visualizes the cursor at the computed location, optionally in a way that discriminates, based on output from the touch-detection module 945, between the engaged and disengaged mode (e.g., by using different colors). The cursor module 947 may also modify the cursor appearance based on the control object distance from the virtual control construct; for instance, the cursor may take the form of a circle having a radius proportional to the distance between the control object tip and the virtual control construct. Further, the user-interface control module 946 may include completion-indicator (sub)module 948, which depicts the degree of completion of a gesture, as determined by the completion tracker 943, with a suitable indicator (e.g., a partially filled circle). Additionally, the user-interface control module 946 may include a scaling (sub)module 949 that determines the scaling ratio between actual control-object movements and on-screen movements (e.g., based on direct user input via a scale-control panel) and causes adjustments to the displayed content based thereon.

The functionality of the different modules can, of course, be grouped and organized in many different ways, as a person of skill in the art would readily understand. Further, it need not necessarily be implemented on a single computer, but may be distributed between multiple computers. For example, the image-analysis and gesture-recognition functionality provided by modules 936, 938, 940, 944, 945, and optionally also the user-interface control functionality of module 946, may be implemented by a separate computer in communication with the computer on which the end-user applications 934 controlled via free-space control object motions are executed, and/or integrated with the cameras 900, 902 and light sources 912 into a single motion-capture device (which, typically, utilizes an application-specific integrated circuit (ASIC) or other special-purpose computer for image-processing). In another exemplary embodiment, the camera images are sent from a client terminal over a network to a remote server computer for processing, and the tracked control object positions and orientations are sent back to the client terminal as input into the user interface. Embodiments can be realized using any number and arrangement of computers (broadly understood to include any kind of general-purpose or special-purpose processing device, including, e.g., microcontrollers, ASICs, programmable gate arrays (PGAs), or digital signal processors (DSPs) and associated peripherals) executing the methods described herein, and any implementation of the various functional modules in hardware, software, or a combination thereof.

Computer programs incorporating various features or functionality described herein may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition, program code may be encoded and transmitted via wired, optical, and/or wireless networks conforming to a variety of protocols, including the Internet, thereby allowing distribution, e.g., via Internet download and/or provided on-demand as web-services.

The systems and methods described herein may find application in a variety of computer-user-interface contexts, and may replace mouse operation or other traditional means of user input as well as provide new user-input modalities. Free-space control object motions and virtual-touch recognition may be used, for example, to provide input to commercial and industrial legacy applications (such as, e.g., business applications, including Microsoft Outlook™; office software, including Microsoft Office™, Windows™, Excel™, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google street View™), or to interact with three-dimensional virtual objects (e.g., Google Earth™).

Figure 10A:
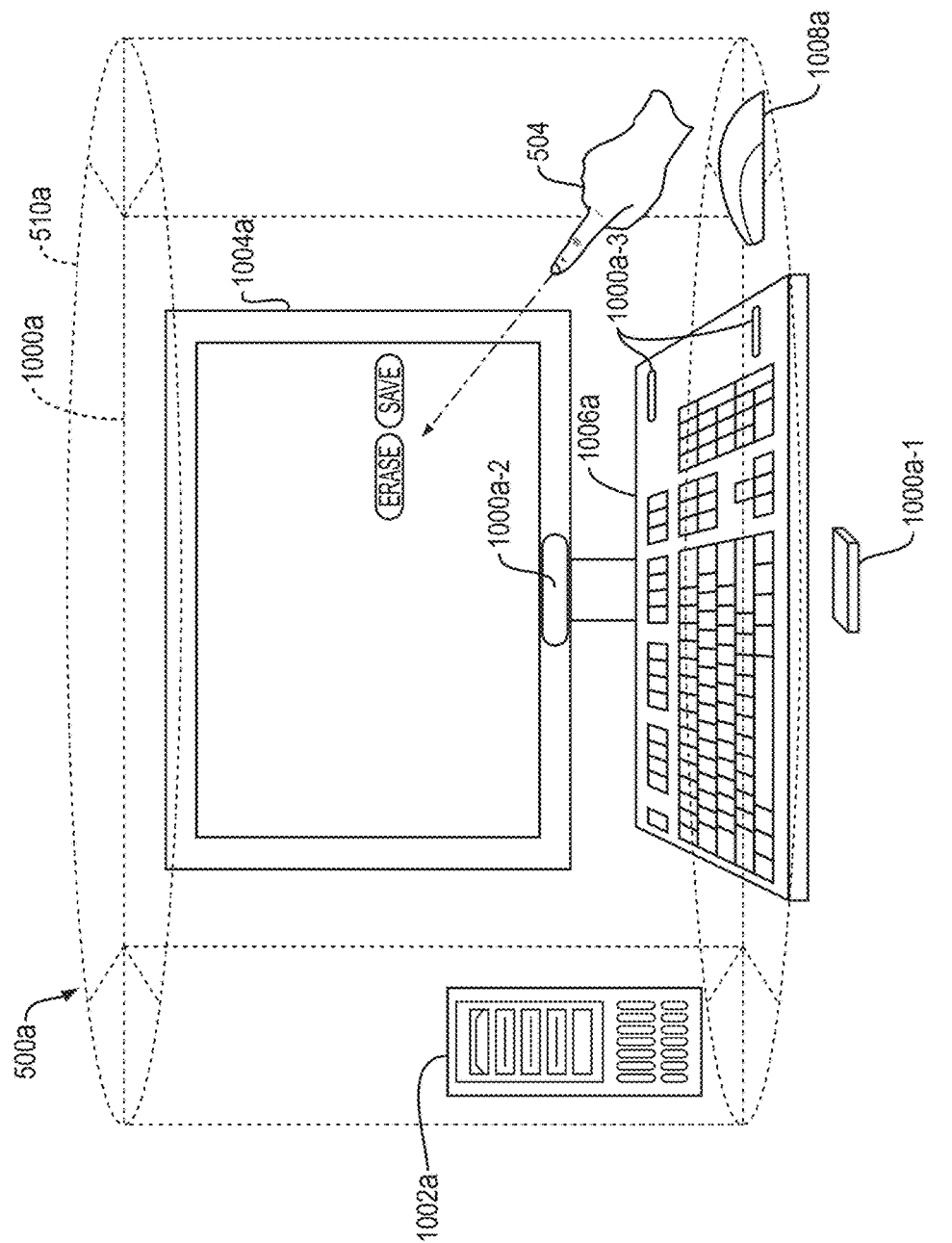
FIGS. 10A-10D illustrate a free-space compound gesture in accordance with various embodiments.
Figure 10B:
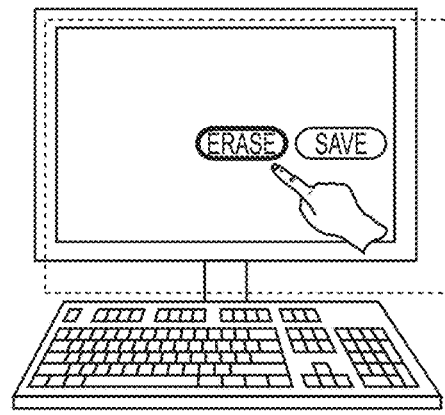
Figure 10C:
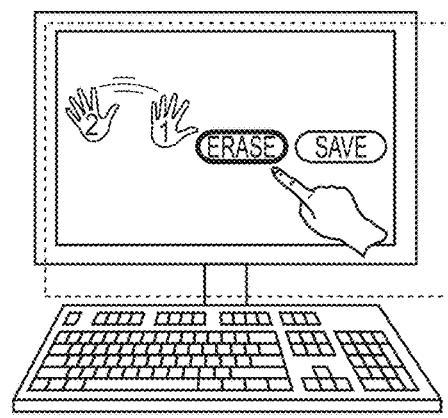
Figure 10D:
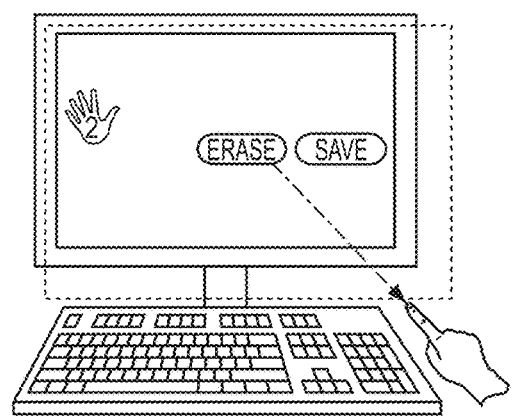

FIGS. 10A-13B illustrate various exemplary control inputs achievable with free-space hand motions and gestures when using systems and methods in accordance herewith. An example of a compound gesture will be illustrated with reference to an embodiment illustrated by FIGS. 10A-10D. These diagrams are merely an example; one of ordinary skill in the art would recognize many other variations, alternatives, and modifications. FIG. 10A illustrates a system 500a comprising wired and/or wirelessly communicatively coupled components of a tower 1002a, a display device 1004a, a keyboard 1006a and optionally a tactile pointing device (e.g., mouse, or track ball) 1008a. In some embodiments, computing machinery of tower 1002a can be integrated into display device 1004a in an "all in one" configuration. A position and motion sensing device (e.g., 1000a-1, 1000a-2 and/or 1000a-3) comprises all or a portion of the non-tactile interface system of FIG. 5A, that provides for receiving non-tactile input based upon detected position(s), shape(s) and/or motion(s) made by a hand 504 and/or any other detectable object serving as a control object. The position and motion sensing device can be embodied as a stand-alone entity or integrated into another device, e.g., a computer, workstation, laptop, notebook, smartphone, tablet, smart watch or other type of wearable intelligent device (s) and/or combinations thereof. The position and motion sensing device can be communicatively coupled with, and/or integrated within, one or more of the other elements of system 500a, and can interoperate cooperatively with component(s) of the system 500a, to provide a non-tactile interface capabilities, such as illustrated by the non-tactile interface system of FIG. 1A.

The motion sensing device (e.g., 1000a-1, 1000a-2 and/or 1000a-3) is capable of detecting position as well as motion of hands and/or portions of hands and/or other detectable objects (e.g., a pen, a pencil, a stylus, a paintbrush, an eraser, a virtualized tool, and/or a combination thereof), within a region of space 510a from which it is convenient for a user to interact with system 500a. Region 510a can be situated in front of, nearby, and/or surrounding system 500a. In some embodiments, the position and motion sensing device can be integrated directly into display device 1004a as integrated device 1000a-2 and/or keyboard 1006a as integrated device 1000a-3. While FIG. 10A illustrates devices 1000a-1, 1000a-2 and 1000a-3, it will be appreciated that these are alternative embodiments shown in FIG. 10A for clarity sake. Keyboard 1006a and position and motion sensing device are representative types of "user input devices." Other examples of user input devices (not shown in FIG. 10A) can be used in conjunction with computing environment 500a, such as for example, a touch screen, light pen, mouse, track ball, touch pad, data glove and so forth. Accordingly, FIG. 10A is representative of but one type of system embodiment. It will be readily apparent to one of ordinary skill in the art that many system types and configurations are suitable for use in conjunction with various embodiments.

Tower 1002a and/or position and motion sensing device and/or other elements of system 500a can implement functionality to provide virtual control surface 1000a within region 510a with which engagement gestures are sensed and interpreted to facilitate user interactions with system 1002a. Accordingly, objects and/or motions occurring relative to virtual control surface 1000a within region 510a can be afforded differing interpretations than like (and/or similar) objects and/or motions otherwise occurring.

As illustrated in FIG. 10A control object 504 (happens to be a pointing finger in this example) is moving toward an "Erase" button being displayed on display 1004a by a user desiring to select the "Erase" button. Now with reference to FIG. 10B, control object 504 has moved triggered an engagement gesture by means of "virtually contacting", i.e., intersecting virtual control surface 1000a. At this point, unfortunately, the user has suffered misgivings about executing an "Erase." Since the "Erase" button has been engaged, however, mere withdrawal of control object 504 (i.e., a "dis-intersection") will not undo the erase operation selected. Accordingly, with reference to FIG. 10C, the user makes a wiping motion with a second control object (i.e., the user's other hand in this example) indicating that the user would like to cancel an operation that is underway. Motion by a second control object illustrates a "compound gesture" that includes two or more gestures, sequentially or simultaneously. Compound gestures can be performed using a single control object, or two or more control objects (e.g., one hand, two hands, one stylus and one hand, etc.). In the illustrated case, the point/select and the wipe are two gestures made by two different control objects (two hands) occurring contemporaneously. Now with reference to FIG. 10D, when the second part of the compound gesture is recognized, the Erase button is no longer highlighted, indicating that the button is now "unselected". The user is free to withdraw the first control object from engagement with the virtual control surface without triggering an "Erase" operation.

Figure 11A:
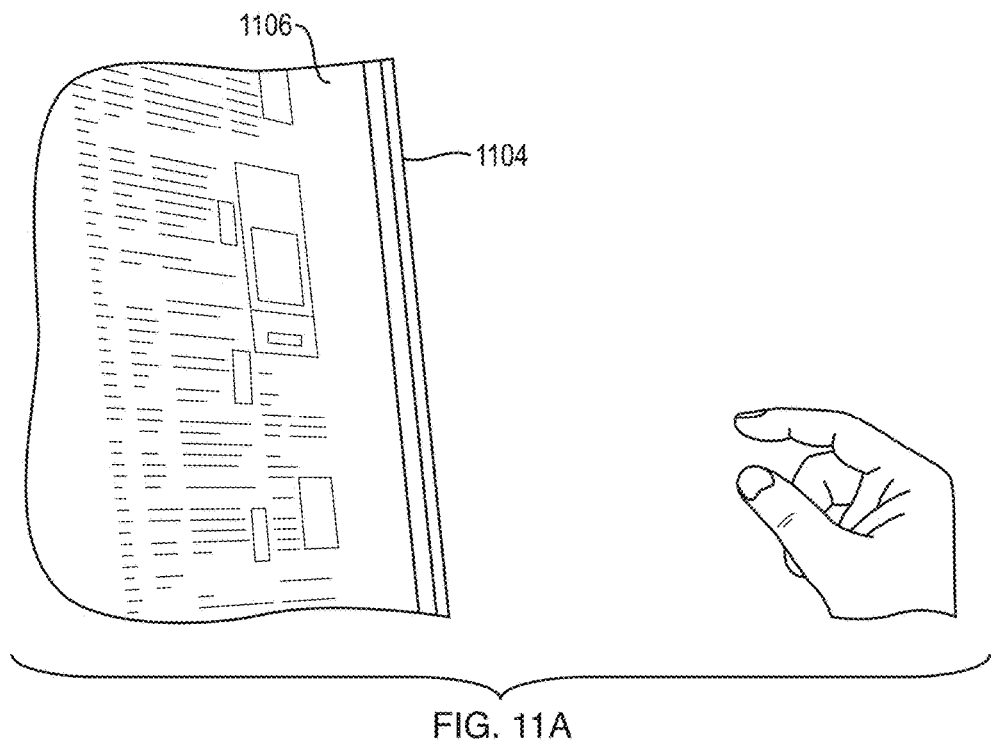
FIGS. 11A and 11B illustrate, in two snap shots, a zooming action performed by a user via a free-space gesture in accordance with various embodiments.
Figure 11B:
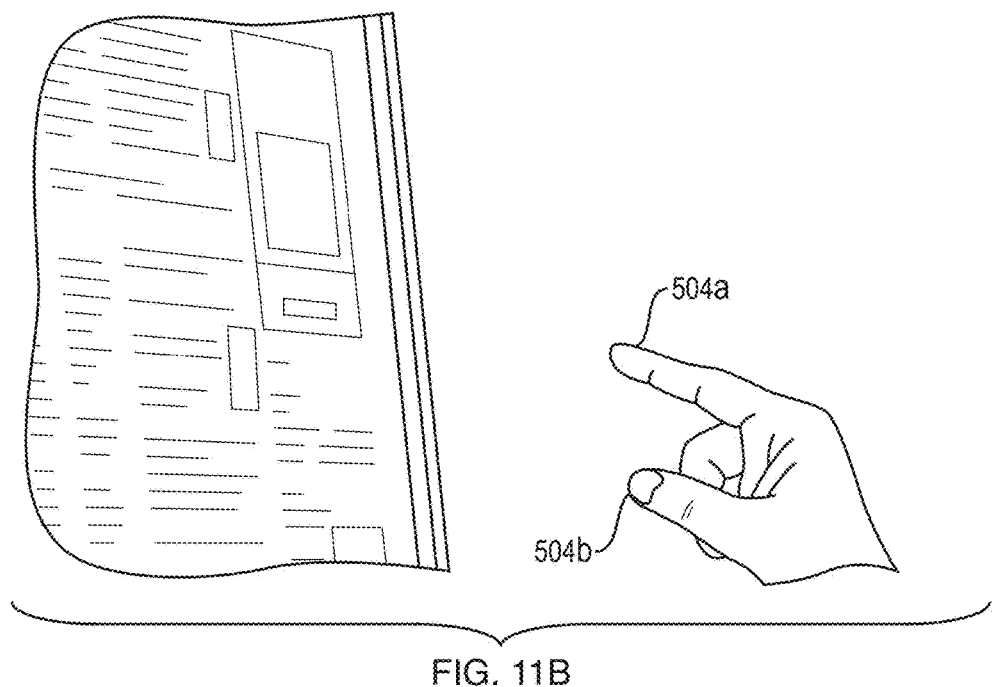

FIGS. 11A and 11B illustrate a zooming action performed by two fingers (thumb and index finger) according to various embodiments. These diagrams are merely an example; one of ordinary skill in the art would recognize many other variations, alternatives, and modifications. As illustrated by FIG. 11A, an image 1106 (happens to be a web page feed) is being displayed by display 1104, by a browser or other application. To zoom in, the user commences a motion including engaging a virtual control construct (not shown) interposed between the user and display 1104 at an engagement target approximately over the right most column being displayed. In FIG. 11B, the finger tips 504a, 504b of the user are moved away from each other. This motion is recognized by device 700 from differences in images captured of the control object portion 504a, 504b and determined to be an engagement gesture including a spreading motion of the thumb and index finger-tip in front of the screen using the techniques described hereinabove. The result of interpreting the engagement gesture is passed to an application (and/or to the OS) owning the display 1104. The application owning display 704 responds by zooming-in the image of display 1104.

Figure 12A:
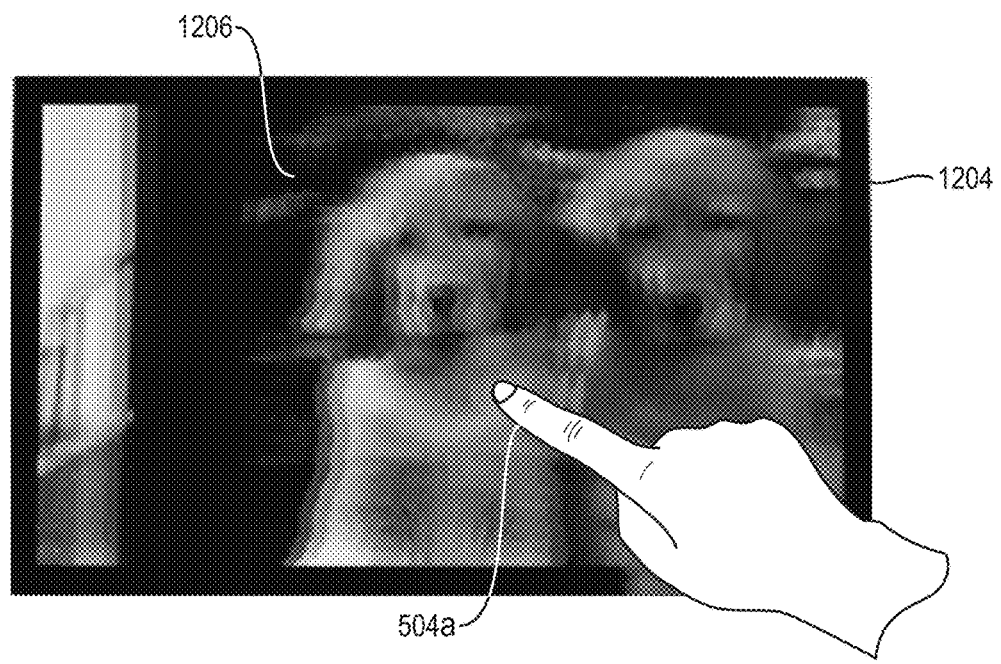
FIGS. 12A and 12B illustrate, in two snap shots, a swiping action performed by a user via a free-space gesture in accordance with various embodiments.
Figure 12B:
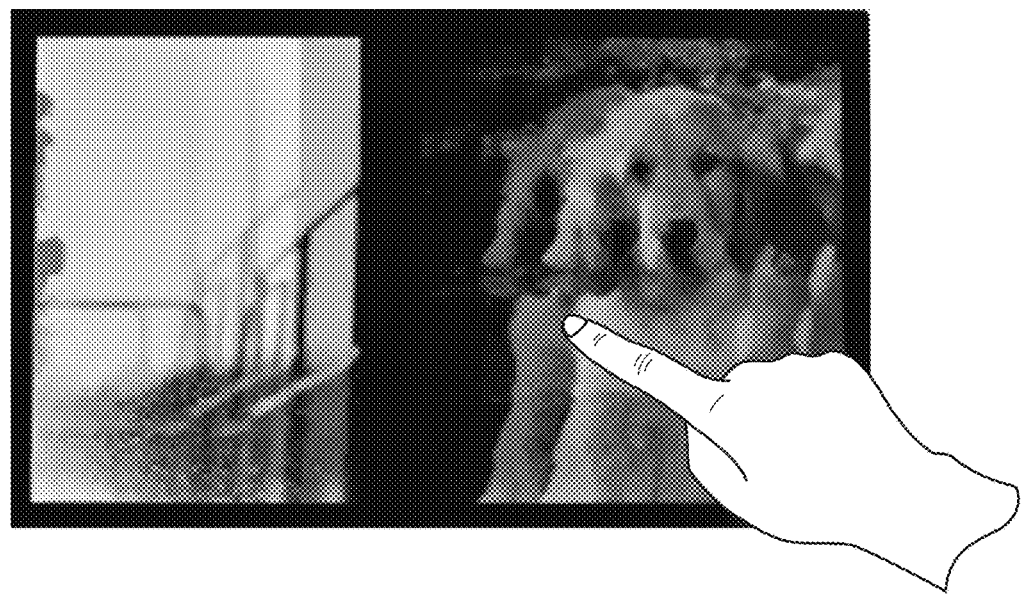

FIGS. 12A and 12B show how a swiping gesture by a finger in engaged mode may serve to scroll through screen content according to various embodiments. These diagrams are merely an example; one of ordinary skill in the art would recognize many other variations, alternatives, and modifications. As illustrated by FIG. 12A, an image 1206 (happens to be of dogs in this example) is being displayed by display 1204. When the user commences a motion relative to and engaged with a virtual control construct (not shown) interposed between the user and display 1204 (e.g., at an engagement target approximately over the left-most dog), the user's gesture may be interpreted as a control input for the application displaying the images. For example, in FIG. 12B, the user has swiped a finger-tip 504a from left to right. This motion is recognized by device from differences in images captured of the control object portion 504a and determined to be an engagement gesture including a swiping motion from left to right that pierces the virtual control construct using the techniques described hereinabove. The result of interpreting the engagement gesture is passed to the image application, which responds by scrolling the image on the display 1204. On the other hand, the same gesture performed without engaging the virtual control construct may be passed to the operating system and, for example, used to switch the display 1204 between multiple desktops or trigger some other higher-level function. This is just one example of how engagement gestures, i.e., gestures performed relative to a virtual control construct (whether in the engaged or the disengaged mode, or changing between the modes), can be used to provide different types of control input.

Figure 13A:
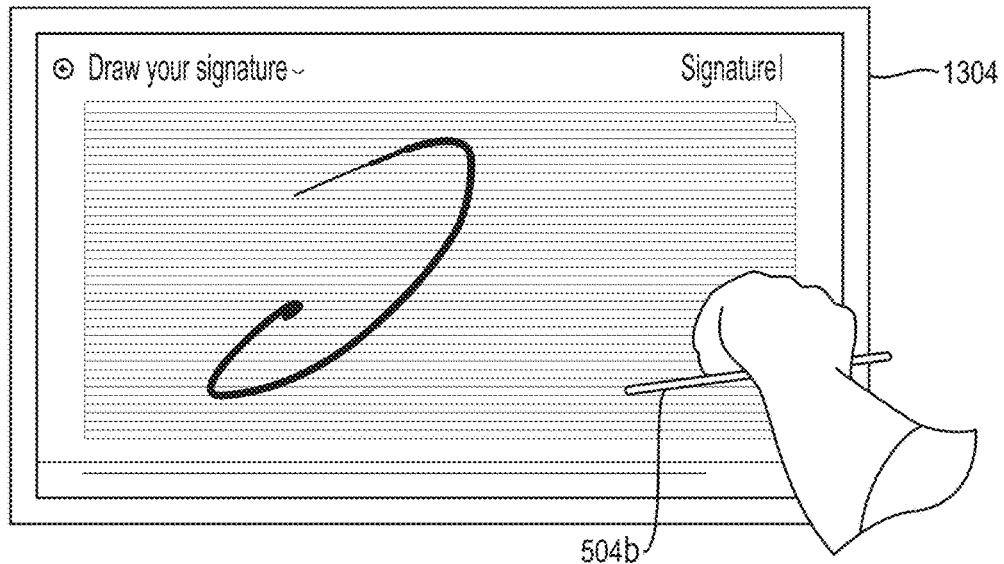
FIGS. 13A and 13B illustrate, in two snap shots, a drawing action performed by a user via free-space hand motions in accordance with various embodiments.
Figure 13B:
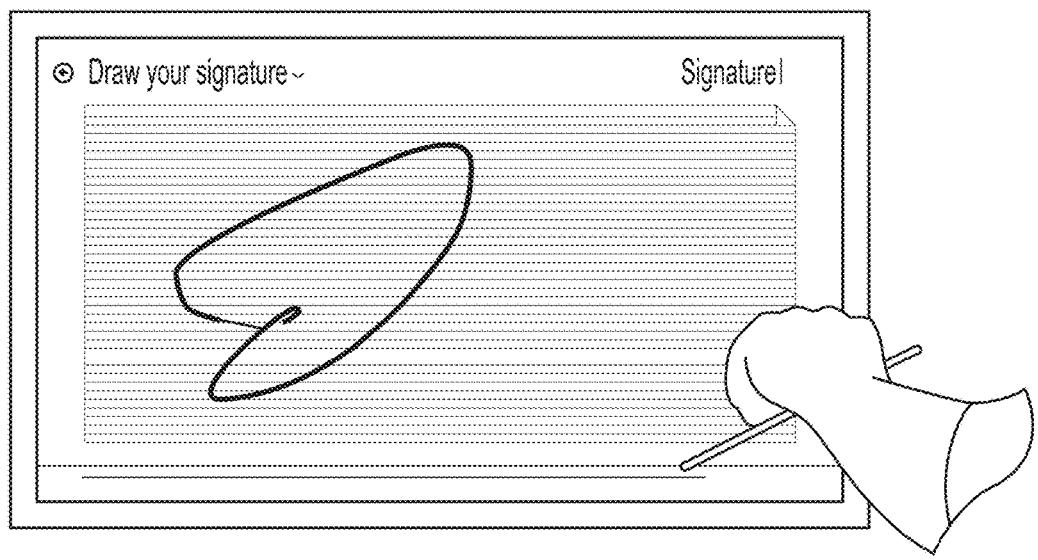

FIGS. 13A and 13B show how the motion of a control object in free space in conjunction with a virtual plane (or a slice of a certain thickness) can provide writing with a virtual pen onto a virtual paper defined in space according to various embodiments. These diagrams are merely an example; one of ordinary skill in the art would recognize many other variations, alternatives, and modifications. As shown in FIG. 13A, a user moves a tool 504b (happens to be a stylus) in free space in front of a writing area being displayed on the screen of display 1304 so as to pierce a virtual control construct (not shown) (happens to be a plane) interposed between the user and display 1304. This motion is recognized by device 1300 from differences in images captured of the control object portion 504b and determined to be an engagement gesture including placing a virtual pen onto a virtual paper of space, and is reflected by the contents of display 1304. Continuing motion of the stylus 504b in space by the user after engaging the virtual control plane is interpreted as writing with the stylus 504b on the virtual paper of space and is reflected by the contents of display 1304. As shown in FIG. 13B, when the user dis-engages with the virtual control construct, the virtual pen is lifted from the virtual paper, completing the letter "D" in script matching the handwriting of the user in free space. Accordingly, embodiments can enable, e.g., signature capture, free-hand drawings, etc.

The above-described 3D user-interaction technique enables the user to intuitively control and manipulate the electronic device and virtual objects by simply performing body gestures. Because the gesture-recognition system facilitates rendering of reconstructed 3D images of the gestures with high detection sensitivity, dynamic user interactions for display control are achieved in real time without excessive computational complexity. For example, the user can dynamically control the relationship between his actual movement and the corresponding action displayed on the screen. In addition, the device may display an on-screen indicator to reflect a degree of completion of the user's gesture in real time. Accordingly, embodiments can enable the user to dynamically interact with virtual objects displayed on the screen and advantageously enhances the realism of the virtual environment.

The terms and expressions employed herein are used as terms and expressions of description and not of limitation, and there is no intention, in the use of such terms and expressions, of excluding any equivalents of the features shown and described or portions thereof. In addition, having described certain embodiments, it will be apparent to those of ordinary skill in the art that other embodiments incorporating the concepts disclosed herein may be used without undue experimentation. Accordingly, the described embodiments are to be considered in all respects as only illustrative and not restrictive.

What is claimed is:

1. A method of controlling a machine, comprising:
sensing a variation of position of at least one control object using an imaging system;
determining from the variation of position, one or more primitives describing at least one motion made in space by the control object;
comparing the one or more primitives determined to one or more templates in a library of gesture templates;
selecting based upon a result of the comparing a set of templates of possible gestures corresponding to the one or more primitives; and
providing at least one of the set of templates of possible gestures as an indication of a command to issue to a machine under control responsive to the variation of position.

2. A method according to claim 1, wherein the sensing the variation of position of at least one control object using an imaging system comprises:
capturing a plurality of temporally sequential images of the at least one control object.

3. A method according to claim 2, wherein the determining from the variation of position, one or more primitives describing at least one of motion made by the control object comprises:
computationally analyzing the images of the at least one control object to recognize a gesture primitive including at least a portion of a trajectory (trajectory portion) describing motion made by the control object.

4. A method according to claim 3, wherein the computationally analyzing the images of the at least one control object to recognize a gesture primitive comprises:
identifying a scale and associating the scale with the at least a portion of a trajectory describing the motion made by the control object, the scale indicative of an actual distance traversed by the control object; and
computationally determining a ratio between the scale and a displayed movement corresponding to an action to be displayed on a presentation device; and
providing for displaying the action on the device adjusted based upon the ratio.

5. The method according to claim 4, wherein the scale is identified by comparing the recognized gesture primitive with records storing information describing gestures in a gesture database, wherein the gesture database comprises a set of electronically stored records each relating a gesture to an input parameter.

6. The method according to claim 5, wherein the records store information describing gestures as sets of vectors.

7. The method according to claim 5, wherein the input parameter is the actual gesture distance.

8. The method according to claim 4, further comprising:
periodically determining a distance between the control object that performs the gesture and the imaging system;
adjusting the ratio based upon the distance; and
providing for display the action to be displayed resized based upon the ratio.

9. The method according to claim 3, wherein the computationally analyzing the images of the at least one control object comprises (i) identifying a position and shape of the at least one control object in the images and (ii) reconstructing the position and the shape of the at least one control object in 3D space based on correlations determined between the identified shapes and positions of the at least one control object in the images.

10. The method according to claim 9, wherein the identifying and reconstructing further comprises defining a 3D model of the at least one control object based upon the images and reconstructing the position and shape of the at least one control object in 3D space based on the 3D model.

11. The method according to claim 9, wherein the analyzing the images of the at least one control object further comprises temporally combining the reconstructed positions and shapes of the at least one control object in 3D space.

12. A method according to claim 1, wherein the comparing the one or more primitives to one or more templates in a library of gesture templates comprises:
disassembling at least a portion of a trajectory into a set of frequency components; and
searching for the set of frequency components among the template(s) stored in the library.

13. A method according to claim 12, wherein the disassembling at least a portion of a trajectory into a set of frequency components comprises:
applying Fourier analysis to the trajectory portion as a signal over time to determine the set of frequency components.

14. A method according to claim 1, wherein the comparing the one or more primitives to one or more templates in a library of gesture templates comprises:
disassembling at least a portion of a trajectory into a set of frequency components;
fitting a set of one or more functions to a set of frequency components representing at least a portion of a trajectory; and
searching for the set of functions among the template(s) stored in the library.

15. A method according to claim 14, wherein the fitting a set of one or more functions to a set of frequency components representing at least a portion of a trajectory comprises:
fitting a Gaussian function to the set of frequency components.

16. A method according to claim 1, wherein the comparing the one or more primitives to one or more templates in a library of gesture templates comprises:
disassembling at least a portion of a trajectory into a set of time dependent frequency components; and
searching for the set of time dependent frequency components among the template(s) stored in the library.

17. A method according to claim 16, wherein the disassembling at least a portion of a trajectory into a set of time dependent frequency components comprises:
applying a wavelet analysis to the trajectory portion as a signal over time to determine the set of time dependent frequency components.

18. A method according to claim 1, wherein the comparing the one or more primitives to one or more templates in a library of gesture templates comprises:
   distorting at least a portion of a trajectory based at least in part upon frequency of motion components; and
   searching for the trajectory as distorted among the template(s) stored in the library.

19. A method according to claim 1, wherein the selecting based upon a result of the comparing a set of templates of possible gestures corresponding to the one or more primitives comprises:
   determining a similarity between the one or more primitives and the set of templates by applying at least one similarity determiner; and
   providing the similarity as an indication of quality of correspondence between the one or more primitives and the set of templates.

20. A method according to claim 19, wherein the determining a similarity between the one or more primitives and the set of templates by applying at least one similarity determiner comprises:
   applying at least one of a correlation, a convolution, and a dot product.

21. A method according to claim 19, wherein the selecting based upon a result of the comparing a set of templates of possible gestures corresponding to the one or more primitives further comprises:
   performing at least one of scaling and shifting to at least one of the one or more primitives and the set of templates.

22. A method according to claim 1, wherein the selecting based upon a result of the comparing a set of templates of possible gestures corresponding to the one or more primitives comprises:
   disassembling at least a portion of a trajectory into a set of frequency components;
   filtering the set of frequency components to remove a motion associated with jitter; and
   searching the filtered set of frequency components in the template(s) stored in the library.

23. A method according to claim 22, wherein the filtering the set of frequency components comprises:
   applying a Frenet-Serret filter.

24. The method according to claim 1, wherein the at least one control object comprises a body part of a user.

25. A method according to claim 1, wherein the determining from the variation of position, one or more primitives describing at least one of motion made by the control object comprises determining a position or motion of the at least one control object relative to a virtual control construct.

26. A method according to claim 1, the method further comprising:
   computationally determining a degree of completion of at least one gesture; and
   modifying contents of a display in accordance with the determined degree of completion.

27. The method according to claim 26, further comprising:
   comparing the degree of completion to a threshold value; and
   indicating a command to be performed based upon a result of the comparing.

28. The method according to claim 26, wherein the contents of a display comprise at least one selected from an icon, a bar, a color gradient, and a color brightness.

29. The method according to claim 26, further comprising displaying an action responsive to the gesture in accordance with a physics simulation model based upon the degree of gesture completion.

30. The method according to claim 29, wherein the action is displayed based upon a motion model.

31. The method according to claim 30, wherein the motion model is constructed based upon at least one of a simulated physical force, gravity, and a frictional force.

32. A method according to claim 1, the method further comprising:
   computationally determining a dominant gesture; and
   presenting an action on a presentation device based on the dominant gesture.

33. The method according to claim 32, wherein the dominant gesture is determined by filtering the plurality of gestures.

34. The method according to claim 32, wherein each of the gestures is computationally represented as a trajectory.

35. The method according to claim 34, wherein each trajectory is computationally represented as a vector along six Euler degrees of freedom in Euler space, the vector having a largest magnitude being determined to be the dominant gesture.

36. A method according to claim 1, wherein the providing the at least one of the set of templates of possible gestures as an indication of a command to issue to a machine under control responsive to the variation of position comprises:
   filtering one or more gestures based at least in part upon one or more characteristics to determine a set of gestures of interest; and
   providing the set of gestures of interest.

37. The method according to claim 36, wherein the characteristics comprise at least one of a configuration, shape, and a disposition of the control object making the gesture.

38. The method according to claim 36, wherein gestures are associated with primitives in a data structure.

39. The method according to claim 36, further comprising providing the set of gestures of interest via an API.

40. The method according to claim 1, wherein the providing at least one of the set of templates of possible gestures as an indication of a command to issue to a machine under control responsive to the variation of position further comprises:
   detecting a conflict between a template corresponding to a user-defined gesture and a template corresponding to a predetermined gesture; and
   applying a resolution determiner to resolve the conflict.

41. The method according to claim 40, wherein the applying a resolution determiner to resolve the conflict comprises:
   ignoring the predetermined gesture when the conflict is between the predetermined gesture and the user-defined gesture.

42. The method according to claim 40, wherein the applying a resolution determiner to resolve the conflict comprises:
   providing the user-defined gesture when the conflict is between the predetermined gesture and a user-defined gesture.

43. A system enabling dynamic user interactions with a device having a display screen, the system comprising:
   at least one camera oriented toward a field of view;
   at least one source of direct illumination onto at least one control object in the field of view;

a gesture database comprising a set of electronically stored records, each of the records relating a gesture to an input parameter; and an image analyzer coupled to the camera and the database and configured to:

operate the camera to capture a plurality of temporally sequential images of the at least one control object;

analyze the images of the at least one control object to recognize a gesture performed by the user;

compare the recognized gesture with records in the gesture database to identify an input parameter associated therewith, the input parameter corresponding to an action for display on the display screen in accordance with a ratio between an actual gesture distance traversed in performance of the gesture and a displayed movement corresponding to the action; and providing the action for display adjusted based upon the ratio.

44. A non-transitory computer readable storage medium impressed with computer program instructions to control a machine, which instructions, when executed by a processor, implement:

sensing a variation of position of at least one control object using an imaging system;

determining from the variation of position, one or more primitives describing at least one motion made in space by the control object;

comparing the one or more primitives to one or more templates in a library of gesture templates;

selecting based upon a result of the comparing a set of templates of possible gestures corresponding to the one or more primitives; and providing at least one of the set of templates of possible gestures as an indication of a command to issue to a machine under control responsive to the variation of position.

* * * * *